US012087270B1

(12) United States Patent
Cygert et al.

(10) Patent No.: US 12,087,270 B1
(45) Date of Patent: Sep. 10, 2024

(54) USER-CUSTOMIZED SYNTHETIC VOICE

(71) Applicant: Amazon Technologies, Inc., Seattle, WA (US)

(72) Inventors: Sebastian Dariusz Cygert, Gdansk (PL); Daniel Korzekwa, Gdansk (PL); Kamil Pokora, Gdansk (PL); Piotr Tadeusz Bilinski, Warsaw (PL); Kayoko Yanagisawa, Cambridge (GB); Abdelhamid Ezzerg, Cambridge (GB); Thomas Edward Merritt, Downham Market (GB); Raghu Ram Sreepada Srinivas, Snohomish, WA (US); Nikhil Sharma, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 166 days.

(21) Appl. No.: 17/955,961

(22) Filed: Sep. 29, 2022

(51) Int. Cl.
*G10L 15/16* (2006.01)
*G10L 13/033* (2013.01)
*G10L 13/047* (2013.01)
*G10L 13/10* (2013.01)
*G10L 15/06* (2013.01)
*G10L 25/30* (2013.01)

(52) U.S. Cl.
CPC .......... *G10L 13/033* (2013.01); *G10L 13/047* (2013.01); *G10L 13/10* (2013.01)

(58) Field of Classification Search
None
See application file for complete search history.

(56) References Cited

U.S. PATENT DOCUMENTS

| | | | | |
|---|---|---|---|---|
| 11,580,955 B1 * | 2/2023 | Meng | ..................... | G10L 13/047 |
| 2016/0140952 A1 * | 5/2016 | Graham | ................ | G10L 13/033 704/260 |
| 2023/0018384 A1 * | 1/2023 | Finkelstein | ........... | G10L 13/047 |

FOREIGN PATENT DOCUMENTS

| | | | | |
|---|---|---|---|---|
| CN | 113822017 A | * 12/2021 | ............ | G10L 13/02 |
| KR | 20220165666 A | * 6/2022 | | |
| WO | WO-2022260432 A1 | * 12/2022 | ............ | G06F 3/167 |
| WO | WO-2023248398 A1 | * 12/2023 | | |

* cited by examiner

*Primary Examiner* — Shreyans A Patel
(74) *Attorney, Agent, or Firm* — Pierce Atwood LLP

(57) ABSTRACT

Techniques for generating customized synthetic voices personalized to a user, based on user-provided feedback, are described. A system may determine embedding data representing a user-provided description of a desired synthetic voice and profile data associated with the user, and generate synthetic voice embedding data using synthetic voice embedding data corresponding a profile associated with a user determined to be similar to the current user. Based on user-provided feedback with respect to a customized synthetic voice, generated using synthetic voice characteristics corresponding to the synthetic voice embedding data and presented to the user, and the synthetic voice embedding data, the system may generate new synthetic voice embedding data, corresponding to a new customized synthetic voice. The system may be configured to assign the customized synthetic voice to the user, such that a subsequent user may not be presented with the same customized synthetic voice.

20 Claims, 19 Drawing Sheets

USER-CUSTOMIZED SYNTHETIC VOICE

BACKGROUND

A speech-processing system includes a speech-synthesis component for processing input data such as text and/or audio data to determine output data that includes a representation of speech. The speech corresponds to one or more characteristics, such as tone, pitch, or frequency. The speech-synthesis component processes different characteristics to produce different speech.

BRIEF DESCRIPTION OF DRAWINGS

For a more complete understanding of the present disclosure, reference is now made to the following description taken in conjunction with the accompanying drawings.

DETAILED DESCRIPTION

Figure 1:
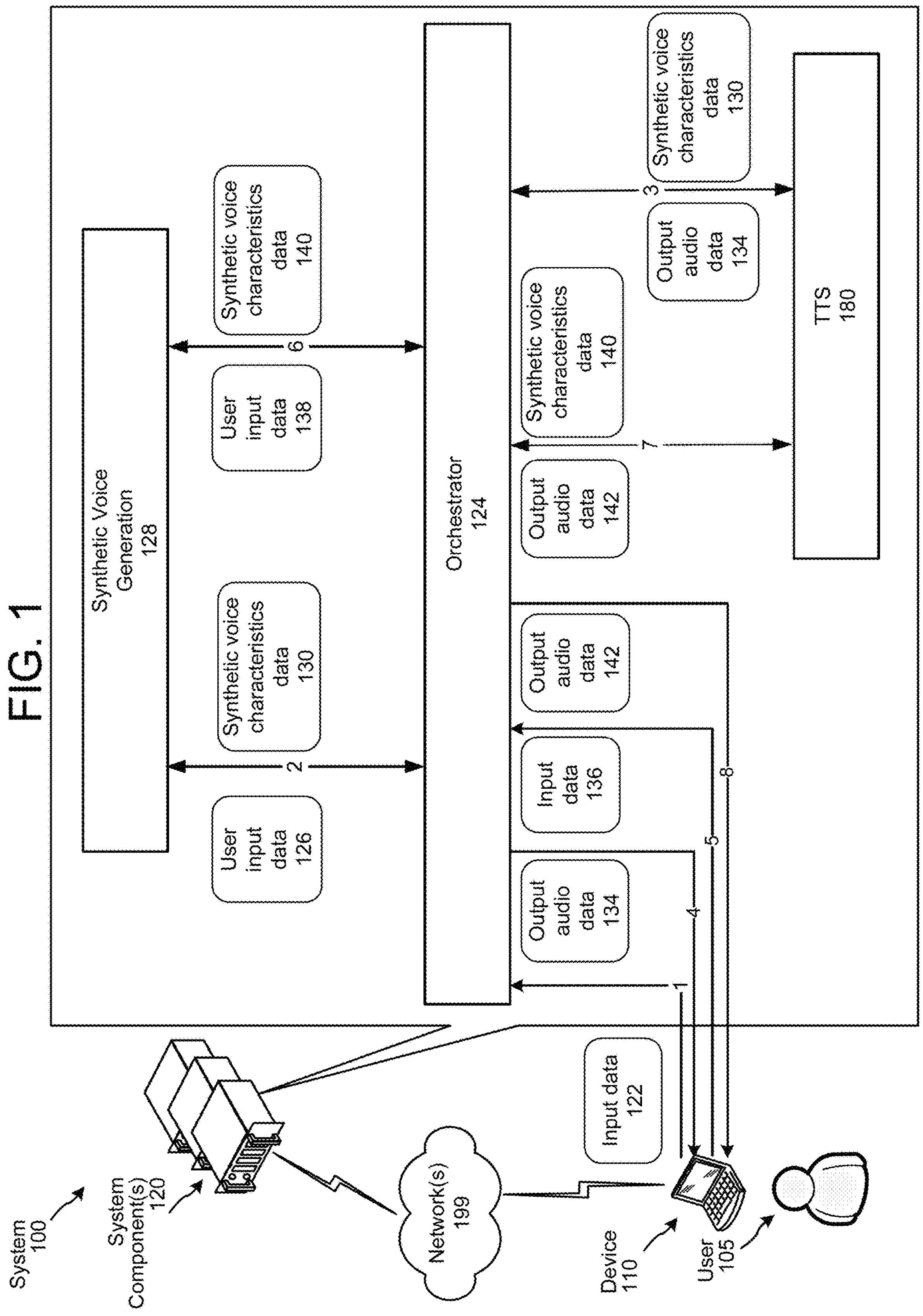
FIG. 1 is a conceptual diagram illustrating a system for generating user-customized synthetic voices, according to embodiments of the present disclosure.

Speech-processing systems may include one or more speech-synthesis components that employ one or more of various techniques to generate synthesized speech from input data (such as audio data, text data, and/or other data) representing first speech. The speech-synthesis component may include various machine learning components such as a neural-network encoder for processing the input data and determining encoded data representing the speech and a neural-network decoder for processing the encoded data to determine output data representing the speech. The encoder may process further encoded data representing characteristics of speech; the output data may correspond to these characteristics. The output data may be processed by various downstream components such as vocoder, loudspeaker, etc. to ultimately output audio representing the synthesized speech.

A user may prefer a customized synthetic voice experience that is personalized to them when interacting with a system capable of generating and/or outputting synthesized speech. As such, allowing a user to select from only pre-defined synthetic voices may not result in a level of personalization that results in a satisfactory user experience. However, providing a user with precise controls over every aspect of a synthetic voice (pitch, prosody, tone, speed, accent, pausing, emotion, etc.) may be cumbersome and may similarly fail to provide a satisfactory user experience. The user may wish to participate in the customization of the synthetic voice, but without having to interact too deeply with the underlying processing to generate the synthetic voice. Therefore, a user may wish to provide a description of the synthetic voice that the user wishes to hear, and/or provide limited feedback with respect to synthetic voices that are presented to the user/that the user may select from. Use of machine learning techniques, such as neural networks and the like, may assist in generating customized synthetic voices that are customized to a user based on such descriptions and/or feedback.

Offered is, among other things, a system to obtain user feedback on output audio data corresponding to synthetic speech spoken in a customized synthetic voice that is generated by the system based on input provided by the user. In particular, a system may enter into a multi-iteration dialog with a user (e.g., a machine-human "conversation") to generate a customized synthetic voice that is personalized to the user, or a profile associated with the user, based on feedback provided by the user with respect to the synthetic voice presented to the user at each iteration of processing. The system may generate the customized synthetic voice by sampling a synthetic voice embedding space including a plurality of synthetic voice embedding data corresponding to one or more synthetic voices. The system may be capable of sampling the synthetic voice embedding space for multiple instances of synthetic voice embedding data, and may be capable of interpolating between the multiple instances of synthetic voice embedding data to generate synthetic voice embedding data that is not included in the synthetic voice embedding space. As such, the system may be capable of using multiple instances of synthetic voice embedding data included in the synthetic voice embedding space to generate a customized synthetic voice that is not represented in the synthetic voice embedding space. Further the system may be configured to assign a customized synthetic voice to a user/profile, such that a subsequent user may not be presented with/have assigned the same customized synthetic voice that was previously assigned to the user/profile.

The present system may determine a representation of the synthetic voice requested by the user and generate a customized synthetic voice using the representation and synthetic voice associated with a profile of a different user determined to have requested a similar synthetic voice. After presenting the customized synthetic voice to the user, and based on feedback received from the user with respect to the customized synthetic voice, the present system may generate a new customized synthetic voice to present the user. The system may repeat the customized voice generation process during one or more subsequent iterations of interaction with the user until the user is satisfied with the customized synthetic voice. Though to improve user satisfaction, the system may be configured to attempt to arrive at a satisfactory synthetic voice within a limited number of iterations (for example, 3, 5, or the like depending on system configuration).

Specifically, a system of the present disclosure may receive, from the user, a description of synthetic voice characteristics associated with the synthetic voice that the user wishes to hear. For example, a description of synthetic voice characteristics associated with the synthetic voice may be "New York Italian pizzeria owner," "French baker," "Midwestern weather reporter," etc. The system may perform automatic speech recognition (ASR) and/or natural language understanding (NLU) processing with respect to the description to determine a textual or other word (e.g., tokenized) representation of and/or an intent associated with the description. The system may generate embedding data representing the description and profile data corresponding to a profile associated with the user. The system may use the embedding data to determine similar embedding data associated with one or more different users, and may determine synthetic voice embedding data corresponding to one or more customized synthetic voices that are personalized to the different users/profiles associated with the different users. The system may determine synthetic voice characteristics corresponding to the synthetic voice embedding data, use the synthetic voice characteristics to generate output audio data corresponding to a customized synthetic voice that is personalized to the user, and cause the output audio data to be presented to the user.

The system of the present disclosure may also receive, after causing the output audio data to be presented to the user, input data representing feedback from the user with respect to how satisfied the user is with the customized synthetic voice. The feedback may be limited and may be provided to a graphical user interface (GUI). For example, the feedback may be received as a rating of 1-5 corresponding to the user's satisfaction with the customized synthetic voice. The system may use the feedback, and the synthetic voice embedding data associated with the customized synthetic voice, to determine probability data such as a prior probability distribution (prior) with respect to a synthetic voice embedding space including a plurality of synthetic voice embedding data, where the probability data may represent a predicted probability that a customized synthetic voice generated using an instance of synthetic voice embedding data included in the synthetic voice embedding space corresponds to the synthetic voice requested by the user. The system may implement the probability data to select synthetic voice embedding data from the synthetic voice embedding space, determine synthetic voice characteristics corresponding to the synthetic voice embedding data, use the synthetic voice characteristics to generate output audio data corresponding to an updated customized synthetic voice, and cause the output audio data to be presented to the user.

The system of the present disclosure may also be configured to determine, when determining the synthetic voice embedding data (e.g., data included in the profile associated with the similar user and/or included in the synthetic voice embedding space), more than one instance of synthetic voice embedding data. The system may be configured to interpolate between the instances of synthetic voice embedding data to generate synthetic voice embedding data which corresponds to a customized synthetic voice different from the customized synthetic voices one of those instances of synthetic voice embedding data. As such, the system may be capable of generating synthetic voice embedding data that has not previously been represented in the synthetic voice embedding space to create a new synthetic voice.

FIG. 1 illustrates a system 100 for generating a user-customized synthetic voice. The system 100 may include a device 110, local to the user 105, in communication with a system component(s) 120 via a network(s) 199. The network(s) 199 may include the internet and/or any other wide- or local-area network, and may include wired, wireless, and/or cellular network hardware.

The system component(s) 120 may include various components. With reference to FIG. 1, the system component(s) 120 may include an orchestrator component 124, a synthetic voice generation component 128, and a text-to-speech (TTS) component 180.

Referring to FIG. 1, the user 105 may provide a user input to the device 110, and the device 110 may generate and send (at arrow 1), to the system component(s) 120, input data 122 corresponding to the user input. For example, the user 105 may speak an utterance, and the device 110 may receive the utterance as input (analog) audio and generate (digitized) input audio data corresponding to the audio, where the input audio data forms at least a portion of the input data 122. For further example, the user may provide a typed natural language user input as input text, and the device 110 may generate input text data corresponding to the input text, wherein the input text data forms at least a portion of the input data 122. Other types of user inputs can also be processed using the techniques described herein. Some user inputs may be converted to a different form for further processing. For example, the input data 122 may include image data representing a gesture (e.g., pointing to an object, showing a number, etc.) performed by the user 105, and the system component(s) 120 may process the image data to determine data (e.g., text data, intent data, entity data, etc.) representing a meaning of the gesture input. The techniques described herein may be applied to the data representing the meaning of the gesture input to predict, for example, a future user input.

The system component(s) 120 may receive, at the orchestrator component 124, the input data 122 representing the user input. The orchestrator component 124 may determine, using the input data 122, user input data 126 representing the input data 122. For example, in the situation where the input data 122 includes input audio data, the orchestrator component 124 may cause an automatic speech recognition (ASR) component to generate ASR output data corresponding to a spoken natural language user input of the input audio data. Processing by the ASR component is described in detail herein below with respect to FIG. 10. For further example, after receiving the ASR output data, or in the situation where the input data 122 includes text data, the orchestrator component 124 may cause a natural language understanding (NLU) component to generate NLU output data including one or more NLU hypotheses, each representing a respective semantic interpretation of the natural language user input as represented in the input data 122. Processing by the NLU component is described in detail herein below with respect to the FIGS. 11 and 12.

Figure 2A:
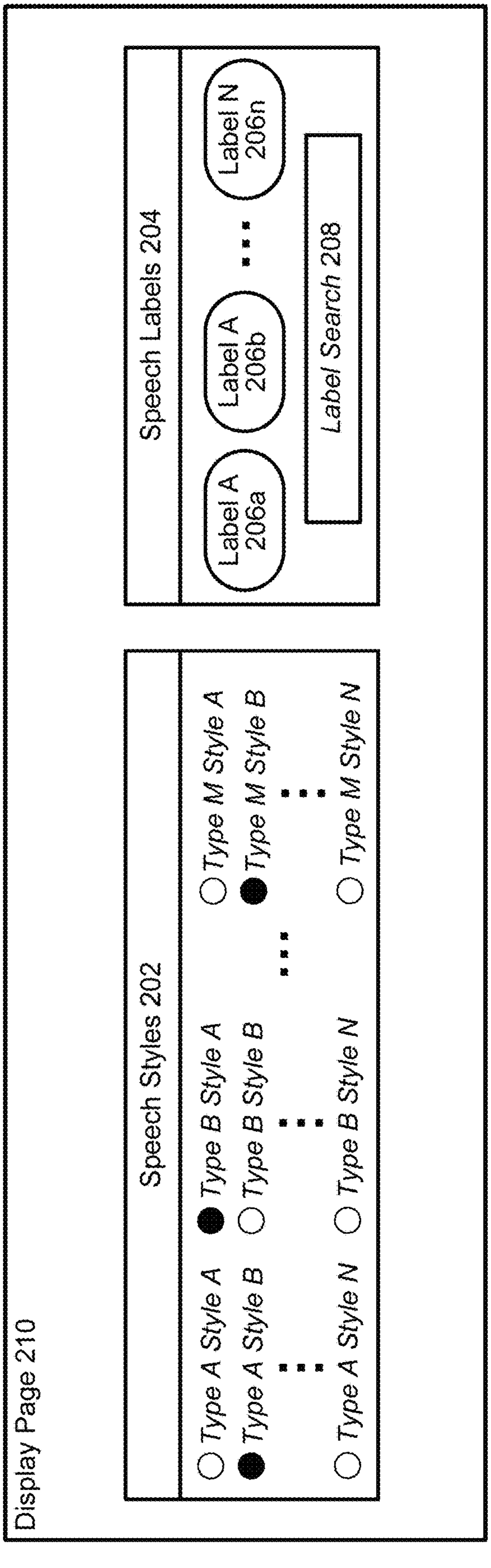
FIG. 2A illustrates a user interface comprising elements corresponding to characteristics of speech, according to embodiments of the present disclosure.

In some embodiments, system 100 may include a graphical user interface (GUI) component (as illustrated in FIG. 2A) for displaying a user interface and determining user inputs related thereto and/or an element evaluation component for determining parameters corresponding to the elements. The GUI may include one or more elements representing one or more speaker characteristics which may be modified by the user 105. In such embodiments, the input data 122 may include speech parameter input data corresponding to one or more inputs received by a display (e.g., the display page 210 in FIG. 2A) of the device 110. The user inputs may correspond to one or more elements displayed by the GUI and may be, for example, touch gestures, mouse inputs, and/or keyboard inputs. The orchestrator may send the speech parameter input data to a speech-parameter determination component configured to process the speech parameter input data to determine speech parameter data, and the orchestrator may include the speech parameter data in the user input data 126.

FIG. 2A illustrates a GUI comprising elements corresponding to characteristics of speech according to embodiments of the present disclosure; the GUI may be displayed on a display page 210 of the device 110. A first set of elements of the GUI may correspond to speech styles 202, and may include one or more sets of radio buttons, check buttons, and/or other types of buttons or selection elements. Each set of radio buttons may allow selection of one radio button of the set; if a second button of the set is selected, the first button may be de-selected. For example, a first set of radio buttons may include a first button for "male" and a second button for "female"; selection of the "male" button may cause de-selection of the "female" button, and vice-versa. Other examples of sets of radio buttons may be a first set including "formal" and "informal," and a second set including "happy," "sad," and "angry." Any number of sets and any types of sets are within the scope of the present disclosure.

The GUI may further include a second set of elements corresponding to speech labels 204. A speech label may correspond to an adjective describing speech, such as "expressive" or "young." A label search element 208 may be configured to receive text data from, for example, a physical and/or virtual keyboard specifying a label. The speech labels may display further elements corresponding to specific labels 206; these labels 206 may correspond to labels received by the label search element 208.

With reference once more to FIG. 1, the orchestrator component 124 may send (at arrow 2) the user input data 126 to the synthetic voice generation component 128.

The synthetic voice generation component 128 processes the user input data 126 to generate synthetic voice characteristics data 130 corresponding to a customized synthetic voice that is personalized to the user 105. Processing of the user input data 126 by the synthetic voice generation component 128 to generate the synthetic voice characteristics data 130 is described in detail herein below with respect to FIG. 3.

Figure 3:
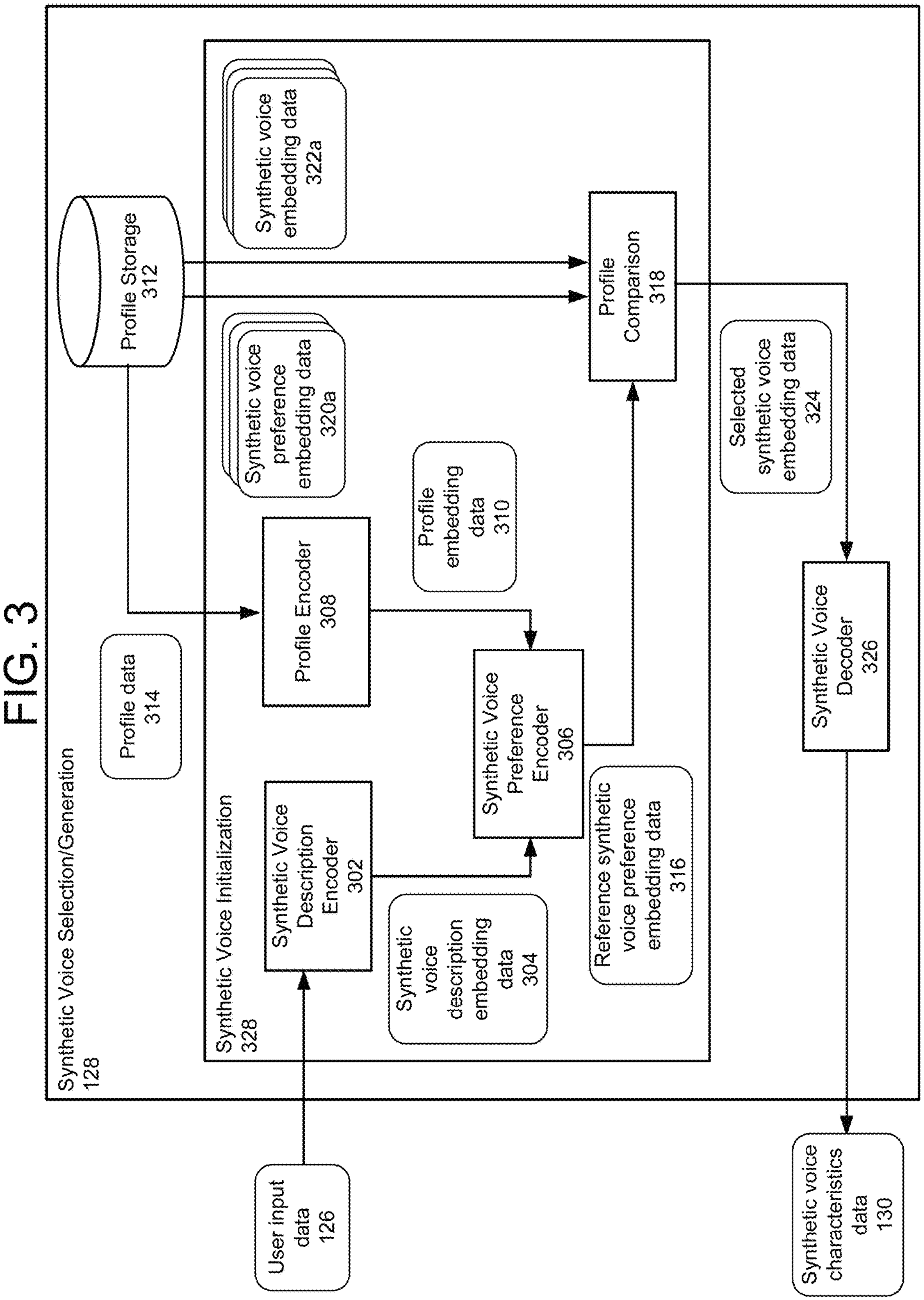
FIG. 3 is a conceptual diagram illustrating example components of and processing that may be performed by a synthetic voice generation component of the system during an initial iteration of customized synthetic voice generation, according to embodiments of the present disclosure.

FIG. 3 illustrates example processing that may be performed by the synthetic voice generation component during an initial iteration of customized synthetic voice selection. Referring to FIG. 3, the synthetic voice generation component 128 may include a synthetic voice initialization component 328, a profile storage 312, and a synthetic voice decoder 326. The synthetic voice initialization component 328 may include a synthetic voice description encoder 302, a profile encoder 308, a synthetic voice preference encoder 306, and a profile comparison component 318. In some embodiments, the profile storage 312 may not be included in the synthetic voice generation component 128, and may be located elsewhere in the system 100 or the system component(s) 120. In some embodiments, the profile storage 312 may correspond to the voice profile storage 485. For example, a TTS model (e.g., the TTS model 480) stored in the voice profile storage 485 may include data indicating a user and/or enterprise associated with the TTS model 480. The TTS models 480 and the voice profile storage 485 are discussed in more detail below in connection with FIG. 4.

The synthetic voice generation component 128 may receive the user input data 126 at the synthetic voice description encoder 302 of the synthetic voice initialization component 328. The synthetic voice description encoder 302 may be configured to take as input the user input data 126 and encode the user input data 126 into synthetic voice description embedding data 304 representing the user's 105 natural language description of their preferred customized synthetic voice. In some embodiments, the synthetic voice description encoder 302 may determine text data included in the user input data 126 (e.g., corresponding to the ASR output data, the input text data discussed above, an NLU interpretation of either, or some other form) and encode the user input data into the synthetic voice description embedding data 304. The synthetic voice description encoder 302 may send the synthetic voice description embedding data 304 to the synthetic voice preference encoder 306.

The synthetic voice description embedding data 304 may correspond to one or more points in a multi-dimensional embedding space of synthetic voice characteristics, wherein each point is associated with one or more different combination of characteristics. The embedding space may be an N-dimensional space, wherein each dimension of the embedding space corresponds to a dimension (e.g., degree of freedom) of the vector representing the voice. Points in the embedding space near each other may correspond to synthetic voice descriptions which correspond to similar characteristics, while points far from each other may correspond to synthetic voice descriptions which correspond to dissimilar characteristics. Regions of the embedding space may thus correspond to one or more different characteristics; a first region in the embedding space may, for example, represent synthetic voice descriptions which correspond to a synthetic voice having formal characteristics, while a second region in the embedding space may correspond to synthetic voice description which correspond to a synthetic voice having male characteristics.

The voice description embedding space may be defined by processing text data representing synthetic voice descriptions corresponding to synthetic voices exhibiting different characteristics with an encoder, such as a trained neural network encoder. First text data may, for example, include a synthetic voice description corresponding to a synthetic voice associated with the characteristics "male" and "loud." The encoder may process this text data and determine output embedding data that represents the description of the characteristics. The point and/or region in the embedding space corresponding to the embedded data may then be associated with the characteristics of the synthetic voice represented by the synthetic voice description.

The profile encoder 308 may query the profile storage 312 for profile data 314 corresponding to the user 105 (in other words, profile data 314 corresponding to the input data 122) and/or an enterprise associated with the user 105. For example, a user recognition component 895 of the system component(s) 120 (illustrated in FIG. 8 and described in reference to FIGS. 13 and 14) may process and output a user identifier corresponding to the user 105, the synthetic voice generation component 128 (or the profile encoder 308) may receive the user identifier either directly from the user recognition component 895 or indirectly via the orchestrator component 124, and the profile encoder 308 may query the profile storage 312 (either directly or indirectly via the orchestrator component 124) for the profile data 314. The profile data 314 may include, for example, an age of the user 105, a gender of the user 105, a geographic location of the user 105, and/or other data. The profile data 314 may further include information associated with an enterprise. For example, the profile data 314 may include a category of business associated with the enterprise (e.g., computers, food, entertainment, travel, etc.), a product associated with the enterprise, a corporate structure associated with the enterprise, a geographic market associated with the enterprise, etc. For further example, the profile data 314 may include other information associated with the enterprise, such as a size of the enterprise (e.g., small, medium, large and/or a number of total employees), a mascot/avatar (e.g., to which the customized synthetic voice should correspond), a geographic location of a headquarters and/or branch(es) of the enterprise, whether the enterprise is national and/or international, etc. In some embodiments, the user 105 may be associated with the enterprise, and the profile data 314 may correspond to a profile associated with the enterprise. In some embodiments, the profile encoder 308 may be triggered to query the profile storage 312 in response to the synthetic voice generation component 128 and/or the synthetic voice description encoder 302 receiving the user input data 126. In other embodiments, the profile encoder 308 may be triggered to query the profile storage 312 in response to the synthetic voice preference encoder 306 receiving the synthetic voice description embedding data 304, where the synthetic voice preference encoder 306 may query the profile encoder 308 for profile embedding data 310. In still other embodiments, the profile encoder 308 may be triggered in response to the profile encoder 308 receiving the user identifier corresponding to the user 105.

The profile encoder 308 may be configured to take as input the profile data 314 and encode the profile data 314 into profile embedding data 310 representing the profile data 314. The profile encoder 308 may send the profile embedding data 310 to the synthetic voice preference encoder 306.

The profile embedding data 310 may correspond to one or more points in an embedding space of profile feature data, wherein each point is associated with one or more different features corresponding to a profile (e.g., age, gender, location, information associated with an enterprise etc.). The embedding space may be an N-dimensional space, wherein each dimension of the embedding space corresponds to a dimension (e.g., degree of freedom) of the vector. Points in the embedding space near each other may correspond to profiles which include similar profile feature data, while points far from each other may correspond to profiles which include dissimilar profile feature data. Regions of the embedding space may thus correspond to one or more different features corresponding to a profile; a first region in the embedding space may, for example, represent profiles that are associated with an age in an age range (e.g., 18-24), while a second region in the embedding space may represent profiles that are associated with a male gender, and while a third region in the embedding space may represent profiles that are associated with a geographic market of an enterprise.

The profile data embedding space may be defined by processing profile data representing profile feature data with an encoder, such as a trained neural network encoder. First profile data may, for example, include profile feature data corresponding to "male," "21 years old," and "Boston, MA." The encoder may process this profile data and determine output embedding data that represents the profile. The point and/or region in the embedding space corresponding to the embedded data may then be associated with the profile feature data corresponding to the profile. Second profile data may, for example, include profile feature data corresponding to "corporation," "automotive," "electric vehicles," and "North America." The encoder may process this profile data and determine output embedding data that represents the profile. The point and/or region in the embedding space corresponding to the embedded data may then be associated with the profile feature data corresponding to the profile.

The synthetic voice preference encoder 306 may be configured to take as input the synthetic voice description embedding data 304 and the profile embedding data 310 and encode the synthetic voice description embedding data 304 and the profile embedding data 310 into reference synthetic voice preference embedding data 316 representing the synthetic voice description embedding data 304 and the profile embedding data 310. In some embodiments, the synthetic voice preference encoder 306 may only receive one of the synthetic voice description embedding data 304 or the profile embedding data 310, and may still encode the received data into the reference synthetic voice preference embedding data 316. The synthetic voice preference encoder 306 may send the reference synthetic voice preference embedding data 316 to the profile comparison component 318

The synthetic voice preference embedding data 316 may correspond to one or more points in an embedding space of synthetic voice characteristics and profile feature data, wherein each point is associated with one or more different characteristics represented in a synthetic voice description provided by a user associated with profile feature data. The embedding space may be an N-dimensional space, wherein each dimension of the embedding space corresponds to a dimension (e.g., degree of freedom) of the vector. Points in the embedding space near each other may correspond to a synthetic voice descriptions which correspond to similar characteristics and were provided by users associated with similar profile feature data, while points far from each other may correspond to synthetic voice descriptions which correspond to dissimilar characteristics and were provided by users associated with dissimilar profile feature data. Regions of the embedding space may thus correspond to one or more different characteristics and one or more profile features; a first region in the embedding space may, for example, represent synthetic voice descriptions which correspond to a voice having formal characteristics and were provided by users associated with profiles that are associated with an age in an age range (e.g., 18-24), while a second region in the embedding space may correspond to synthetic voice descriptions which correspond to a voice having male characteristics and were provided by a user associated with a profile that is associated with a male gender.

The embedding space may be defined by processing text data representing voice descriptions corresponding to synthetic voices exhibiting different characteristics which were provided by users associated with profile data with an encoder, such as a neural network encoder. First text data and profile data may, for example, include a synthetic voice description corresponding to a voice associated with the characteristics "male" and "loud" and profile feature data corresponding to "male," "21 years old," and "Los Angeles CA." The encoder may process this text data and profile data, and determine output embedding data that represents the characteristics and the profile data. The point and/or region in the embedding space corresponding to the embedded data may then be associated with the characteristics of the synthetic voice represented by the synthetic voice description and the profile data.

The profile comparison component 318 may be configured to take as input the reference synthetic voice preference embedding data 316 and determine selected synthetic voice embedding data 324 corresponding to at least one additional user associated with synthetic voice preference embedding data 320*a-n* similar to the reference synthetic voice preference embedding data 316. In some embodiments, the profile comparison component 318 may determine the selected synthetic voice embedding data 324 by implementing a machine learning (ML) model. For example, the ML model may implement collaborative filtering techniques to determine the selected synthetic voice embedding data 324 corresponding to the at least one additional user based on the additional user being similar to the user 105.

The profile comparison component 318 may query the profile storage 312 for one or more instances of synthetic voice preference embedding data 320*a-n* corresponding to one or more additional users. The one or more instance of synthetic voice preference embedding data 320*a-n* may be stored in profiles corresponding to the additional users. The profile comparison component 318 may compare the reference synthetic voice preference embedding data 316 with the one or more instances of synthetic voice preference embedding data 320*a-n* to determine one or more instances of the synthetic voice preference embedding data 320*a-n* that are similar to (or the same as) the reference synthetic voice preference embedding data 316. In some embodiments, determining synthetic voice preference embedding data 320*a-n* that is similar to (or the same as) the reference synthetic voice preference embedding data 316 may represent that an additional user, to which the similar/same synthetic voice preference embedding data 320*a-n* corresponds, may have requested a customized synthetic voice similar to the customized synthetic voice requested by the user 105. Based on the additional user requesting a customized synthetic voice similar to the customized synthetic voice requested by the user 105, the profile comparison component 318 may determine that a customized synthetic voice personalized to the additional user may also be similar to the customized synthetic voice requested by the user 105.

After determining the one or more instances of synthetic voice preference embedding data 320*a-n* that are similar to (or the same as) the reference synthetic voice preference embedding data 316, the profile comparison component 318 may query the profile storage 312 for synthetic voice embedding data 322*a-n* associated with a profile(s) corresponding to the additional user(s) to which the similar synthetic voice preference embedding data 320*a-n* corresponds. In some embodiments, the synthetic voice embedding data 322*a-n* may correspond to one or more points in a synthetic voice embedding space including a plurality of synthetic voice embedding data. The synthetic voice embedding data 322*a-n* may represent one or more synthetic voice characteristics used to generate a customized synthetic voice personalized to the corresponding additional user.

In some embodiments, the profile corresponding to the additional user may include one or more instances of synthetic voice embedding data 322*a-n*. Each instance of the synthetic voice embedding data 322*a-n* included in the profile may correspond to an iteration of interaction (e.g., of a dialog) between the additional user and the system 100 for determining a customized synthetic voice personalized to the additional user. In some embodiments, the profile may include data indicating an instance of synthetic voice embedding data 322*a* generated during a final iteration of interaction between the additional user and the system 100, which resulted in a final customized synthetic voice personalized to the additional user. The profile comparison component 318 may query the profile storage 312 for such synthetic voice embedding data 322*a* from the profile corresponding to the additional user. The profile comparison component 318 may send the synthetic voice embedding data 322*a* (e.g., as selected synthetic voice embedding data 324) to the synthetic voice decoder 326.

In some embodiments, where the profile comparison component 318 determines more than one instance of synthetic voice preference embedding data 320*a-n* that is similar to the reference synthetic voice preference embedding data 316, the profile comparison component 318 may query the profile storage 312 for more than one instance of synthetic voice embedding data 322*a-n* corresponding to the final customized synthetic voices personalized to the additional users. In such embodiments, the profile comparison component 318 may generate the selected synthetic voice embedding data 324 by interpolating between the more than one points/regions of the synthetic voice embedding space corresponding to the more than one instance of synthetic voice embedding data 322*a-n* (e.g., by determining an average from the corresponding values of the points corresponding to the more than one instance of synthetic voice embedding data 322*a-n*).

In some embodiments, interpolating between the points/regions corresponding to the more than one instance of synthetic voice embedding data may result in the generation of synthetic voice embedding data (e.g., the selected synthetic voice embedding data 324) that is not represented by a point in the synthetic voice embedding space. In other words, the resulting selected synthetic voice embedding data 324 may correspond to synthetic voice characteristics corresponding to a customized synthetic voice not represented in the embedding space (e.g., a new synthetic voice).

Alternatively, the profile comparison component 318 may send the more than one instances of synthetic voice embedding data 322*a-n* to the synthetic voice decoder 326 (e.g., as the selected synthetic voice embedding data 324).

The synthetic voice decoder 326 may be configured to process the selected synthetic voice embedding data 324 to determine synthetic voice characteristics data 130 corresponding to the selected synthetic voice embedding data 324. For example, the synthetic voice decoder 326 may determine the point or region in the synthetic voice embedding space that the selected synthetic voice embedding data 324 corresponds to, and may determine the synthetic voice characteristics data 130 based on the corresponding speaker characteristics that the point and/or region of the synthetic voice embedding space represents. The synthetic voice decoder 326 may send the synthetic voice characteristics data 130 to the orchestrator component 124.

In some embodiments, the synthetic voice generation component 128 may cause the storing of data (e.g., the synthetic voice description embedding data 304, the profile embedding data 310, the reference synthetic voice preference embedding data 316, selected synthetic voice embedding data 324), generated/determined by the synthetic voice initialization component 328, in the profile storage 312, where the data is stored in association with a profile associated with the user 105. As discussed above, in some embodiments, the synthetic voice generation component 128 may cause the data to be stored in the voice profile storage 485 in association with a profile associated with the user 105.

Referring once more to FIG. 1, the synthetic voice generation component 128 may send (at arrow 2) the synthetic voice characteristics data 130 to the orchestrator component 124. In some embodiments, the synthetic voice generation component 128 may also generate and send text data representing speech that is to be synthesized using the synthetic voice characteristics data 130 to the orchestrator component 124.

The orchestrator component 124 may send (at arrow 3) the synthetic voice characteristics data 130 to the TTS component 180.

The TTS component 180 processes the synthetic voice characteristics data 130 (and the text data) and generates output audio data 134 representing synthesized speech spoken by the customized synthetic voice corresponding to the synthetic voice characteristics data 130. In some embodiments, the TTS component 180 may take the synthetic voice characteristics data 130 as input (e.g., as other input data 425), in order to generate the desired voice characteristics of the customized synthetic voice using a TTS model 480. Processing of the TTS component 180 is described in further detail herein below with respect to FIG. 4. The TTS component 180 may send (at arrow 3) the output audio data 134 to the orchestrator component 124.

Figure 4:
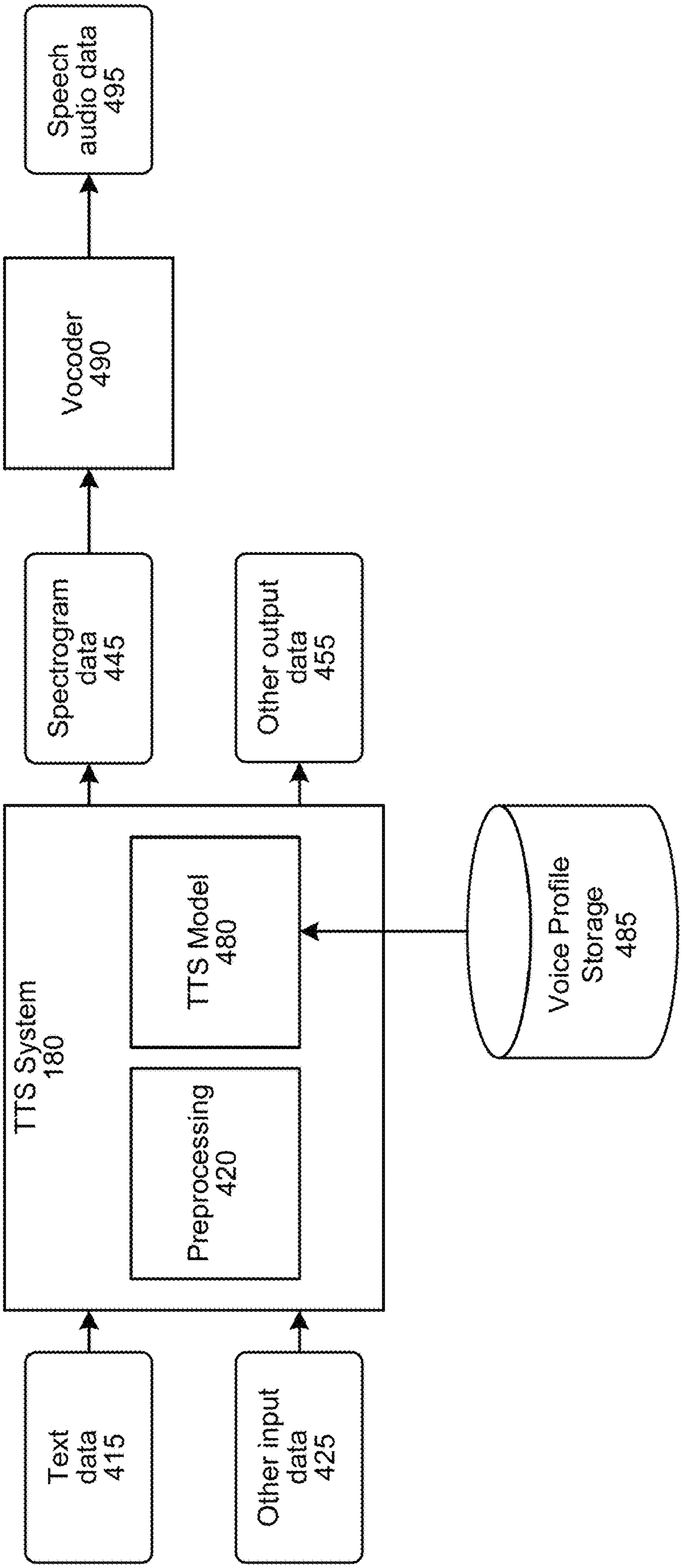
FIG. 4 is a conceptual diagram of text-to-speech components according to embodiments of the present disclosure.

Components of a system that may be used to perform unit selection, parametric TTS processing, and/or model-based audio synthesis are shown in FIG. 4. FIG. 4 is a conceptual diagram that illustrates operations for generating synthesized speech using a TTS component 180, according to embodiments of the present disclosure. The TTS component 180 may receive text data 415 and process it using one or more TTS model 480 to generate synthesized speech in the form of spectrogram data 445. A vocoder 490 may convert the spectrogram data 445 into output speech audio data 495, which may represent a time-domain waveform suitable for amplification and output as audio (e.g., from a loudspeaker).

The TTS component 180 may additionally receive other input data 425. The other input data 425 may include, for example, identifiers and/or labels corresponding to a desired speaker identity, voice characteristics, emotion, speech style, etc. desired for the synthesized speech. In some implementations, the other input data 425 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 415 and/or the other input data 425 such as metadata accompanying a TTS request and indicating what text should be whispered (or have some other indicated audio characteristic).

The TTS component 180 may include a preprocessing component 420 that can convert the text data 415 and/or other input data 425 into a form suitable for processing by the TTS model 480. The text data 415 may be from, for example an application, a skill component (described further below), an NLG component, another device or source, or may be input by a user. The text data 415 received by the TTS component 180 may not necessarily be text, but may include other data (such as symbols, code, other data, etc.) that may reference text (such as an indicator of a word and/or phoneme) that is to be synthesized. The preprocessing component 420 may transform the text data 415 into, for example, a symbolic linguistic representation, which may include linguistic context features such as phoneme data, punctuation data, syllable-level features, word-level features, and/or emotion, speaker, accent, or other features for processing by the TTS component 180. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 415, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 420 may include functionality and/or components for performing text normalization, linguistic analysis, linguistic prosody generation, or other such operations. During text normalization, the preprocessing component 420 may first process the text data 415 and generate standard text, converting such things as numbers, abbreviations (such as Apt., St., etc.), symbols ($, %, etc.) into the equivalent of written out words.

During linguistic analysis, the preprocessing component 420 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 480 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 420 may also identify different grammatical components such as prefixes, suffixes, phrases, punctuation, syntactic boundaries, or the like. Such grammatical components may be used by the TTS component 180 to craft a natural-sounding audio waveform output. The language dictionary may also include letter-to-sound rules and other tools that may be used to pronounce previously unidentified words or letter combinations that may be encountered by the TTS component 180. Generally, the more information included in the language dictionary, the higher quality the speech output.

The output of the preprocessing component 420 may be a symbolic linguistic representation, which may include a sequence of phonetic units. In some implementations, the sequence of phonetic units may be annotated with prosodic characteristics. In some implementations, prosody may be applied in part or wholly by a TTS model 480. This symbolic linguistic representation may be sent to the TTS model 480 for conversion into audio data (e.g., in the form of Mel-spectrograms or other frequency content data format).

The TTS component 180 may retrieve one or more previously trained and/or configured TTS models 480 from the voice profile storage 485. A TTS model 480 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 480 may be stored in the voice profile storage 485. A TTS model 480 may represent a particular speaker identity and may be conditioned based on speaking style, emotion, etc. In some implementations, a particular speaker identity may be associated with more than one TTS model 480; for example, with a different model representing a different speaking style, language, emotion, etc. in some implementations, a particular TTS model 480 may be associated with more than one speaker identity; that is, be able to produce synthesized speech that reproduces voice characteristics of more than one character. Thus a first TTS model 480 may be used to create synthesized speech for the first system component 120*a* while a second, different, TTS model 480 may be used to create synthesized speech for the second system component 120*b*. For example a synthesized voice of the first system component 120*a* may be different from a synthesized voice of the second system component 120*b*. In some cases, the TTS model 480 may generate the desired voice characteristics based on conditioning data received or determined from the text data 415 and/or the other input data 425. For example, in the case where the other input data 425 corresponds to the synthetic voice characteristics data 130, the TTS model 480 may generate the desired customized synthetic voice for the user 105 based on the synthetic voice characteristics included in the synthetic voice characteristics data.

The TTS component 180 may, based on an indication received with the text data 415 and/or other input data 425, retrieve a TTS model 480 from the voice profile storage 485 and use it to process input to generate synthesized speech. The TTS component 180 may provide the TTS model 480 with any relevant conditioning labels to generate synthesized speech having the desired voice characteristics. The TTS model 480 may generate spectrogram data 445 (e.g., frequency content data) representing the synthesized speech, and send it to the vocoder 490 for conversion into an audio signal.

The TTS component 180 may generate other output data 455. The other output data 455 may include, for example, indications or instructions for handling and/or outputting the synthesized speech. For example, the text data 415 and/or other input data 425 may be received along with metadata, such as SSML tags, indicating that a selected portion of the text data 415 should be louder or quieter. Thus, the other output data 455 may include a volume tag that instructs the vocoder 490 to increase or decrease an amplitude of the output speech audio data 495 at times corresponding to the selected portion of the text data 415. Additionally or alternatively, a volume tag may instruct a playback device to raise or lower a volume of the synthesized speech from the device's current volume level, or lower a volume of other media being output by the device (e.g., to deliver an urgent message).

The vocoder 490 may convert the spectrogram data 445 generated by the TTS model 480 into an audio signal (e.g., an analog or digital time-domain waveform) suitable for amplification and output as audio. The vocoder 490 may be, for example, a universal neural vocoder based on Parallel WaveNet or related model. The vocoder 490 may take as input audio data in the form of, for example, a Mel-spectrogram with 80 coefficients and frequencies ranging from 50 Hz to 12 kHz. The output speech audio data 495 may be a time-domain audio format (e.g., pulse-code modulation (PCM), waveform audio format (WAV), µ-law, etc.) that may be readily converted to an analog signal for amplification and output by a loudspeaker. The output speech audio data 495 may consist of, for example, 8-, 16-, or 24-bit audio having a sample rate of 16 kHz, 24 kHz, 44.1 kHz, etc. In some implementations, other bit and/or sample rates may be used.

The orchestrator component 124 may send (at arrow 4) the output audio data 134 to the device 110 for output to the user 105.

In some embodiments, the output audio data 134 may be output to the user 105 via the GUI. For example, the GUI may include additional elements that allow the user 105 to listen to the output audio data 134. The GUI may further include one or more elements that allow the user 105 to input text which may be subsequently output as being spoken by the customized synthetic voice. For example, the GUI may determine a user input corresponding to the input text provided by the user 105, which may be sent to the TTS component 180 to generate additional output audio data corresponding to synthesized speech of input text being spoken by the customized synthetic voice. The additional output audio data may be sent to the device 110 for output to the user 105 via the GUI.

In some embodiments, the output audio data 134 may be output to the user 105 via one or more speakers of/associated with (e.g., a wired/wireless pairing to) the device 110.

Thereafter, the user 105 may provide an additional user input to the device 110, and the device 110 may generate and send (at arrow 5), to the system component(s) 120, input data 136 corresponding to the user input. The user input may be, for example, responsive to the output of the output audio data 134. In some embodiments, the user input may correspond to the user 105 providing some feedback with respect to the customized synthetic voice corresponding to the output audio data 134. For example, the user input may correspond to a score (e.g., 1-5, 1-7, 1-10, etc.) given to the customized synthetic voice by the user 105 which represents how satisfied the user 105 is with the customized synthetic voice. For further example, the user input may correspond to a natural language user input describing whether the user 105 is or is not satisfied with the customized synthetic voice. For further example, the user input may correspond to a natural language user input describing why the user 105 is or is not satisfied with the customized synthetic voice and/or describing how the system 100 may improve the customized synthetic voice for the user 105. In some embodiments, the input data 136 may include image data corresponding to a reaction of the user 105 in response to output of the output audio data 134 (e.g., facial expression, pupil dilation, gesture, etc.). In such embodiments, the system 100 may be configured to convert the image data to a corresponding score (e.g., 1-5). For example, if the system 100 determines (e.g., based on a facial expression, pupil dilation, gesture, etc.) that the image data corresponds to a positive (e.g., happy) reaction of the user 105 to the output audio data 134, then the system 100 may determine that the image data corresponds to a score of 4 or 5. For further example, if the system 100 determines that the image data corresponds to a negative reaction (e.g., sad, angry, upset, etc.) of the user 105 to the output audio data 134, then the system 100 may determine that the image data corresponds to a score of 2 or 3.

Figure 2B:
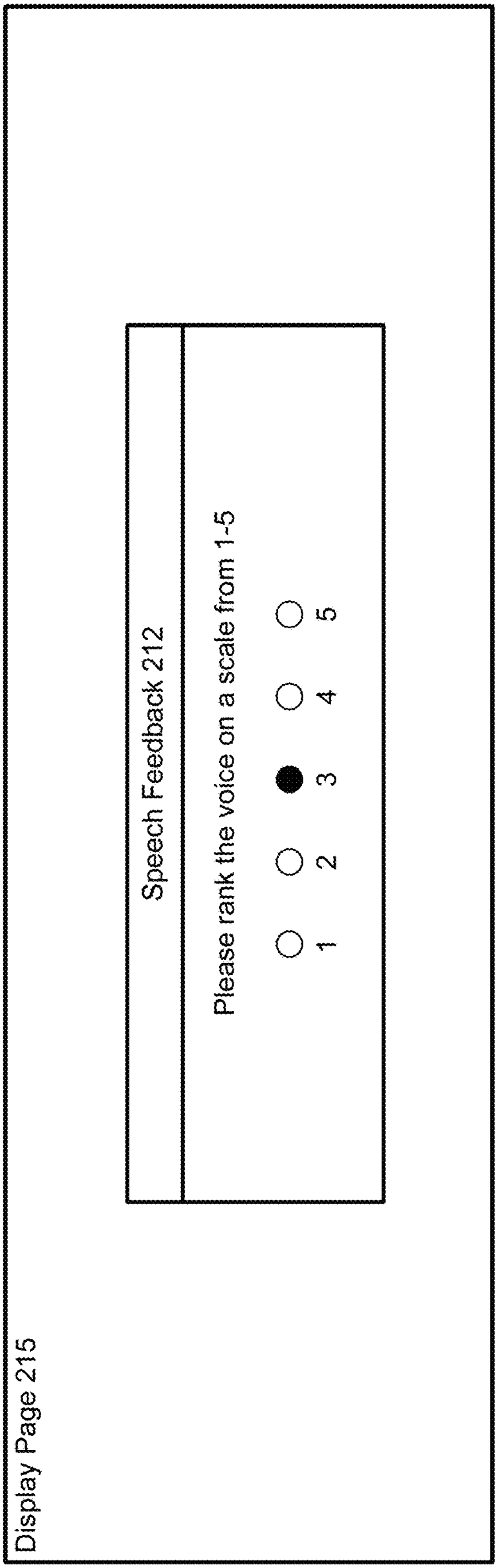
FIG. 2B illustrates a user interface comprising elements corresponding to a score associated with a customized synthetic voice presented to the user, according to embodiments of the present disclosure.

For further example, the user input may correspond to one or more elements displayed by the GUI. For example, as illustrated in FIG. 2B, the GUI may further display, on the display page 215 of the device 110, additional elements corresponding to a score of the customized synthetic voice presented to the user 105. The additional elements of the GUI may correspond to speech feedback 212, and may include one or more radio buttons corresponding to a score of the customized synthetic voice. For example, a first radio button may correspond to a score of "1", a second radio button may correspond to a score of "2," etc.

For further example, in some embodiments, the synthetic voice generation component 128 may be configured to generate more than one instance of synthetic voice characteristics data 130 corresponding to more than one customized synthetic voice. The TTS component 180 may generate, using the more than one instance of synthetic voice characteristics data, more than one instance of output audio data 134, and the orchestrator component 124 may send the more than one instance of output audio data 134 to the device 110 to the user 105 for output. In such embodiments, the input data 136 may correspond to the user 105 indicating a preference for one or more of customized synthetic voices over the other customized synthetic voices. In such embodiments, for further example, the user input may correspond to any of the examples provided herein above (e.g., a score, a description, image data, etc.). In some embodiments, the TTS component 180 may also generate output audio data 134 which corresponds to a request for the user 105 to rank the more than one customized synthetic voice, in which case the input data 136 may correspond to the user 105 ranking the more than one customized synthetic voice in an order from most satisfactory to least satisfactory, or the like.

The system component(s) 120 may receive, at the orchestrator component 124, the input data 136 representing the user input. The orchestrator component 124 may determine, using the input data 136, user input data 138 representing the input data 136. As described above, the user input data 138 may include ASR output data, NLU output data, etc.

In the situation where the input data 136 includes image data, the system component(s) 120 may process the image data using a sentiment detection component 875 that may be configured to detect a sentiment of the user 105 in the image data. For example, if the output of the sentiment detection component 875 corresponds to an indication of the user 105 being happy, then the system component(s) may determine a score of 4 or 5 for the customized synthetic voice presented to the user 105. For further example, if the output of the sentiment detection component 875 corresponds to an indication of the user 105 being sad, then the system component(s) may determine a score of 2 or 3 for the customized synthetic voice presented to the user.

In the situation where the input data 136 includes data corresponding to a selected element(s) of the GUI, the user input data 138 may include a representation of the selected element(s) of the GUI.

The orchestrator component 124 may send (at arrow 6) the user input data 138 to the synthetic voice generation component 128.

The synthetic voice generation component 128 processes the user input data 138 to generate synthetic voice characteristics data 140 corresponding to an updated customized synthetic voice that is personalized to the user 105. In some embodiments, the updated customized synthetic voice is generated based on the synthetic voice characteristics data 130 and the user input data 138 representing the user's 105 feedback corresponding to the customized synthetic voice represented in the output audio data 134. Processing of the user input data 138 by the synthetic voice generation component 128 to determine the synthetic voice characteristics data 140 corresponding to the updated customized synthetic voice is described in detail herein below with respect to FIG. 5.

Figure 5:
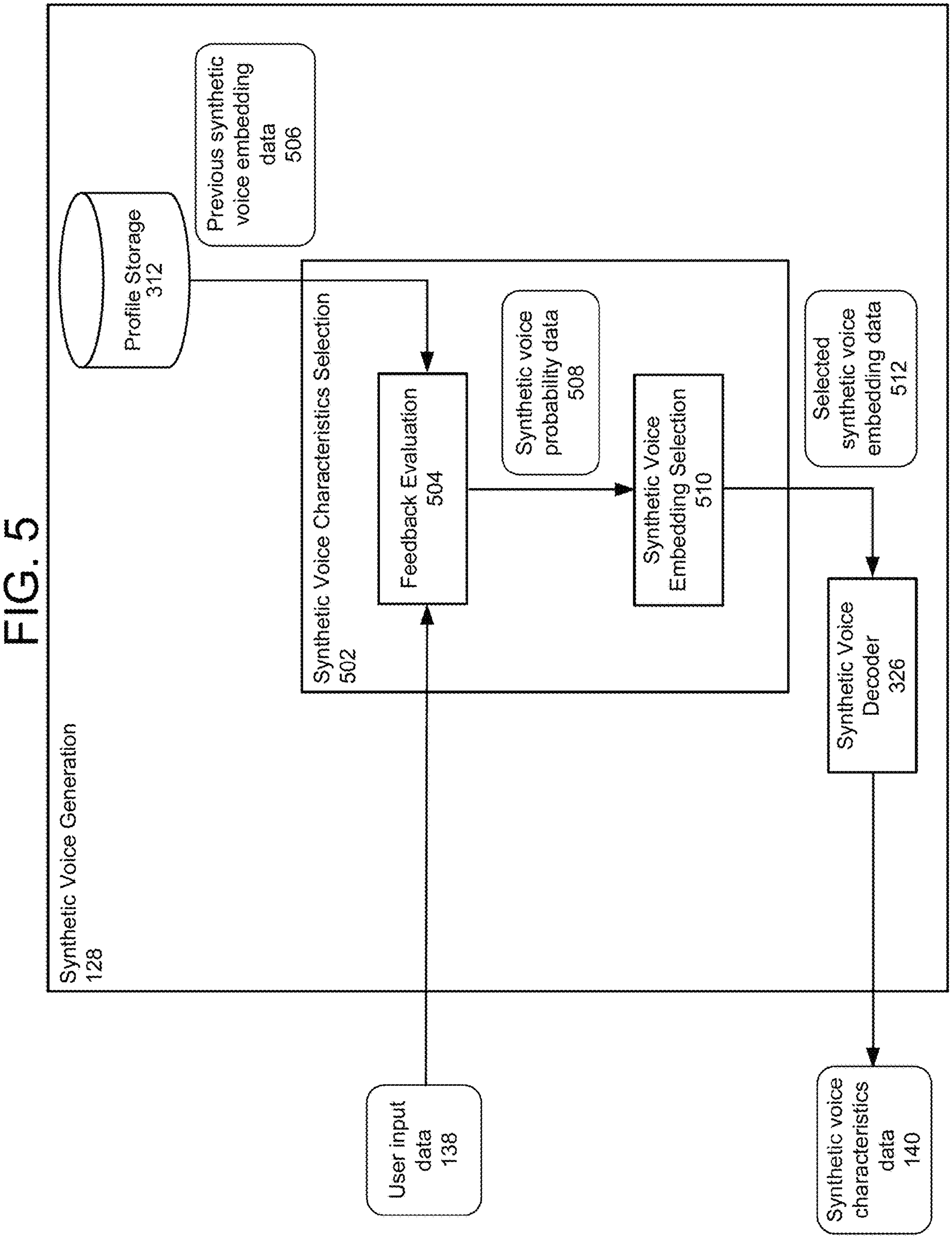
FIG. 5 is a conceptual diagram illustrating example components of and processing that may be performed by a synthetic voice generation component of the system during one or more subsequent iterations of customized synthetic voice generation, according to embodiments of the present disclosure.

FIG. 5 illustrates further example processing that may be performed by the synthetic voice generation component 128 during a subsequent interaction of customized synthetic voice generation. A subsequent interaction of customized synthetic voice generation may correspond to an iteration of customized synthetic voice generated performed after a user 105 has been presented with a customized synthetic voice, and has provided feedback corresponding to the customized synthetic voice. As shown in FIG. 5, the synthetic voice generation component 128 may further include a synthetic voice characteristics selection component 502, which may include a feedback evaluation component 504 and a synthetic voice embedding selection component 510.

The synthetic voice generation component 128 may receive the user input data 138 at the feedback evaluation component 504 of the synthetic voice characteristics selection component 502.

In some embodiments, the orchestrator component 124 may track the current iteration of customized synthetic voice generation for the user 105, and, based on the current iteration, send the user input data 138 to the proper component (e.g., the synthetic voice initialization component 328 or the synthetic voice characteristics selection component 502). For example, if the orchestrator component 124 determines the current iteration of voice selection for the user 105 is an initial (e.g., first) iteration, then the orchestrator component 124 may send user input data (e.g., the user input data 126) to the synthetic voice initialization component 328, and the synthetic voice generation component 128 may process as described above in connection with FIG. 3. If, on the other hand, the orchestrator component 124 determines the current iteration of customized synthetic voice generation for the user 105 is a subsequent (second, third, fourth, etc.) iteration, then the orchestrator component 124 may send user input data (e.g., the user input data 138) to the synthetic voice characteristics selection component 502, and the synthetic voice generation component 128 may process as described herein below in connection with FIG. 5.

The feedback evaluation component 504 receives the user input data 138, and may query the profile storage 312 for previous synthetic voice embedding data 506 corresponding to the user 105. As described above, in connection with the profile encoder 308 illustrated in FIG. 3, the feedback evaluation component 504 may query the profile storage 312 for the previous synthetic voice embedding data 506 (directly or indirectly via the orchestrator component 124) using a user identifier corresponding to the user 105. The feedback evaluation component 504 may receive the user identifier directly from the user recognition component 895 or indirectly from the orchestrator component 124.

In some embodiments, the previous synthetic voice embedding data 506 may correspond to synthetic voice embedding data (e.g., the selected synthetic voice embedding data 324) generated by the synthetic voice generation component 128 in a previous iteration of customized synthetic voice generation for the user 105. For example, if the previous iteration of customized synthetic voice generation corresponds to the initial (e.g., first) iteration of customized synthetic voice generation for the user 105, then the previous synthetic voice embedding data 506 may correspond to synthetic voice embedding data generated by the profile comparison component 318 (e.g., the selected synthetic voice embedding data 324). For further example, if the previous iteration of voice selection corresponds to a subsequent (e.g., second, third, fourth, etc.) iteration of customized synthetic voice generation for the user 105, then the previous synthetic voice embedding data 506 may correspond to synthetic voice embedding data generated by the synthetic voice characteristics selection component 502.

The feedback evaluation component 504 may be configured to take as input the user input data 138 and the previous synthetic voice embedding data 506 and generate synthetic voice probability data 508 with respect to the synthetic voice embedding space. As stated above, the synthetic voice embedding space may include a plurality of synthetic voice embedding data. In some embodiments, the synthetic voice probability data may correspond to a prior probability distribution (prior) with respect to the synthetic voice embedding space. The synthetic voice probability data 508 may correspond to one or more probabilities, and may represent one or more predictions as to how satisfied the user 105 will be with a customized synthetic voice generated using synthetic voice characteristics corresponding to one or more instances of synthetic voice embedding data of the plurality of synthetic voice embedding data. For example, a prior corresponding to a plurality of synthetic voice embedding data may be "(<SyntheticVoiceEmbeddingDataA>, [0.6]), (<SyntheticVoiceEmbeddingDataB>, [0.3]), (<SyntheticVoiceEmbeddingDataC), [0.1])." The feedback evaluation component 504 may send the synthetic voice probability data 508 to the synthetic voice embedding selection component 510.

The synthetic voice embedding selection component 510 may be configured to take as input the synthetic voice probability data 508 and generate selected synthetic voice embedding data 512 corresponding to one or more instances of synthetic voice embedding data sampled (e.g. selected) from the plurality of synthetic voice embedding data of the synthetic voice embedding space.

In some embodiments, the synthetic voice embedding selection component 510 may rank the plurality of synthetic voice embedding data based on the synthetic voice probability data 508, and may select one or more (top-n) top-ranked instances of synthetic voice embedding data to generate the selected synthetic voice embedding data 512.

In some embodiments, the synthetic voice embedding selection component 510 may select more than one instance of synthetic voice embedding data of the plurality of synthetic voice embedding data. In such embodiments, the synthetic voice embedding selection component 510 may generate the selected synthetic voice embedding data 512 by interpolating between the points/regions corresponding to the more than one instance of synthetic voice embedding data in the synthetic voice embedding space (e.g., by determining an average of the corresponding values of the points corresponding to the more than one instances of synthetic voice embedding data), and may send the selected synthetic voice embedding data 512 to the synthetic voice decoder 326.

In some embodiments, interpolating between the points/regions corresponding to the more than one instance of synthetic voice embedding data may result in the generation of synthetic voice embedding data (e.g., the selected synthetic voice embedding data 512) that is not represented by a point in the synthetic voice embedding space. In other words, the resulting selected synthetic voice embedding data 512 may correspond to synthetic voice characteristics corresponding to a customized synthetic voice not represented in the synthetic voice embedding space (e.g., a new synthetic voice).

In some embodiments, the synthetic voice characteristics selection component 502 may be configured to generate the selected synthetic voice embedding data 512 using one or more Bayesian approaches. For example, the synthetic voice characteristics selection component 502 may be configured to use Bayesian optimization techniques to generate the selected synthetic voice embedding data 512 using the user input data 138 and the previous synthetic voice embedding data 506.

As discussed above, in connection with FIG. 3, the synthetic voice decoder 326 may process the selected synthetic voice embedding data 512 to determine synthetic voice characteristics data 140 corresponding to the selected synthetic voice embedding data 512. For example, the synthetic voice decoder 326 may determine the point or region in the synthetic voice embedding space that the selected synthetic voice embedding data 512 corresponds to, and may determine the synthetic voice characteristics data 140 based on the corresponding speaker characteristics that the point and/or region of the synthetic voice embedding space represents. The synthetic voice decoder 326 may send the synthetic voice characteristics data 140 to the orchestrator component 124.

As discussed above, the synthetic voice generation component 128 may be configured to store data (e.g., the user input data 138, the selected synthetic voice embedding data 512, the synthetic voice probability data 508, etc.), generated/determined by the synthetic voice characteristics selection component 502 during the current iteration of processing, in the profile storage 312, where the data is stored in associated with the profile associated with the user 105.

As discussed above, in some embodiments, the synthetic voice generation component 128 may cause the data to be stored in the voice profile storage 485 in association with a profile associated with the user 105.

In some embodiments, the system 100 may be configured to assign a customized synthetic voice to only a particular user 105, such that a subsequent user may not have the same customized synthetic voice associated with/assigned to them (e.g., stored in association with a profile associated with the subsequent user). In such embodiments, the synthetic voice characteristics selection component 502 may be configured to process the selected synthetic voice embedding data 324 generated by the synthetic voice initialization component 328 during the initial iteration of synthetic voice selection. For example, the profile comparison component 318 may send the selected synthetic voice embedding data 324 to the feedback evaluation component 504 of the synthetic voice characteristics selection component 502. The synthetic voice characteristics selection component 502 may process as described above in connection with FIG. 5, except that the feedback evaluation component 504 may take as input the selected synthetic voice embedding data 324 and determine the synthetic voice probability data 508 accordingly. Further, the synthetic voice embedding selection component 510 may be configured to implement the synthetic voice probability data 508 as discussed above with respect to FIG. 5, but such that the generated selected synthetic voice embedding data 512 does not correspond to a customized synthetic voice that is associated with/assigned to one of the additional users and/or profiles associated with the additional users. For example, the synthetic voice embedding selection component 510 may be further configured to compare the selected synthetic voice embedding data 512 to the synthetic voice embedding data associated with the additional users and/or profiles associated with the additional users. If a match is determined, the synthetic voice embedding selection component 510 may generate new selected synthetic voice embedding data 512 (e.g., by sampling the next top-ranked synthetic voice embedding data represented in the synthetic voice probability data 508, not sampling one of the top-ranked instances of synthetic voice embedding data used to generate the selected synthetic voice embedding data 512, or the like).

Referring once more to FIG. 1, the synthetic voice generation component 128 may send (at arrow 6) the synthetic voice characteristics data 140 to the orchestrator component 124. In some embodiments, the synthetic voice generation component 128 may also generate and send text data representing speech that is to be synthesized using the synthetic voice characteristics data 140 to the orchestrator component 124.

The orchestrator component 124 may send (at arrow 7) the synthetic voice characteristics data 140 to the TTS component 180.

The TTS component 180 processes the synthetic voice characteristics data 140 (and the text data) and generates output audio data 142 representing synthesized speech spoken by the customized synthetic voice corresponding to the synthetic voice characteristics data 140. For example, as discussed above in connection with FIG. 1, in some embodiments, the TTS component 180 may take the synthetic voice characteristics data 140 as input (e.g., as other input data 425), in order to generate the desired voice characteristics of the customized synthetic voice using a TTS model 480. The TTS component 180 may send (at arrow 7) the output audio data 142 to the orchestrator component 124.

The orchestrator component 124 may send (at arrow 8) the output audio data 142 to the device 110 for output to the user 105.

In some embodiments, one or more subsequent iterations of interaction between the user 105 and the system 100, for customized synthetic voice generation, may occur after sending the output audio data 142 to the device 110. In some embodiments, the system component(s) 120 may receive input data representing that the user 105 is satisfied with the customized synthetic voice represented in the output audio data 142, in which case the processing with respect to the customized synthetic voice generation may cease. In such embodiments, in response to the user's 105 indicated satisfaction, the synthetic voice generation component 128 may assign the customized synthetic voice to the user 105 and/or a profile associated with the user 105. For example, the synthetic voice generation component 128 may store synthetic voice embedding data representing the speaker characteristics corresponding to the customized synthetic voice (e.g., selected synthetic voice embedding data) in the profile storage 312. The synthetic voice generation component 128 may store the synthetic voice embedding data in association with the profile of the user 105, and may store data indicating that the synthetic voice embedding data represents the final customized synthetic voice corresponding to the user 105. For further example, the synthetic voice generation component 128 may store data in the profile associated with the user which indicates that the selected synthetic voice embedding data of the previous iteration of customized synthetic voice generation corresponds to the final customized synthetic voice.

Figure 6B:
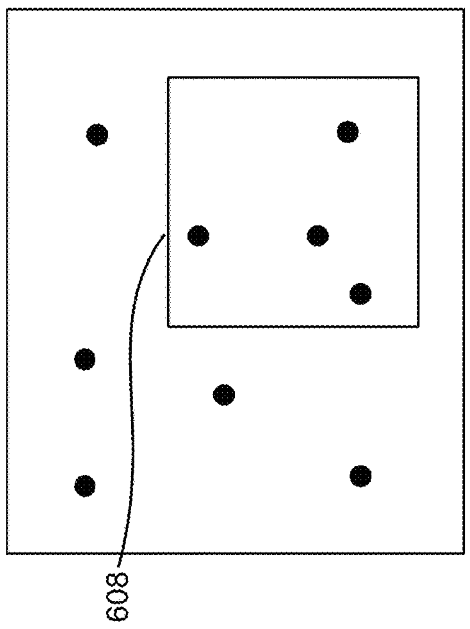
FIGS. 6A-6C illustrate example representations of a synthetic voice embedding space as the system generates user-customized synthetic voices through one or more iterations of interaction between a user and the system, according to embodiments of the present disclosure.
Figure 6A:
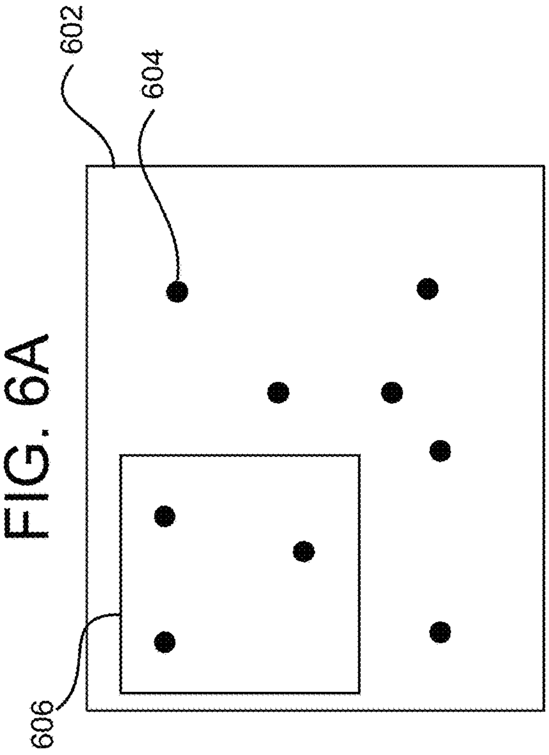
Figure 6C:
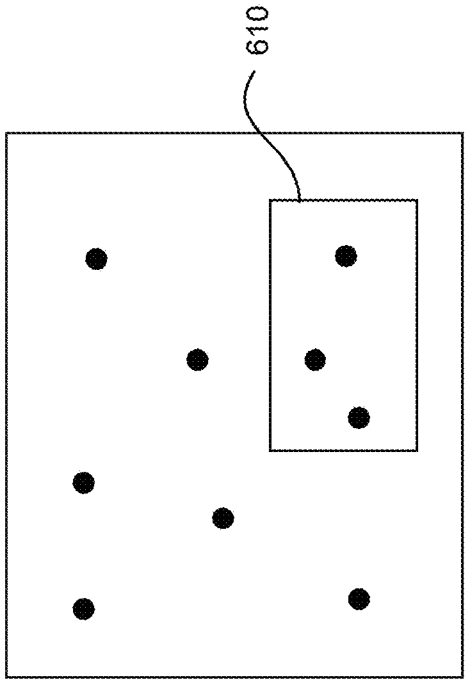

FIGS. 6A-6C illustrate example representations of the synthetic voice embedding space as the system 100 generates the customized synthetic voice through one or more iterations of customized synthetic voice generation between the user 105 and the system 100.

FIG. 6A illustrates an example representation of a synthetic voice embedding space 602 during an iteration of customized synthetic voice generation between the user 105 and the system 100. Referring to FIG. 6A, the synthetic voice embedding space 602 may include one or more points 604 representing one or more instances of synthetic voice embedding data. FIG. 6A also illustrates (e.g., as the bounding box 606) the synthetic voice generation component 128 sampling (e.g., selecting) one or more points 604 of the synthetic voice embedding space 602 to generate selected synthetic voice embedding data (e.g., the selected synthetic voice embedding data 324, 512) during an iteration of interaction between the user 105 and the system 100 (e.g., as discussed above, in connection with FIG. 5). In some embodiments, the bounding box 606 may represent the synthetic voice embedding selection component 510 implementing the synthetic voice probability data 508, generated by the feedback evaluation component 504, to sample the top-ranked instances of synthetic voice embedding data in the synthetic voice embedding space 602 and to generate the selected synthetic voice embedding data (e.g., the selected synthetic voice embedding data 324, 512).

FIG. 6B illustrates an example representation of the synthetic voice embedding space 602 during an iteration of customized synthetic voice generation between the user 105 and the system 100 that is subsequent to the iteration of customized synthetic voice generation discussed in FIG. 6A. For example, after presenting output audio data (e.g., the output audio data 134) generated using synthetic voice characteristics corresponding to the selected synthetic embedding data generated in the iteration of customized synthetic voice generation associated with FIG. 6A, the system component(s) may receive input data (e.g., the input data 136) representing feedback from the user 105 with respect to the customized synthetic voice corresponding to the output audio data. The system component(s) 120 may determine that the feedback corresponds to a negative reaction (e.g., a low score, a natural language description of dissatisfaction, image data representing the user 105 is sad, angry, frustrated, etc.) Based on determining that the feedback corresponds to negative feedback, the synthetic voice generation component 128 may generate selected synthetic voice embedding data that is different from the previously selected synthetic voice embedding data to a particular degree (e.g., based on how negative the feedback from the user 105 was). For example, based on the feedback corresponding to a negative reaction (e.g., a score of 2 out of 5), the feedback evaluation component 504 may determine an updated prior (e.g., the synthetic voice probability data 508) that includes probabilities that favor points 604 in the synthetic voice embedding space 602 (e.g., the points 604 within the bounding box 608) that are dissimilar to the points 604 sampled in the previous iteration of customized synthetic voice selection for the user 105 (e.g., the points 604 within the bounding box 606). As such, in some embodiments, the bounding box 608 may represent the synthetic voice embedding selection component 510 implementing the updated prior to determine the new top-ranked instance of synthetic voice embedding data in the synthetic voice embedding space 602, and to generate the selected synthetic voice embedding data (e.g., the selected synthetic voice embedding data 512).

FIG. 6C illustrates an example representation of the synthetic voice embedding space 602 during an iteration of customized synthetic voice generation between the user 105 and the system 100 that is subsequent to the iteration of customized synthetic voice generation discussed in FIG. 6B. For example, after presenting output audio data (e.g., the output audio data 134) generated using synthetic voice characteristics corresponding to the selected synthetic embedding data generated in the iteration of customized synthetic voice generation associated with FIG. 6B, the system component(s) may receive input data (e.g., the input data 136) representing feedback from the user 105 with respect to the customized synthetic voice corresponding to the output audio data. The system component(s) 120 may determine that the feedback represents that the user 105 is at least partially satisfied with the customized synthetic voice, but that user 105 was also partially dissatisfied. Based on determining that the user 105 is only partially satisfied with the customized synthetic voice, the synthetic voice generation component 128 may generate selected synthetic voice embedding data that is at least partially different from the previously selected synthetic voice embedding data (e.g., based on how dissatisfied the user 105 was). For example, based on the feedback (e.g., a score of 5 out of 7), the feedback evaluation component 504 may determine an updated prior (e.g., the synthetic voice probability data 508) that includes probabilities that partially favor points 604 in the synthetic voice embedding space 602 (e.g., the points 604 within the bounding box 610) that are similar to the points 604 sampled in the previous iteration of customized synthetic voice selection for the user 105 (e.g., the points 604 within the bounding box 608), but may also partially disfavor other points 604 sampled in the previous iteration of customized synthetic voice selection. As such, in some embodiments, the bounding box 610 may represent the synthetic voice embedding selection component 510 implementing the updated prior to determine the new top-ranked instance of synthetic voice embedding data in the synthetic voice embedding space 602 and to generate the selected synthetic voice embedding data (e.g., the selected synthetic voice embedding data 512). As illustrated in FIG. 6C, the points 604 within the bounding box 610 only includes a portion of the points 604 that were within the bounding box 608 in the previous iteration of customized synthetic voice generation.

Figure 7A:
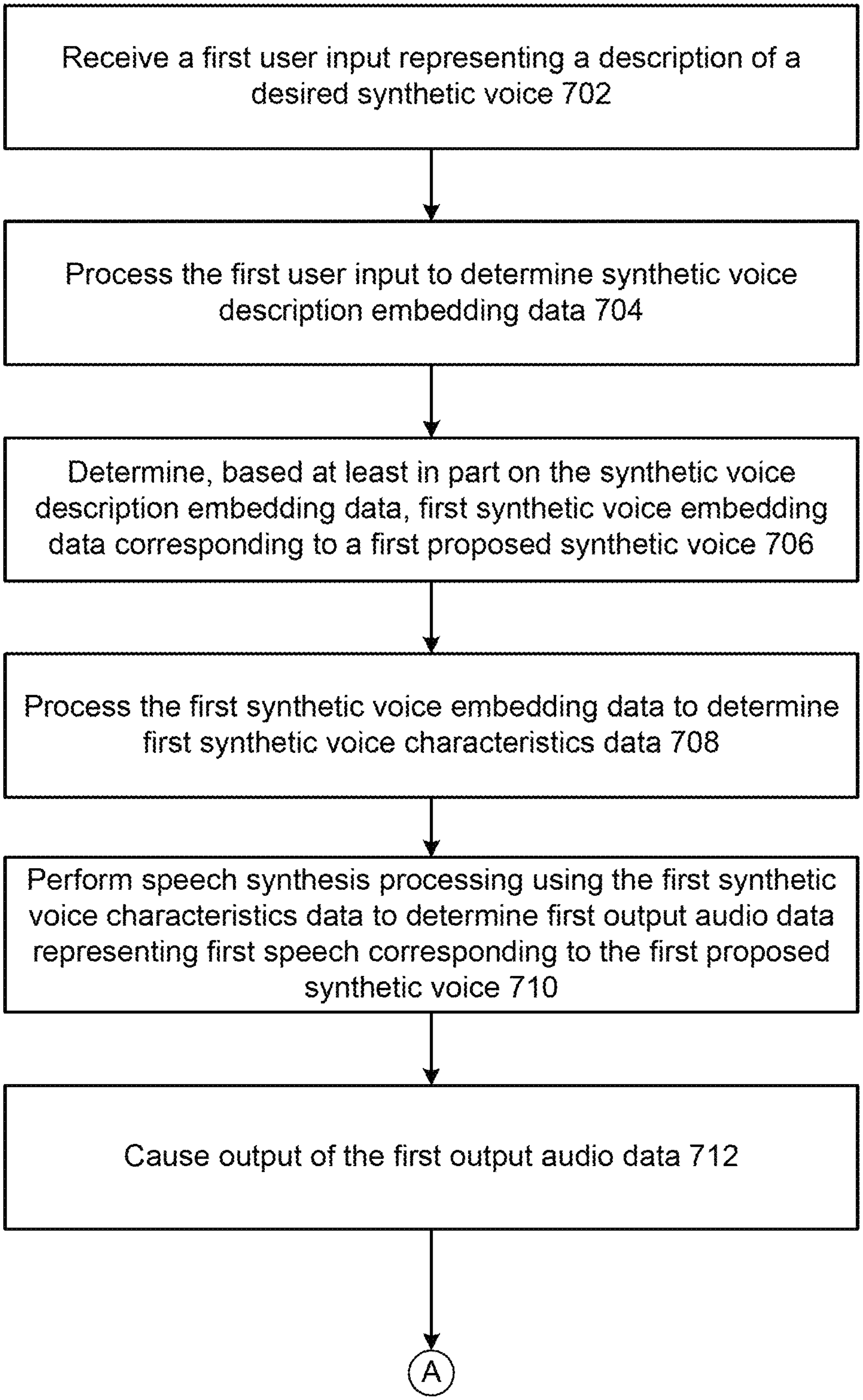
FIGS. 7A-7B is an example flowchart illustrating example processing that may be performed by the system to generate user-customized synthetic voices, according to embodiments of the present disclosure.
Figure 7B:
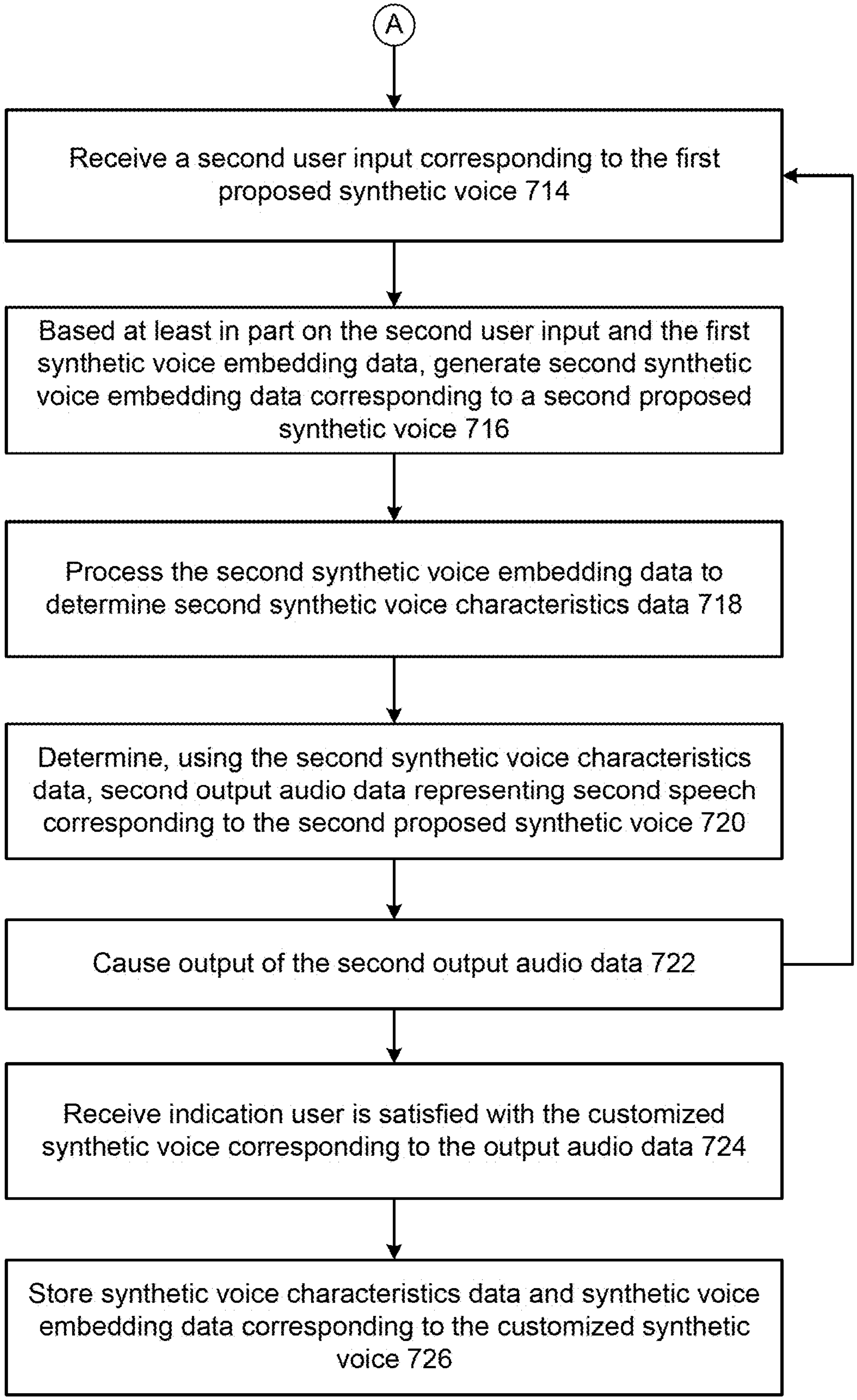

FIGS. 7A-7B are an example flowchart illustrating processing that may be performed by the system 100 to generate user-customized synthetic voices.

As illustrated in FIG. 7A, the system 100 may receive (702) a first user input representing a description of a desired synthetic voice, as discussed above in connection with the input data 122 of FIG. 1.

The system 100 may process (704) the first user input to determine synthetic voice description embedding data, as discussed above in connection with the synthetic voice description encoder 302 of FIG. 3.

The system 100 may determine (706), based at least in part on the synthetic voice description embedding data, first synthetic voice embedding data corresponding to a first proposed synthetic voice, as discussed above in connection with the profile comparison component 318 of FIG. 3.

The system 100 may process (708) the first synthetic voice embedding data to determine first synthetic voice characteristics data, as discussed above in connection with the synthetic voice decoder 326 of FIG. 3.

The system 100 may perform (710) speech synthesis processing using the first synthetic voice characteristics data to determine first output audio data representing first speech corresponding to the first proposed synthetic voice, as discussed above in connection with the TTS component 180 of FIGS. 1 and 4. Thereafter, the system 100 may cause (712) output of the first output audio data.

The system 100 may receive (714) a second user input corresponding to the first proposed synthetic voice, as explained above in connection with the input data 136 of FIG. 1.

As illustrated in FIG. 7B, the system 100 may, based at least in part on the second user input and the first synthetic voice embedding data, determine (716) second synthetic voice embedding data corresponding to a second proposed synthetic voice, as discussed above in connection with the synthetic voice characteristics selection component 502 of FIG. 5.

The system 100 may process (718) the second synthetic voice embedding data to determine second synthetic voice characteristics data, as discussed above in connection with the synthetic voice decoder 326 of FIGS. 3 and 5.

The system 100 may generate (720), using the second synthetic voice characteristics data, second output audio data representing second speech corresponding to the second proposed synthetic voice, as discussed above in connection with the TTS component of FIGS. 1 and 4. Thereafter, the system 100 may cause (722) output of the second output audio data.

The system 100 may repeat steps 714-722 until the system receives (724) an indication that the user 105 is satisfied with the customized synthetic voice corresponding to the output audio data. The system 100 may them store (726) synthetic voice characteristics data and synthetic voice embedding data corresponding to the customized synthetic voice in a profile associated with the user 105.

Figure 8:
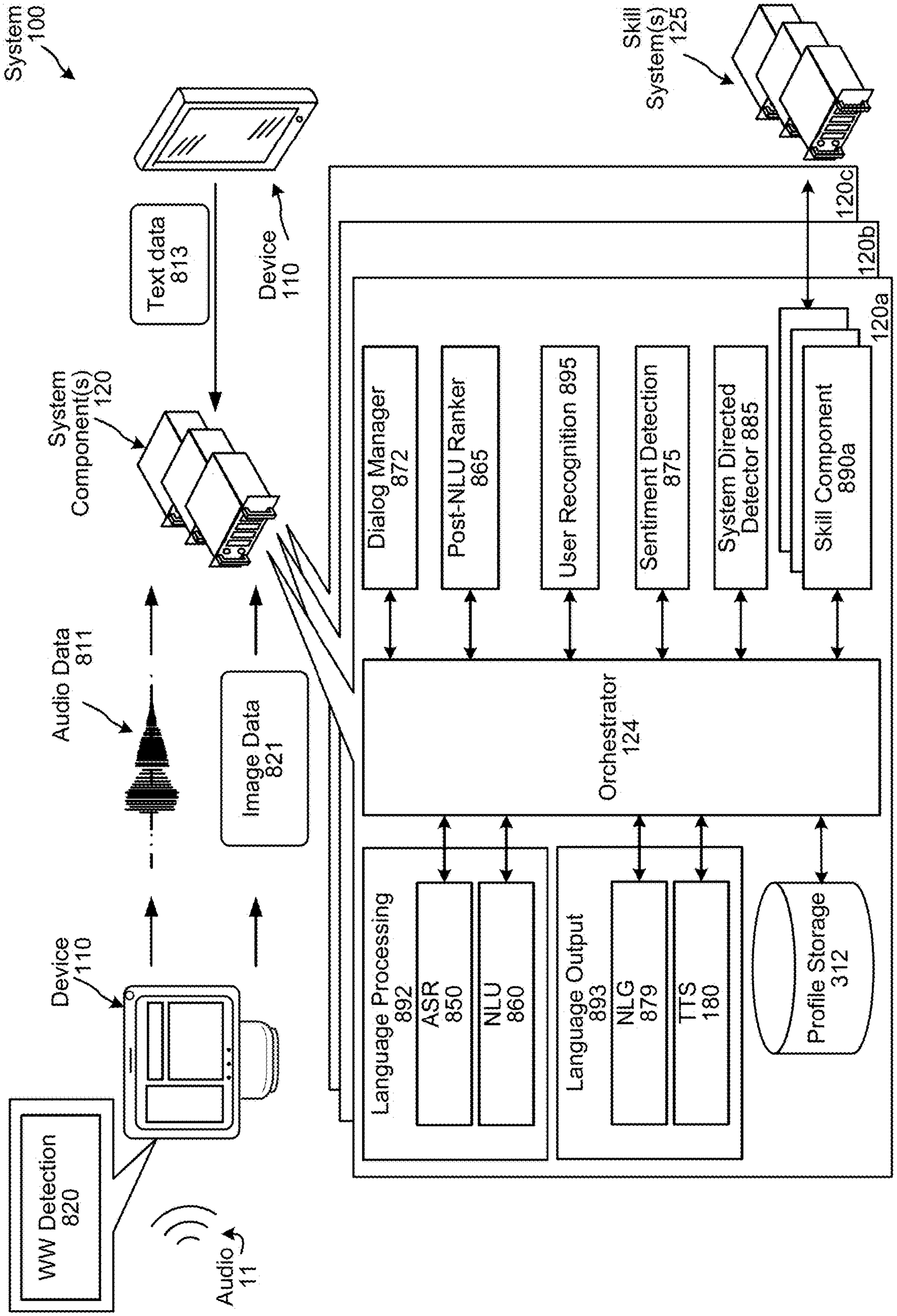
FIG. 8 is a conceptual diagram of components of the system, according to embodiments of the present disclosure.

The system 100 may operate using various components as described in FIG. 8. For example, the system 100 may operate to assist a user in selecting a TTS voice using a speech interface. The ultimately selected TTS voice may also be used as part of later interactions between user(s) and system 100. The various components of FIG. 8 may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system component(s) 120. In at least some embodiments, such determination may be made using a wakeword detection component 820. The wakeword detection component 820 may be configured to detect various wakewords. In at least some examples, each wakeword may correspond to a name of a different digital assistant. An example wakeword/digital assistant name is "Alexa." In another example, input to the system may be in form of text data 813, for example as a result of a user typing an input into a user interface of device 110. Other input forms may include indication that the user has pressed a physical or virtual button on device 110, the user has made a gesture, etc. The device 110 may also capture images using camera(s) 1518 of the device 110 and may send image data 821 representing those image(s) to the system component(s) 120. The image data 821 may include raw image data or image data processed by the device 110 before sending to the system component(s) 120. The image data 821 may be used in various manners by different components of the system to perform operations such as determining whether a user is directing an utterance to the system, interpreting a user command, responding to a user command, etc.

The wakeword detection component 820 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 820 and/or input is detected by an input detector, the device 110 may "wake" and begin transmitting audio data 811, representing the audio 11, to the system component(s) 120. The audio data 811 may include data corresponding to the wakeword; in other embodiments, the portion of the audio corresponding to the wakeword is removed by the device 110 prior to sending the audio data 811 to the system component(s) 120. In the case of touch input detection or gesture based input detection, the audio data may not include a wakeword.

In some implementations, the system 100 may include more than one system component(s) 120. The system component(s) 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 820 may result in sending audio data to system component(s) **120*a* for processing while detection of the wakeword "Computer" by the wakeword detector may result in sending audio data to system component(s) 120*b* for processing. The system may have a separate wakeword and system for different skills/systems (e.g., "Dungeon Master" for a game play skill/system component(s) 120*c*) and/or such skills/systems may be coordinated by one or more skill(s) 890 of one or more system component(s) 120**.

The device 110 may also include a system directed input detector 985. (The system component(s) 120 may also include a system directed input detector 885 which may operate in a manner similar to system directed input detector 985.) The system directed input detector 985 may be configured to determine whether an input to the system (for example speech, a gesture, etc.) is directed to the system or not directed to the system (for example directed to another user, etc.). The system directed input detector 985 may work in conjunction with the wakeword detection component 820. If the system directed input detector 985 determines an input is directed to the system, the device 110 may "wake" and begin sending captured data for further processing (for example, processing audio data using the language processing 892/992 or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 985 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 985 is determining whether an input is potentially device directed. For example, the system may output an orange indicator while considering an input, and may output a green indicator if a system directed input is detected. Other such configurations are possible.

Upon receipt by the system component(s) 120, the audio data 811 may be sent to an orchestrator component 124. The orchestrator component 124 may include memory and logic that enables the orchestrator component 124 to transmit various pieces and forms of data to various components of the system, as well as perform other operations as described herein.

The orchestrator component 124 may send the audio data 811 to a language processing component 892. The language processing component 892 (sometimes also referred to as a spoken language understanding (SLU) component) includes an automatic speech recognition (ASR) component 850 and a natural language understanding (NLU) component 860. The ASR component 850 may transcribe the audio data 811 into text data. The text data output by the ASR component 850 represents one or more than one (e.g., in the form of an N-best list) ASR hypotheses representing speech represented in the audio data 811. The ASR component 850 interprets the speech in the audio data 811 based on a similarity between the audio data 811 and pre-established language models. For example, the ASR component 850 may compare the audio data 811 with models for sounds (e.g., acoustic units such as phonemes, senons, phones, etc.) and sequences of sounds to identify words that match the sequence of sounds of the speech represented in the audio data 811. The ASR component 850 sends the text data generated thereby to an NLU component 860, via, in some embodiments, the orchestrator component 124. The text data sent from the ASR component 850 to the NLU component 860 may include a single top-scoring ASR hypothesis or may include an N-best list including multiple top-scoring ASR hypotheses. An N-best list may additionally include a respective score associated with each ASR hypothesis represented therein. The ASR component 850 is described in greater detail below with regard to FIG. 10.

The language processing component 892 may further include a NLU component 860. The NLU component 860 may receive the text data from the ASR component. The NLU component 860 may attempts to make a semantic interpretation of the phrase(s) or statement(s) represented in the text data input therein by determining one or more meanings associated with the phrase(s) or statement(s) represented in the text data. The NLU component 860 may determine an intent representing an action that a user desires be performed and may determine information that allows a device (e.g., the device 110, the system component(s) 120, a skill component 890, a skill system(s) 125, etc.) to execute the intent. For example, if the text data corresponds to "play the $5^{th}$ Symphony by Beethoven," the NLU component 860 may determine an intent that the system output music and may identify "Beethoven" as an artist/composer and "5th Symphony" as the piece of music to be played. For further example, if the text data corresponds to "what is the weather," the NLU component 860 may determine an intent that the system output weather information associated with a geographic location of the device 110. In another example, if the text data corresponds to "turn off the lights," the NLU component 860 may determine an intent that the system turn off lights associated with the device 110 or the user 5. However, if the NLU component 860 is unable to resolve the entity—for example, because the entity is referred to by anaphora such as "this song" or "my next appointment"—the language processing component 892 can send a decode request to another language processing component 892 for information regarding the entity mention and/or other context related to the utterance. The language processing component 892 may augment, correct, or base results data upon the audio data 811 as well as any data received from the other language processing component 892.

The NLU component 860 may return NLU results data 1285/1225 (which may include tagged text data, indicators of intent, etc.) back to the orchestrator component 124. The orchestrator component 124 may forward the NLU results data to a skill component(s) 890. If the NLU results data includes a single NLU hypothesis, the NLU component 860 and the orchestrator component 124 may direct the NLU results data to the skill component(s) 890 associated with the NLU hypothesis. If the NLU results data 1285/1225 includes an N-best list of NLU hypotheses, the NLU component 860 and the orchestrator component 124 may direct the top scoring NLU hypothesis to a skill component(s) 890 associated with the top scoring NLU hypothesis. The system may also include a post-NLU ranker 865 which may incorporate other information to rank potential interpretations determined by the NLU component 860. The local device 110 may also include its own post-NLU ranker 965, which may operate similarly to the post-NLU ranker 865. The NLU component 860, post-NLU ranker 865 and other components are described in greater detail below with regard to FIGS. 11 and 12.

A skill component may be software running on the system component(s) 120 that is akin to a software application. That is, a skill component 890 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 890. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 890 may operate in conjunction between the system component(s) 120 and other devices, such as the device 110, in order to complete certain functions. Inputs to a skill component 890 may come from speech processing interactions or through other interactions or input sources. A skill component 890 may include hardware, software, firmware, or the like that may be dedicated to a particular skill component 890 or shared among different skill components 890.

A skill support system(s) 125 may communicate with a skill component(s) 890 within the system component(s) 120 and/or directly with the orchestrator component 124 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 890 dedicated to interacting with the skill support system(s) 125. Unless expressly stated otherwise, reference to a skill, skill device, or skill component may include a skill component 890 operated by the system component(s) 120 and/or skill operated by the skill support system(s) 125. Moreover, the functionality described herein as a skill or skill may be referred to using many different terms, such as an action, bot, app, or the like. The skill 890 and or skill support system(s) 125 may return output data to the orchestrator component 124.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

Figure 9:
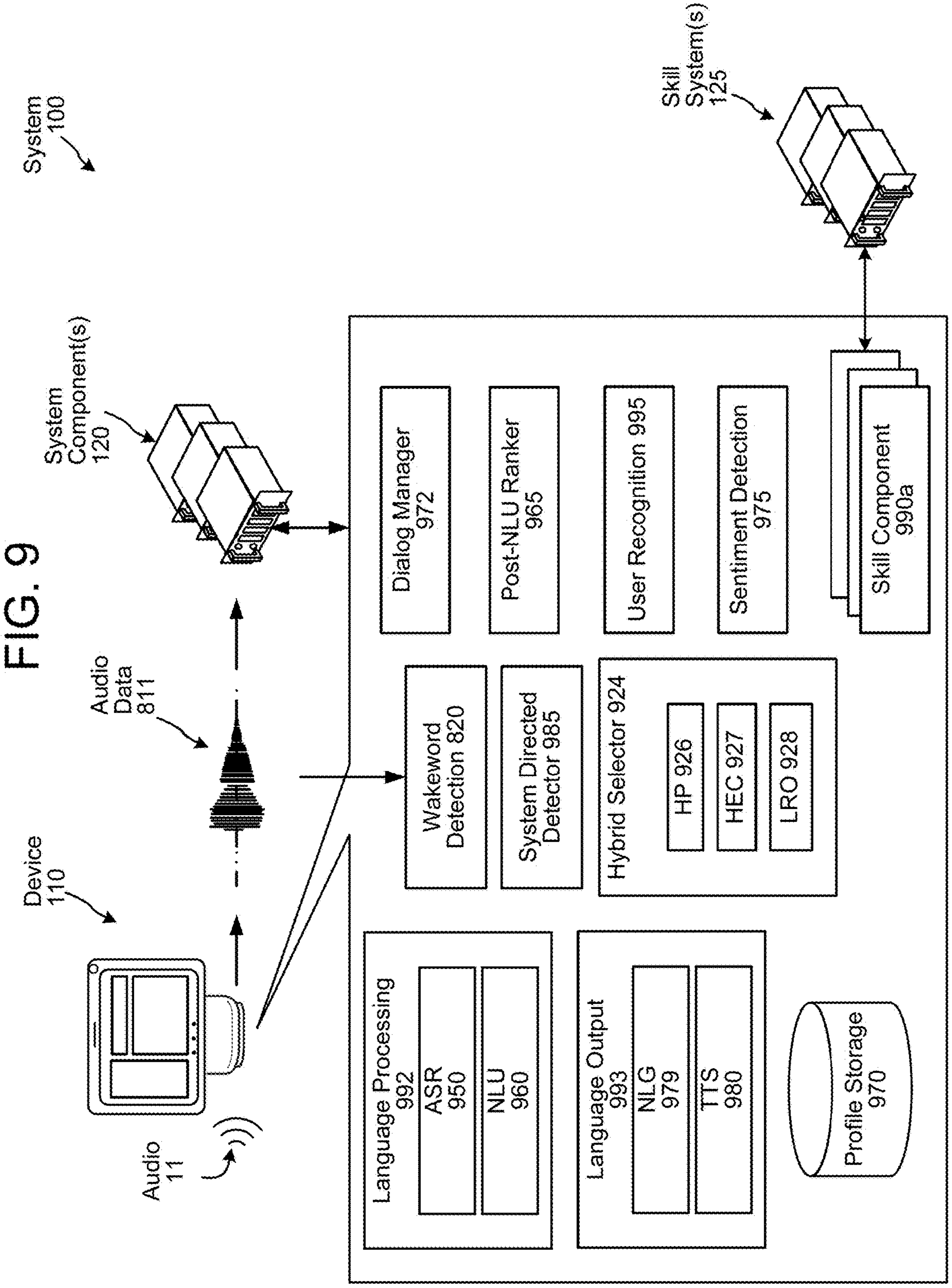
FIG. 9 is a conceptual diagram illustrating components that may be included in a device, according to embodiments of the present disclosure.

The system(s) 100 may include a dialog manager component 872 that manages and/or tracks a dialog between a user and a device. (As shown in FIG. 9, the device 110 may also have a dialog manager component 972 that operates similarly to dialog manager component 872.) As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 872 may associate a dialog session identifier with the dialog upon identifying that the user is engaging in a dialog with the user. The dialog manager component 872 may track a user input and the corresponding system generated response to the user input as a turn. The dialog session identifier may correspond to multiple turns of user input and corresponding system generated response. The dialog manager component 872 may transmit data identified by the dialog session identifier directly to the orchestrator component 124 or other component. Depending on system configuration the dialog manager component 872 may determine the appropriate system generated response to give to a particular utterance or user input of a turn. Or creation of the system generated response may be managed by another component of the system (e.g., the language output component 893, NLG 879, orchestrator component 124, etc.) while the dialog manager component 872 selects the appropriate responses. Alternatively, another component of the system component(s) 120 may select responses using techniques discussed herein. The text of a system generated response may be sent to a TTS component 180 for creation of audio data corresponding to the response. The audio data may then be sent to a user device (e.g., device 110) for ultimate output to the user. Alternatively (or in addition) a dialog response may be returned in text or some other form.

The dialog manager component 872 may receive the ASR hypothesis/hypotheses (i.e., text data) and make a semantic interpretation of the phrase(s) or statement(s) represented therein. That is, the dialog manager component 872 determines one or more meanings associated with the phrase(s) or statement(s) represented in the text data based on words represented in the text data. The dialog manager component 872 determines a goal corresponding to an action that a user desires be performed as well as pieces of the text data that allow a device (e.g., the device 110, the system component(s) 120, a skill 890, a skill system(s) 125, etc.) to execute the intent. If, for example, the text data corresponds to "what is the weather," the dialog manager component 872 may determine that that the system component(s) 120 is to output weather information associated with a geographic location of the device 110. In another example, if the text data corresponds to "turn off the lights," the dialog manager component 872 may determine that the system component(s) 120 is to turn off lights associated with the device(s) 110 or the user(s) 5.

The dialog manager component 872 may send the results data to one or more skill(s) 890. If the results data includes a single hypothesis, the orchestrator component 124 may send the results data to the skill(s) 890 associated with the hypothesis. If the results data includes an N-best list of hypotheses, the orchestrator component 124 may send the top scoring hypothesis to a skill(s) 890 associated with the top scoring hypothesis.

The system component(s) 120 includes a language output component 893. The language output component 893 includes a natural language generation (NLG) component 879 and a text-to-speech (TTS) component 180. The NLG component 879 can generate text for purposes of TTS output to a user. For example the NLG component 879 may generate text corresponding to instructions corresponding to a particular action for the user to perform. The NLG component 879 may generate appropriate text for various outputs as described herein. The NLG component 879 may include one or more trained models configured to output text appropriate for a particular input. The text output by the NLG component 879 may become input for the TTS component 180. Alternatively or in addition, the TTS component 180 may receive text data from a skill 890 or other system component for output.

The NLG component 879 may include a trained model. The NLG component 879 generates text data 415 from dialog data received by the dialog manager component 872 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 180.

In some embodiments, the components and corresponding processing discussed above in FIGS. 1-7B, with respect to the synthetic voice generation component 128, may be performed with respect to customizing the operations of other system components, for example the NLG component 879. For example, the user 105 may interact with the system 100 to generate customized language generation characteristics/model components for NLG 879 personalized to the user 105. In such embodiments, the user 105 may provide a natural language description of language generation characteristics (e.g., verbose, terse, formal, casual, humorous, etc.), and the NLG component 879 may generate/determine language characteristics embedding data from a language generation characteristics embedding space, and use a decoder to determine the corresponding language generation characteristics. Points in the language generation characteristics embedding space near each other may correspond to similar language generation characteristics, while points far from each other may correspond to dissimilar language generation characteristics. Regions of the embedding space may thus correspond to one or more different language generation characteristics; a first region in the embedding space may, for example, represent a language generation characteristic of verbose, while a second region in the embedding space may represent a language generation characteristic of succinct.

The system 100 may thereafter output synthesized speech corresponding to text data generated by the NLG component 879 using the customized language generation characteristics, and the user may provide input data (e.g., the input data 136) representing feedback corresponding to the language generation characteristics used to determine text data. The NLG component 879 may use the feedback to determine new language generation characteristics, which may be used to determine text data that is output to the user 105 as synthesized speech.

The TTS component 180 may generate audio data (e.g., synthesized speech) from text data using one or more different methods. Text data input to the TTS component 180 may come from a skill component 890, the orchestrator component 124, or another component of the system. In one method of synthesis called unit selection, the TTS component 180 matches text data against a database of recorded speech. The TTS component 180 selects matching units of recorded speech and concatenates the units together to form audio data. In another method of synthesis called parametric synthesis, the TTS component 180 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 5 to request capture of image or video data. The device 110 may process the commands locally or send audio data 811 representing the commands to the system component(s) 120 for processing, after which the system component(s) 120 may return output data that can cause the device 110 to engage its camera.

Figure 13:
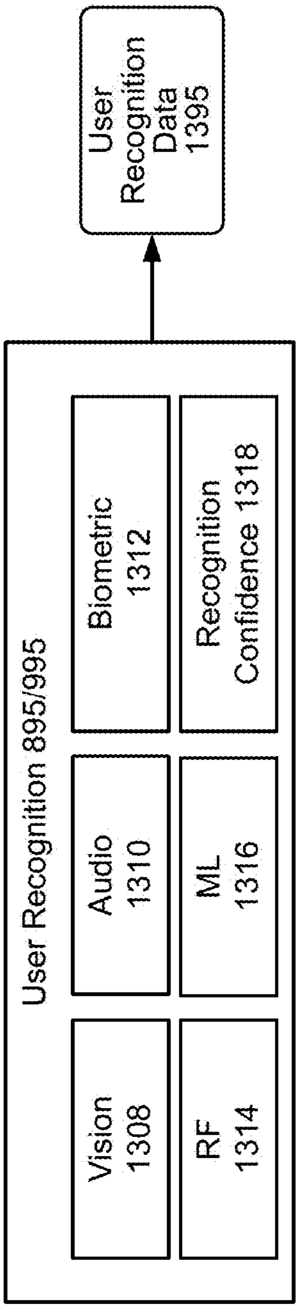
FIG. 13 is a schematic diagram of an illustrative architecture in which sensor data is combined to recognize one or more users according to embodiments of the present disclosure.

The system component(s) 120 may include a user recognition component 895 that recognizes one or more users using a variety of data, as described in greater detail below with regard to FIGS. 13-14. However, the disclosure is not limited thereto, and the device 110 may include a user recognition component 995 instead of and/or in addition to user recognition component 895 of the system component(s) 120 without departing from the disclosure. User recognition component 995 operates similarly to user recognition component 895.

The user recognition component 895 may take as input the audio data 811 and/or text data output by the ASR component 850. The user recognition component 895 may perform user recognition by comparing audio characteristics in the audio data 811 to stored audio characteristics of users. The user recognition component 895 may also perform user recognition by comparing biometric data (e.g., fingerprint data, iris data, etc.), received by the system in correlation with the present user input, to stored biometric data of users assuming user permission and previous authorization. The user recognition component 895 may further perform user recognition by comparing image data (e.g., including a representation of at least a feature of a user), received by the system in correlation with the present user input, with stored image data including representations of features of different users. The user recognition component 895 may perform additional user recognition processes, including those known in the art.

The user recognition component 895 determines scores indicating whether user input originated from a particular user. For example, a first score may indicate a likelihood that the user input originated from a first user, a second score may indicate a likelihood that the user input originated from a second user, etc. The user recognition component 895 also determines an overall confidence regarding the accuracy of user recognition operations.

Output of the user recognition component 895 may include a single user identifier corresponding to the most likely user that originated the user input. Alternatively, output of the user recognition component 895 may include an N-best list of user identifiers with respective scores indicating likelihoods of respective users originating the user input. The output of the user recognition component 895 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 312 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 312 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 312 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 875 that may be configured to detect a sentiment of a user from audio data representing speech/utterances from the user, image data representing an image of the user, and/or the like. The sentiment detection component 875 may be included in system component(s) 120, as illustrated in FIG. 8, although the disclosure is not limited thereto and the sentiment detection component 875 may be included in other components without departing from the disclosure. For example the sentiment detection component 975 may be included in the device 110, as a separate component, etc. Sentiment detection component 975 may operate similarly to sentiment detection component 875. The system component(s) 120 may use the sentiment detection component 875 to, for example, customize a response for a user based on an indication that the user is happy or frustrated.

Although the components of FIG. 8 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure. FIG. 9 illustrates such a configured device 110.

In at least some embodiments, the system component(s) 120 may receive the audio data 811 from the device 110, to recognize speech corresponding to a spoken input in the received audio data 811, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 980) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 8, the device 110 may include a wakeword detection component 820 configured to compare the audio data 811 to stored models used to detect a wakeword (e.g., "Alexa") that indicates to the device 110 that the audio data 811 is to be processed for determining NLU output data (e.g., slot data that corresponds to a named entity, label data, and/or intent data, etc.). In at least some embodiments, a hybrid selector 924, of the device 110, may send the audio data 811 to the wakeword detection component 820. If the wakeword detection component 820 detects a wakeword in the audio data 811, the wakeword detection component 820 may send an indication of such detection to the hybrid selector 924. In response to receiving the indication, the hybrid selector 924 may send the audio data 811 to the system component(s) 120 and/or the ASR component 950. The wakeword detection component 820 may also send an indication, to the hybrid selector 924, representing a wakeword was not detected. In response to receiving such an indication, the hybrid selector 924 may refrain from sending the audio data 811 to the system component(s) 120, and may prevent the ASR component 950 from further processing the audio data 811. In this situation, the audio data 811 can be discarded.

The device 110 may conduct its own speech processing using on-device language processing components, such as an SLU/language processing component 992 (which may include an ASR component 950 and an NLU component 960), similar to the manner discussed herein with respect to the SLU component 992 (or ASR component 850 and the NLU component 860) of the system component(s) 120. Language processing component 992 may operate similarly to language processing component 892, ASR component 950 may operate similarly to ASR component 850 and NLU component 960 may operate similarly to NLU component 860. The device 110 may also internally include, or otherwise have access to, other components such as one or more skill components 990 capable of executing commands based on NLU output data or other results determined by the device 110/system component(s) 120 (which may operate similarly to skill components 890), a user recognition component 995 (configured to process in a similar manner to that discussed herein with respect to the user recognition component 895 of the system component(s) 120), profile storage 970 (configured to store similar profile data to that discussed herein with respect to the profile storage 312 of the system component(s) 120), or other components. In at least some embodiments, the profile storage 970 may only store profile data for a user or group of users specifically associated with the device 110. Similar to as described above with respect to skill component 890, a skill component 990 may communicate with a skill system(s) 125. The device 110 may also have its own language output component 993 which may include NLG component 979 and TTS component 980. Language output component 993 may operate similarly to language output component 893, NLG component 979 may operate similarly to NLG component 879 and TTS component 980 may operate similarly to TTS component 180.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 924, of the device 110, may include a hybrid proxy (HP) 926 configured to proxy traffic to/from the system component(s) 120. For example, the HP 926 may be configured to send messages to/from a hybrid execution controller (HEC) 927 of the hybrid selector 924. For example, command/directive data received from the system component(s) 120 can be sent to the HEC 927 using the HP 926. The HP 926 may also be configured to allow the audio data 811 to pass to the system component(s) 120 while also receiving (e.g., intercepting) this audio data 811 and sending the audio data 811 to the HEC 927.

In at least some embodiments, the hybrid selector 924 may further include a local request orchestrator (LRO) 928 configured to notify the ASR component 950 about the availability of new audio data 811 that represents user speech, and to otherwise initiate the operations of local language processing when new audio data 811 becomes available. In general, the hybrid selector 924 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 811 is received, the HP 926 may allow the audio data 811 to pass through to the system component(s) 120 and the HP 926 may also input the audio data 811 to the on-device ASR component 950 by routing the audio data 811 through the HEC 927 of the hybrid selector 924, whereby the LRO 928 notifies the ASR component 950 of the audio data 811. At this point, the hybrid selector 924 may wait for response data from either or both of the system component(s) 120 or the local language processing components. However, the disclosure is not limited thereto, and in some examples the hybrid selector 924 may send the audio data 811 only to the local ASR component 950 without departing from the disclosure. For example, the device 110 may process the audio data 811 locally without sending the audio data 811 to the system component(s) 120.

The local ASR component 950 is configured to receive the audio data 811 from the hybrid selector 924, and to recognize speech in the audio data 811, and the local NLU component 960 is configured to determine a user intent from the recognized speech, and to determine how to act on the user intent by generating NLU output data which may include directive data (e.g., instructing a component to perform an action). Such NLU output data may take a form similar to that as determined by the NLU component 860 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 960) may be selected as usable to respond to a natural language user input, and local response data may be sent (e.g., local NLU output data, local knowledge base information, internet search results, and/or local directive data) to the hybrid selector 924, such as a "ReadyToExecute" response. The hybrid selector 924 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 5.

The device 110 and/or the system component(s) 120 may associate a unique identifier with each natural language user input. The device 110 may include the unique identifier when sending the audio data 811 to the system component(s) 120, and the response data from the system component(s) 120 may include the unique identifier to identify which natural language user input the response data corresponds.

In at least some embodiments, the device 110 may include, or be configured to use, one or more skill components 990 that may work similarly to the skill component(s) 890 implemented by the system component(s) 120. The skill component(s) 990 may correspond to one or more domains that are used in order to determine how to act on a spoken input in a particular way, such as by outputting a directive that corresponds to the determined intent, and which can be processed to implement the desired operation. The skill component(s) 990 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 990, a skill system 125, or a combination of a skill component 990 and a corresponding skill system 125.

Similar to the manner discussed with regard to FIG. 8, the local device 110 may be configured to recognize multiple different wakewords and/or perform different categories of tasks depending on the wakeword. Such different wakewords may invoke different processing components of local device 110 (not illustrated in FIG. 9). For example, detection of the wakeword "Alexa" by the wakeword detection component 820 may result in sending audio data to certain language processing components 992/skills 990 for processing while detection of the wakeword "Computer" by the wakeword detector may result in sending audio data to different language processing components 992/skills 990 for processing.

Figure 10:
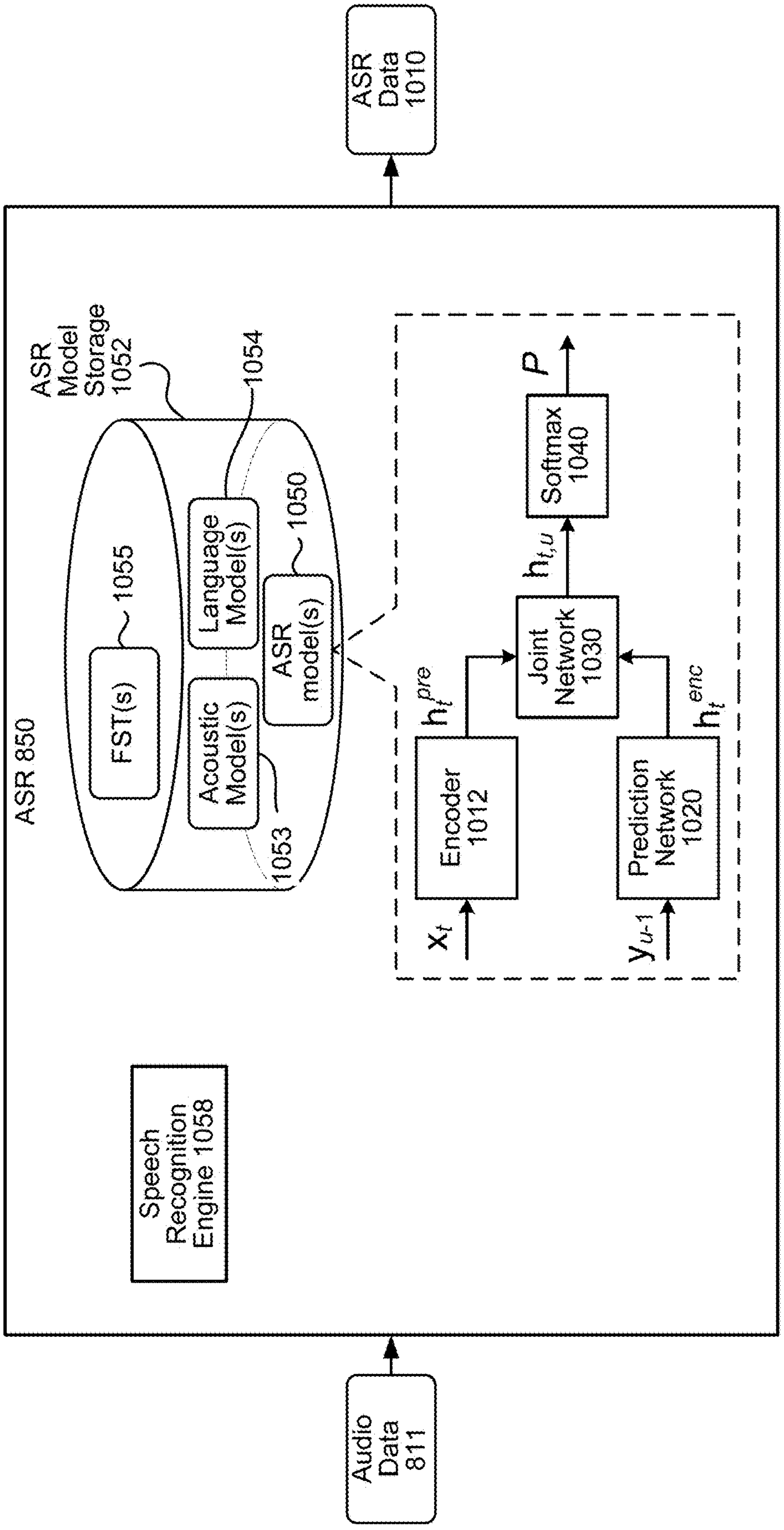
FIG. 10 is a conceptual diagram of an automatic speech recognition (ASR) component, according to embodiments of the present disclosure.

FIG. 10 is a conceptual diagram of an ASR component 850, according to embodiments of the present disclosure. The ASR component 850 may interpret a spoken natural language input based on the similarity between the spoken natural language input and pre-established language models 1054 stored in an ASR model storage 1052. For example, the ASR component 850 may compare the audio data with models for sounds (e.g., subword units or phonemes) and sequences of sounds to identify words that match the sequence of sounds spoken in the natural language input. Alternatively, the ASR component 850 may use a finite state transducer (FST) 1055 to implement the language model functions.

When the ASR component 850 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 1053 stored in the ASR model storage 1052), and the likelihood that a particular word, which matches the sounds, would be included in the sentence at the specific location (e.g., using a language or grammar model 1054). Based on the considered factors and the assigned confidence score, the ASR component 850 may output an ASR hypothesis that most likely matches the spoken natural language input, or may output multiple ASR hypotheses in the form of a lattice or an N-best list, with each ASR hypothesis corresponding to a respective score.

The ASR component 850 may include a speech recognition engine 1058. The ASR component 850 receives audio data 811 (for example, received from a local device 110 having processed audio detected by a microphone by an acoustic front end (AFE) or other component). The speech recognition engine 1058 compares the audio data 811 with acoustic models 1053, language models 1054, FST(s) 1055, and/or other data models and information for recognizing the speech conveyed in the audio data. The audio data 811 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the system component(s) 120 encoded, in which case they may be decoded by the speech recognition engine 1058 and/or prior to processing by the speech recognition engine 1058.

In some implementations, the ASR component 850 may process the audio data 811 using the ASR model 1050. The ASR model 1050 may be, for example, a recurrent neural network such as an RNN-T. An example RNN-T architecture is illustrated in FIG. 10. The ASR model 1050 may predict a probability (y|x) of labels $y=(y_1, \ldots, y_u)$ given acoustic features $x=(x_1, \ldots, x_t)$. During inference, the ASR model 1050 can generate an N-best list using, for example, a beam search decoding algorithm. The ASR model 1050 may include an encoder 1012, a prediction network 1020, a joint network 1030, and a softmax 1040. The encoder 1012 may be similar or analogous to an acoustic model (e.g., similar to the acoustic model 1053 described below), and may process a sequence of acoustic input features to generate encoded hidden representations. The prediction network 1020 may be similar or analogous to a language model (e.g., similar to the language model 1054 described below), and may process the previous output label predictions, and map them to corresponding hidden representations. The joint network 1030 may be, for example, a feed forward neural network (NN) that may process hidden representations from both the encoder 1012 and prediction network 1020, and predict output label probabilities. The softmax 1040 may be a function implemented (e.g., as a layer of the joint network 1030) to normalize the predicted output probabilities.

The speech recognition engine 1058 may process the audio data 811 with reference to information stored in the ASR model storage 1052. Feature vectors of the audio data 811 may arrive at the system component(s) 120 encoded, in which case they may be decoded prior to processing by the speech recognition engine 1058.

The speech recognition engine 1058 attempts to match received feature vectors to language acoustic units (e.g., phonemes) and words as known in the stored acoustic models 1053, language models 1054, and FST(s) 1055. For example, audio data 811 may be processed by one or more acoustic model(s) 1053 to determine acoustic unit data. The acoustic unit data may include indicators of acoustic units detected in the audio data 811 by the ASR component 850. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 1054 (and/or using FST 1055) to determine ASR output data 1010. The ASR output data 1010 can include one or more hypotheses. One or more of the hypotheses represented in the ASR output data 1010 may then be sent to further components (such as the NLU component 860) for further processing as discussed herein. The ASR output data 1010 may include representations of text of an utterance, such as words, subword units, or the like.

The speech recognition engine 1058 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 850 will output ASR hypotheses that make sense grammatically. The specific models used may be general models or may be models corresponding to a particular domain, such as music, banking, etc.

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 1058 may use the acoustic model(s) 1053 to attempt to match received audio feature vectors to words or subword acoustic units. An acoustic unit may be a senone, phoneme, phoneme in context, syllable, part of a syllable, syllable in context, or any other such portion of a word. The speech recognition engine 1058 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 850 outputs ASR hypotheses that make sense grammatically.

The speech recognition engine 1058 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound.

Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 1058, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 1058 may also compute scores of branches of the paths based on language models or grammars. Language modeling involves determining scores for what words are likely to be used together to form coherent words and sentences. Application of a language model may improve the likelihood that the ASR component 850 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 11:
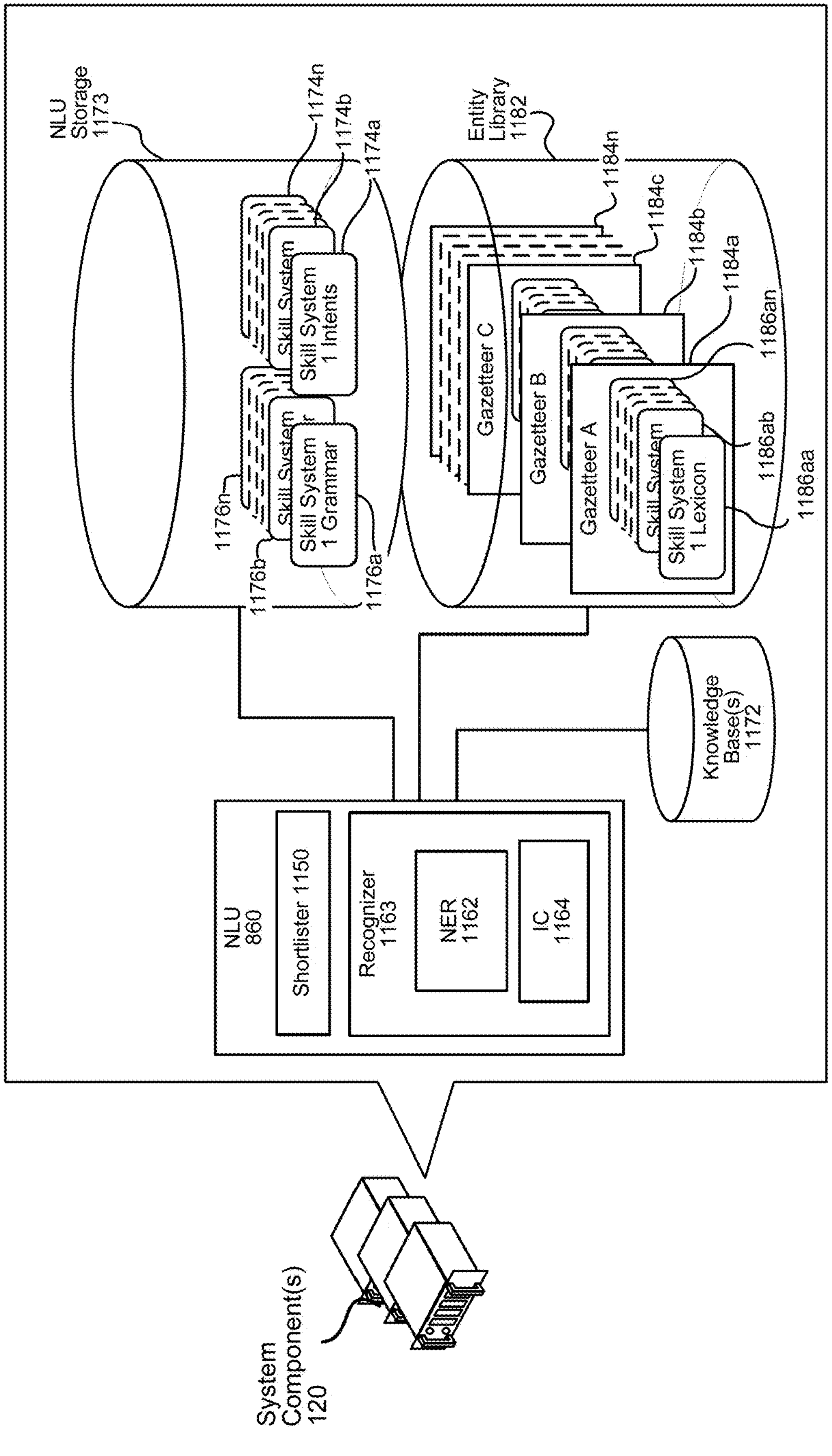
FIG. 11 is a conceptual diagram of how natural language understanding (NLU) processing may be performed, according to embodiments of the present disclosure.
Figure 12:
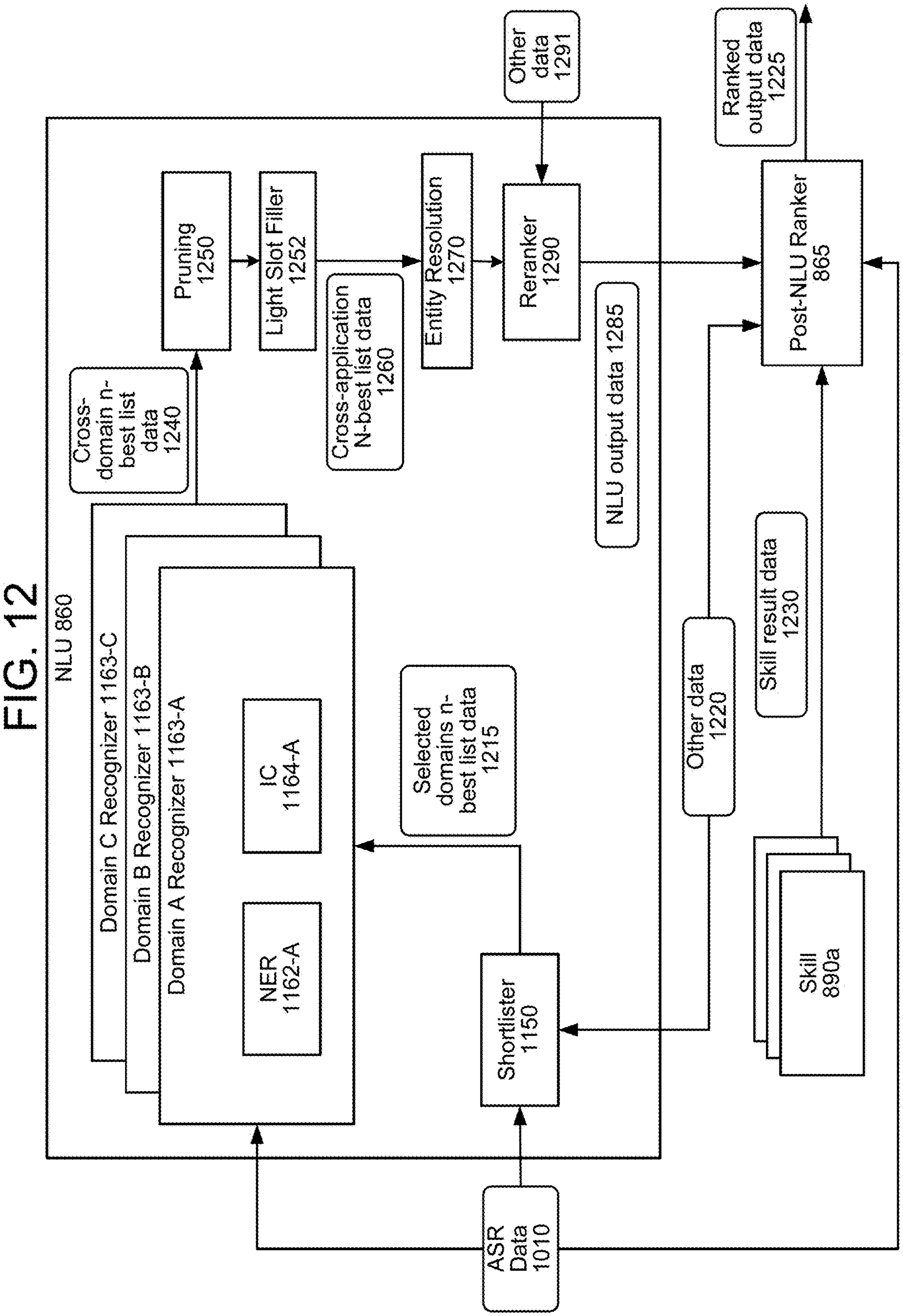
FIG. 12 is a further conceptual diagram of how natural language processing may be performed, according to embodiments of the present disclosure.

FIGS. 11 and 12 illustrates how the NLU component 860 may perform NLU processing. FIG. 11 is a conceptual diagram of how natural language processing is performed, according to embodiments of the present disclosure. And FIG. 12 is a conceptual diagram of how natural language processing is performed, according to embodiments of the present disclosure.

FIG. 11 illustrates how NLU processing is performed on text data. The NLU component 860 may process text data including several ASR hypotheses of a single user input. For example, if the ASR component 850 outputs text data including an n-best list of ASR hypotheses, the NLU component 860 may process the text data with respect to all (or a portion of) the ASR hypotheses represented therein.

The NLU component 860 may annotate text data by parsing and/or tagging the text data. For example, for the text data "tell me the weather for Seattle," the NLU component 860 may tag "tell me the weather for Seattle" as an <OutputWeather> intent as well as separately tag "Seattle" as a location for the weather information.

The NLU component 860 may include a shortlister component 1150. The shortlister component 1150 selects skills that may execute with respect to ASR output data 1010 input to the NLU component 860 (e.g., applications that may execute with respect to the user input). The ASR output data 1010 (which may also be referred to as ASR output data 1010) may include representations of text of an utterance, such as words, subword units, or the like. The shortlister component 1150 thus limits downstream, more resource intensive NLU processes to being performed with respect to skills that may execute with respect to the user input.

Without a shortlister component 1150, the NLU component 860 may process ASR output data 1010 input thereto with respect to every skill of the system, either in parallel, in series, or using some combination thereof. By implementing a shortlister component 1150, the NLU component 860 may process ASR output data 1010 with respect to only the skills that may execute with respect to the user input. This reduces total compute power and latency attributed to NLU processing.

The shortlister component 1150 may include one or more trained models. The model(s) may be trained to recognize various forms of user inputs that may be received by the system component(s) 120. For example, during a training period skill system(s) 125 associated with a skill may provide the system component(s) 120 with training text data representing sample user inputs that may be provided by a user to invoke the skill. For example, for a ride sharing skill, a skill system(s) 125 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 1150 may be trained, using the training text data representing sample user inputs, to determine other potentially related user input structures that users may try to use to invoke the particular skill. During training, the system component(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1150 may be trained with respect to a different skill. Alternatively, the shortlister component 1150 may use one trained model per domain, such as one trained model for skills associated with a weather domain, one trained model for skills associated with a ride sharing domain, etc.

The system component(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 1150. For example, some sample user inputs may be positive examples (e.g., user inputs that may be used to invoke the skill). Other sample user inputs may be negative examples (e.g., user inputs that may not be used to invoke the skill).

As described above, the shortlister component 1150 may include a different trained model for each skill of the system, a different trained model for each domain, or some other combination of trained model(s). For example, the shortlister component 1150 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1150 to output indications of only a portion of the skills that the ASR output data 1010 may relate to. For example, a user input may correspond to "tell me about Tom Collins." If the model is clustered based on domain, the shortlister component 1150 may determine the user input corresponds to a recipe skill (e.g., a drink recipe) even though the user input may also correspond to an information skill (e.g., including information about a person named Tom Collins).

The NLU component 860 may include one or more recognizers 1163. In at least some embodiments, a recognizer 1163 may be associated with a skill system 125 (e.g., the recognizer may be configured to interpret text data to correspond to the skill system 125). In at least some other examples, a recognizer 1163 may be associated with a domain such as smart home, video, music, weather, custom, etc. (e.g., the recognizer may be configured to interpret text data to correspond to the domain).

If the shortlister component 1150 determines ASR output data 1010 is potentially associated with multiple domains, the recognizers 1163 associated with the domains may process the ASR output data 1010, while recognizers 1163 not indicated in the shortlister component 1150's output may not process the ASR output data 1010. The "shortlisted" recognizers 1163 may process the ASR output data 1010 in parallel, in series, partially in parallel, etc. For example, if ASR output data 1010 potentially relates to both a communications domain and a music domain, a recognizer associated with the communications domain may process the ASR output data 1010 in parallel, or partially in parallel, with a recognizer associated with the music domain processing the ASR output data 1010.

Each recognizer 1163 may include a named entity recognition (NER) component 1162. The NER component 1162 attempts to identify grammars and lexical information that may be used to construe meaning with respect to text data input therein. The NER component 1162 identifies portions of text data that correspond to a named entity associated with a domain, associated with the recognizer 1163 implementing the NER component 1162. The NER component 1162 (or other component of the NLU component 860) may also determine whether a word refers to an entity whose identity is not explicitly mentioned in the text data, for example "him," "her," "it" or other anaphora, exophora, or the like.

Each recognizer 1163, and more specifically each NER component 1162, may be associated with a particular grammar database 1176, a particular set of intents/actions 1174, and a particular personalized lexicon 1186. The grammar databases 1176, and intents/actions 1174 may be stored in an NLU storage 1173. Each gazetteer 1184 may include domain/skill-indexed lexical information associated with a particular user and/or device 110. For example, a Gazetteer A (1184*a*) includes skill-indexed lexical information 1186*aa* to 1186*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1162 applies grammar database 1176 and lexical information 1186 associated with a domain (associated with the recognizer 1163 implementing the NER component 1162) to determine a mention of one or more entities in text data. In this manner, the NER component 1162 identifies "slots" (each corresponding to one or more particular words in text data) that may be useful for later processing. The NER component 1162 may also label each slot with a type (e.g., noun, place, city, artist name, song name, etc.).

Each grammar database 1176 includes the names of entities (i.e., nouns) commonly found in speech about the particular domain to which the grammar database 1176 relates, whereas the lexical information 1186 is personalized to the user and/or the device 110 from which the user input originated. For example, a grammar database 1176 associated with a shopping domain may include a database of words commonly used when people discuss shopping.

A downstream process called entity resolution (discussed in detail elsewhere herein) links a slot of text data to a specific entity known to the system. To perform entity resolution, the NLU component 860 may utilize gazetteer information (1184*a*-1184*n*) stored in an entity library storage 1182. The gazetteer information 1184*a-n* may be used to match text data (representing a portion of the user input) with text data representing known entities, such as song titles, contact names, etc. Gazetteers 1184 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1163 may also include an intent classification (IC) component 1164. An IC component 1164 parses text data to determine an intent(s) (associated with the domain associated with the recognizer 1163 implementing the IC component 1164) that potentially represents the user input. An intent represents to an action a user desires be performed. An IC component 1164 may communicate with a database 1174 of words linked to intents. For example, a music intent database may link words and phrases such as "quiet," "volume off," and "mute" to a <Mute> intent. An IC component 1164 identifies potential intents by comparing words and phrases in text data (representing at least a portion of the user input) to the words and phrases in an intents database 1174 (associated with the domain that is associated with the recognizer 1163 implementing the IC component 1164).

The intents identifiable by a specific IC component 1164 are linked to domain-specific (i.e., the domain associated with the recognizer 1163 implementing the IC component 1164) grammar database 1176 with "slots" to be filled. Each slot of a grammar database 1176 corresponds to a portion of text data that the system believes corresponds to an entity. For example, a grammar framework 1176 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1176 may not be structured as sentences, but rather based on associating slots with grammatical tags.

For example, an NER component 1162 may parse text data to identify words as subject, object, verb, preposition, etc. based on grammar rules and/or models prior to recognizing named entities in the text data. An IC component 1164 (implemented by the same recognizer 1163 as the NER component 1162) may use the identified verb to identify an intent. The NER component 1162 may then determine a grammar database 1176 associated with the identified intent. For example, a grammar database 1176 for an intent corresponding to <PlayMusic> may specify a list of slots applicable to play the identified "object" and any object modifier (e.g., a prepositional phrase), such as {Artist Name}, {Album Name}, {Song name}, etc. The NER component 1162 may then search corresponding fields in a lexicon 1186 (associated with the domain associated with the recognizer 1163 implementing the NER component 1162), attempting to match words and phrases in text data the NER component 1162 previously tagged as a grammatical object or object modifier with those identified in the lexicon 1186.

An NER component 1162 may perform semantic tagging, which is the labeling of a word or combination of words according to their type/semantic meaning. An NER component 1162 may parse text data using heuristic grammar rules, or a model may be constructed using techniques such as Hidden Markov Models, maximum entropy models, log linear models, conditional random fields (CRF), and the like. For example, an NER component 1162 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1162 identifies "Play" as a verb based on a word database associated with the music domain, which an IC component 1164 (also implemented by the music domain recognizer) may determine corresponds to a <PlayMusic> intent. At this stage, no determination has been made as to the meaning of "mother's little helper" or "the rolling stones," but based on grammar rules and models, the NER component 1162 has determined the text of these phrases relates to the grammatical object (i.e., entity) of the user input represented in the text data.

An NER component 1162 may tag text data to attribute meaning thereto. For example, an NER component 1162 may tag "play mother's little helper by the rolling stones" as: {domain} Music, {intent} <PlayMusic>, {artist name} rolling stones, (media type) SONG, and {song title} mother's little helper. For further example, the NER component 1162 may tag "play songs by the rolling stones" as: {domain} Music, {intent} <PlayMusic>, {artist name} rolling stones, and {media type} SONG.

The shortlister component 1150 may receive ASR output data 1010 output from the ASR component 850 or output from the device 110*b* (as illustrated in FIG. 12). The ASR component 850 may embed the ASR output data 1010 into a form processable by a trained model(s) using sentence embedding techniques as known in the art. Sentence embedding results in the ASR output data 1010 including text in a structure that enables the trained models of the shortlister component 1150 to operate on the ASR output data 1010. For example, an embedding of the ASR output data 1010 may be a vector representation of the ASR output data 1010.

The shortlister component 1150 may make binary determinations (e.g., yes or no) regarding which domains relate to the ASR output data 1010. The shortlister component 1150 may make such determinations using the one or more trained models described herein above. If the shortlister component 1150 implements a single trained model for each domain, the shortlister component 1150 may simply run the models that are associated with enabled domains as indicated in a user profile associated with the device 110 and/or user that originated the user input.

The shortlister component 1150 may generate n-best list data 1215 representing domains that may execute with respect to the user input represented in the ASR output data 1010. The size of the n-best list represented in the n-best list data 1215 is configurable. In an example, the n-best list data 1215 may indicate every domain of the system as well as contain an indication, for each domain, regarding whether the domain is likely capable to execute the user input represented in the ASR output data 1010. In another example, instead of indicating every domain of the system, the n-best list data 1215 may only indicate the domains that are likely to be able to execute the user input represented in the ASR output data 1010. In yet another example, the shortlister component 1150 may implement thresholding such that the n-best list data 1215 may indicate no more than a maximum number of domains that may execute the user input represented in the ASR output data 1010. In an example, the threshold number of domains that may be represented in the n-best list data 1215 is ten. In another example, the domains included in the n-best list data 1215 may be limited by a threshold a score, where only domains indicating a likelihood to handle the user input is above a certain score (as determined by processing the ASR output data 1010 by the shortlister component 1150 relative to such domains) are included in the n-best list data 1215.

The ASR output data 1010 may correspond to more than one ASR hypothesis. When this occurs, the shortlister component 1150 may output a different n-best list (represented in the n-best list data 1215) for each ASR hypothesis. Alternatively, the shortlister component 1150 may output a single n-best list representing the domains that are related to the multiple ASR hypotheses represented in the ASR output data 1010.

As indicated above, the shortlister component 1150 may implement thresholding such that an n-best list output therefrom may include no more than a threshold number of entries. If the ASR output data 1010 includes more than one ASR hypothesis, the n-best list output by the shortlister component 1150 may include no more than a threshold number of entries irrespective of the number of ASR hypotheses output by the ASR component 850. Alternatively or in addition, the n-best list output by the shortlister component 1150 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 1010, the shortlister component 1150 may generate confidence scores representing likelihoods that domains relate to the ASR output data 1010. If the shortlister component 1150 implements a different trained model for each domain, the shortlister component 1150 may generate a different confidence score for each individual domain trained model that is run. If the shortlister component 1150 runs the models of every domain when ASR output data 1010 is received, the shortlister component 1150 may generate a different confidence score for each domain of the system. If the shortlister component 1150 runs the models of only the domains that are associated with skills indicated as enabled in a user profile associated with the device 110 and/or user that originated the user input, the shortlister component 1150 may only generate a different confidence score for each domain associated with at least one enabled skill. If the shortlister component 1150 implements a single trained model with domain specifically trained portions, the shortlister component 1150 may generate a different confidence score for each domain who's specifically trained portion is run. The shortlister component 1150 may perform matrix vector modification to obtain confidence scores for all domains of the system in a single instance of processing of the ASR output data 1010.

N-best list data 1215 including confidence scores that may be output by the shortlister component 1150 may be represented as, for example:

Search domain, 0.67
Recipe domain, 0.62
Information domain, 0.57
Shopping domain, 0.42

As indicated, the confidence scores output by the shortlister component 1150 may be numeric values. The confidence scores output by the shortlister component 1150 may alternatively be binned values (e.g., high, medium, low).

The n-best list may only include entries for domains having a confidence score satisfying (e.g., equaling or exceeding) a minimum threshold confidence score. Alternatively, the shortlister component 1150 may include entries for all domains associated with user enabled skills, even if one or more of the domains are associated with confidence scores that do not satisfy the minimum threshold confidence score.

The shortlister component 1150 may consider other data 1220 when determining which domains may relate to the user input represented in the ASR output data 1010 as well as respective confidence scores. The other data 1220 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1220 may include an indicator of the user associated with the ASR output data 1010, for example as determined by the user recognition component 895.

The other data 1220 may be character embedded prior to being input to the shortlister component 1150. The other data 1220 may alternatively be embedded using other techniques known in the art prior to being input to the shortlister component 1150.

The other data 1220 may also include data indicating the domains associated with skills that are enabled with respect to the device 110 and/or user that originated the user input. The shortlister component 1150 may use such data to determine which domain-specific trained models to run. That is, the shortlister component 1150 may determine to only run the trained models associated with domains that are associated with user-enabled skills. The shortlister component 1150 may alternatively use such data to alter confidence scores of domains.

As an example, considering two domains, a first domain associated with at least one enabled skill and a second domain not associated with any user-enabled skills of the user that originated the user input, the shortlister component 1150 may run a first model specific to the first domain as well as a second model specific to the second domain. Alternatively, the shortlister component 1150 may run a model configured to determine a score for each of the first and second domains. The shortlister component 1150 may determine a same confidence score for each of the first and second domains in the first instance. The shortlister component 1150 may then alter those confidence scores based on which domains is associated with at least one skill enabled by the present user. For example, the shortlister component 1150 may increase the confidence score associated with the domain associated with at least one enabled skill while leaving the confidence score associated with the other domain the same. Alternatively, the shortlister component 1150 may leave the confidence score associated with the domain associated with at least one enabled skill the same while decreasing the confidence score associated with the other domain. Moreover, the shortlister component 1150 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 312. When the shortlister component 1150 receives the ASR output data 1010, the shortlister component 1150 may determine whether profile data associated with the user and/or device 110 that originated the command includes an indication of enabled skills.

The other data 1220 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1150 may use such data to determine which domain-specific trained models to run. For example, if the device 110 corresponds to a displayless type device, the shortlister component 1150 may determine not to run trained models specific to domains that output video data. The shortlister component 1150 may alternatively use such data to alter confidence scores of domains.

As an example, considering two domains, one that outputs audio data and another that outputs video data, the shortlister component 1150 may run a first model specific to the domain that generates audio data as well as a second model specific to the domain that generates video data. Alternatively the shortlister component 1150 may run a model configured to determine a score for each domain. The shortlister component 1150 may determine a same confidence score for each of the domains in the first instance. The shortlister component 1150 may then alter the original confidence scores based on the type of the device 110 that originated the user input corresponding to the ASR output data 1010. For example, if the device 110 is a displayless device, the shortlister component 1150 may increase the confidence score associated with the domain that generates audio data while leaving the confidence score associated with the domain that generates video data the same. Alternatively, if the device 110 is a displayless device, the shortlister component 1150 may leave the confidence score associated with the domain that generates audio data the same while decreasing the confidence score associated with the domain that generates video data. Moreover, if the device 110 is a displayless device, the shortlister component 1150 may increase the confidence score associated with the domain that generates audio data as well as decrease the confidence score associated with the domain that generates video data.

The type of device information represented in the other data 1220 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1220 may represent the smart TV of other display device, and not the displayless device that captured the spoken user input.

The other data 1220 may also include data indicating the user input originating device's speed, location, or other mobility information. For example, the device may correspond to a vehicle including a display. If the vehicle is moving, the shortlister component 1150 may decrease the confidence score associated with a domain that generates video data as it may be undesirable to output video content to a user while the user is driving. The device may output data to the system component(s) 120 indicating when the device is moving.

The other data 1220 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1150 may use such data to alter confidence scores of domains. For example, the shortlister component 1150 may run a first model specific to a first domain as well as a second model specific to a second domain. Alternatively, the shortlister component 1150 may run a model configured to determine a score for each domain. The shortlister component 1150 may also determine a same confidence score for each of the domains in the first instance. The shortlister component 1150 may then alter the original confidence scores based on the first domain being invoked to cause the system to output content while the current user input was received. Based on the first domain being invoked, the shortlister component 1150 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1215 generated by the shortlister component 1150 as well as the different types of other data 1220 considered by the shortlister component 1150 are configurable. For example, the shortlister component 1150 may update confidence scores as more other data 1220 is considered. For further example, the n-best list data 1215 may exclude relevant domains if thresholding is implemented. Thus, for example, the shortlister component 1150 may include an indication of a domain in the n-best list data 1215 unless the shortlister component 1150 is one hundred percent confident that the domain may not execute the user input represented in the ASR output data 1010 (e.g., the shortlister component 1150 determines a confidence score of zero for the domain).

The shortlister component 1150 may send the ASR output data 1010 to recognizers 1163 associated with domains represented in the n-best list data 1215. Alternatively, the shortlister component 1150 may send the n-best list data 1215 or some other indicator of the selected subset of domains to another component (such as the orchestrator component 124) which may in turn send the ASR output data 1010 to the recognizers 1163 corresponding to the domains included in the n-best list data 1215 or otherwise indicated in the indicator. If the shortlister component 1150 generates an n-best list representing domains without any associated confidence scores, the shortlister component 1150/orchestrator component 124 may send the ASR output data 1010 to recognizers 1163 associated with domains that the shortlister component 1150 determines may execute the user input. If the shortlister component 1150 generates an n-best list representing domains with associated confidence scores, the shortlister component 1150/orchestrator component 124 may send the ASR output data 1010 to recognizers 1163 associated with domains associated with confidence scores satisfying (e.g., meeting or exceeding) a threshold minimum confidence score.

A recognizer 1163 may output tagged text data generated by an NER component 1162 and an IC component 1164, as described herein above. The NLU component 860 may compile the output tagged text data of the recognizers 1163 into a single cross-domain n-best list data 1240 and may send the cross-domain n-best list data 1240 to a pruning component 1250. Each entry of tagged text (e.g., each NLU hypothesis) represented in the cross-domain n-best list data 1240 may be associated with a respective score indicating a likelihood that the NLU hypothesis corresponds to the domain associated with the recognizer 1163 from which the NLU hypothesis was output. For example, the cross-domain n-best list data 1240 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1250 may sort the NLU hypotheses represented in the cross-domain n-best list data 1240 according to their respective scores. The pruning component 1250 may perform score thresholding with respect to the cross-domain NLU hypotheses. For example, the pruning component 1250 may select NLU hypotheses associated with scores satisfying (e.g., meeting and/or exceeding) a threshold score. The pruning component 1250 may also or alternatively perform number of NLU hypothesis thresholding. For example, the pruning component 1250 may select the top scoring NLU hypothesis(es). The pruning component 1250 may output a portion of the NLU hypotheses input thereto. The purpose of the pruning component 1250 is to create a reduced list of NLU hypotheses so that downstream, more resource intensive, processes may only operate on the NLU hypotheses that most likely represent the user's intent.

The NLU component 860 may include a light slot filler component 1252. The light slot filler component 1252 can take text from slots represented in the NLU hypotheses output by the pruning component 1250 and alter them to make the text more easily processed by downstream components. The light slot filler component 1252 may perform low latency operations that do not involve heavy operations such as reference to a knowledge base (e.g., 1172. The purpose of the light slot filler component 1252 is to replace words with other words or values that may be more easily understood by downstream components. For example, if a NLU hypothesis includes the word "tomorrow," the light slot filler component 1252 may replace the word "tomorrow" with an actual date for purposes of downstream processing. Similarly, the light slot filler component 1252 may replace the word "CD" with "album" or the words "compact disc." The replaced words are then included in the cross-domain n-best list data 1260.

The cross-domain n-best list data 1260 may be input to an entity resolution component 1270. The entity resolution component 1270 can apply rules or other instructions to standardize labels or tokens from previous stages into an intent/slot representation. The precise transformation may depend on the domain. For example, for a travel domain, the entity resolution component 1270 may transform text corresponding to "Boston airport" to the standard BOS three-letter code referring to the airport. The entity resolution component 1270 can refer to a knowledge base (e.g., 1172) that is used to specifically identify the precise entity referred to in each slot of each NLU hypothesis represented in the cross-domain n-best list data 1260. Specific intent/slot combinations may also be tied to a particular source, which may then be used to resolve the text. In the example "play songs by the stones," the entity resolution component 1270 may reference a personal music catalog, Amazon Music account, a user profile, or the like. The entity resolution component 1270 may output an altered n-best list that is based on the cross-domain n-best list 1260 but that includes more detailed information (e.g., entity IDs) about the specific entities mentioned in the slots and/or more detailed slot data that can eventually be used by a skill. The NLU component 860 may include multiple entity resolution components 1270 and each entity resolution component 1270 may be specific to one or more domains.

The NLU component 860 may include a reranker 1290. The reranker 1290 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1270.

The reranker 1290 may apply re-scoring, biasing, or other techniques. The reranker 1290 may consider not only the data output by the entity resolution component 1270, but may also consider other data 1291. The other data 1291 may include a variety of information. For example, the other data 1291 may include skill rating or popularity data. For example, if one skill has a high rating, the reranker 1290 may increase the score of a NLU hypothesis that may be processed by the skill. The other data 1291 may also include information about skills that have been enabled by the user that originated the user input. For example, the reranker 1290 may assign higher scores to NLU hypothesis that may be processed by enabled skills than NLU hypothesis that may be processed by non-enabled skills. The other data 1291 may also include data indicating user usage history, such as if the user that originated the user input regularly uses a particular skill or does so at particular times of day. The other data 1291 may additionally include data indicating date, time, location, weather, type of device 110, user identifier, context, as well as other information. For example, the reranker 1290 may consider when any particular skill is currently active (e.g., music being played, a game being played, etc.).

As illustrated and described, the entity resolution component 1270 is implemented prior to the reranker 1290. The entity resolution component 1270 may alternatively be implemented after the reranker 1290. Implementing the entity resolution component 1270 after the reranker 1290 limits the NLU hypotheses processed by the entity resolution component 1270 to only those hypotheses that successfully pass through the reranker 1290.

The reranker 1290 may be a global reranker (e.g., one that is not specific to any particular domain). Alternatively, the NLU component 860 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 860 may perform NLU processing described above with respect to domains associated with skills wholly implemented as part of the system component(s) 120 (e.g., designated 890 in FIG. 8). The NLU component 860 may separately perform NLU processing described above with respect to domains associated with skills that are at least partially implemented as part of the skill system(s) 125. In an example, the shortlister component 1150 may only process with respect to these latter domains. Results of these two NLU processing paths may be merged into NLU results data 1285, which may be sent to a post-NLU ranker 865, which may be implemented by the system component(s) 120.

The post-NLU ranker 865 may include a statistical component that produces a ranked list of intent/skill pairs with associated confidence scores. Each confidence score may indicate an adequacy of the skill's execution of the intent with respect to NLU results data associated with the skill. The post-NLU ranker 865 may operate one or more trained models configured to process the NLU results data 1285, skill result data 1230, and the other data 1220 in order to output ranked output data 1225. The ranked output data 1225 may include an n-best list where the NLU hypotheses in the NLU results data 1285 are reordered such that the n-best list in the ranked output data 1225 represents a prioritized list of skills to respond to a user input as determined by the post-NLU ranker 865. The ranked output data 1225 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 865 enables the system to better determine the best skill to execute the user input. For example, first and second NLU hypotheses in the NLU results data 1285 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 865 (or other scheduling component such as orchestrator component 124) may solicit the first skill and the second skill to provide potential result data 1230 based on the first NLU hypothesis and the second NLU hypothesis, respectively. For example, the post-NLU ranker 865 may send the first NLU hypothesis to the first skill **890*a* along with a request for the first skill 890*a* to at least partially execute with respect to the first NLU hypothesis. The post-NLU ranker 865 may also send the second NLU hypothesis to the second skill 890*b* along with a request for the second skill 890*b* to at least partially execute with respect to the second NLU hypothesis. The post-NLU ranker 865 receives, from the first skill 890*a*, first result data 1230*a* generated from the first skill 890*a*'s execution with respect to the first NLU hypothesis. The post-NLU ranker 865 also receives, from the second skill 890*b*, second result data 1230*b* generated from the second skill 890*b***'s execution with respect to the second NLU hypothesis.

The result data 1230 may include various portions. For example, the result data 1230 may include content (e.g., audio data, text data, and/or video data) to be output to a user. The result data 1230 may also include a unique identifier used by the system component(s) 120 and/or the skill system(s) 125 to locate the data to be output to a user. The result data 1230 may also include an instruction. For example, if the user input corresponds to "turn on the light," the result data 1230 may include an instruction causing the system to turn on a light associated with a profile of the device (**110*a*/110*b***) and/or user.

The post-NLU ranker 865 may consider the first result data **1230*a* and the second result data 1230*b* to alter the first confidence score and the second confidence score of the first NLU hypothesis and the second NLU hypothesis, respectively. That is, the post-NLU ranker 865 may generate a third confidence score based on the first result data 1230*a* and the first confidence score. The third confidence score may correspond to how likely the post-NLU ranker 865 determines the first skill will correctly respond to the user input. The post-NLU ranker 865 may also generate a fourth confidence score based on the second result data 1230*b* and the second confidence score. One skilled in the art will appreciate that a first difference between the third confidence score and the fourth confidence score may be greater than a second difference between the first confidence score and the second confidence score. The post-NLU ranker 865 may also consider the other data 1220 to generate the third confidence score and the fourth confidence score. While it has been described that the post-NLU ranker 865 may alter the confidence scores associated with first and second NLU hypotheses, one skilled in the art will appreciate that the post-NLU ranker 865 may alter the confidence scores of more than two NLU hypotheses. The post-NLU ranker 865 may select the result data 1230 associated with the skill 890 with the highest altered confidence score to be the data output in response to the current user input. The post-NLU ranker 865 may also consider the ASR output data 1010** to alter the NLU hypotheses confidence scores.

The orchestrator component 124 may, prior to sending the NLU results data 1285 to the post-NLU ranker 865, associate intents in the NLU hypotheses with skills 890. For example, if a NLU hypothesis includes a <PlayMusic> intent, the orchestrator component 124 may associate the NLU hypothesis with one or more skills 890 that can execute the <PlayMusic> intent. Thus, the orchestrator component 124 may send the NLU results data 1285, including NLU hypotheses paired with skills 890, to the post-NLU ranker 865. In response to ASR output data 1010 corresponding to "what should I do for dinner today," the orchestrator component 124 may generates pairs of skills 890 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 865 queries each skill 890, paired with a NLU hypothesis in the NLU results data 1285, to provide result data 1230 based on the NLU hypothesis with which it is associated. That is, with respect to each skill, the post-NLU ranker 865 colloquially asks the each skill "if given this NLU hypothesis, what would you do with it." According to the above example, the post-NLU ranker 865 may send skills 890 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 865 may query each of the skills 890 in parallel or substantially in parallel.

A skill 890 may provide the post-NLU ranker 865 with various data and indications in response to the post-NLU ranker 865 soliciting the skill 890 for result data 1230. A skill 890 may simply provide the post-NLU ranker 865 with an indication of whether or not the skill can execute with respect to the NLU hypothesis it received. A skill 890 may also or alternatively provide the post-NLU ranker 865 with output data generated based on the NLU hypothesis it received. In some situations, a skill 890 may need further information in addition to what is represented in the received NLU hypothesis to provide output data responsive to the user input. In these situations, the skill 890 may provide the post-NLU ranker 865 with result data 1230 indicating slots of a framework that the skill 890 further needs filled or entities that the skill 890 further needs resolved prior to the skill 890 being able to provided result data 1230 responsive to the user input. The skill 890 may also provide the post-NLU ranker 865 with an instruction and/or computer-generated speech indicating how the skill 890 recommends the system solicit further information needed by the skill 890. The skill 890 may further provide the post-NLU ranker 865 with an indication of whether the skill 890 will have all needed information after the user provides additional information a single time, or whether the skill 890 will need the user to provide various kinds of additional information prior to the skill 890 having all needed information. According to the above example, skills 890 may provide the post-NLU ranker 865 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1230 includes an indication provided by a skill 890 indicating whether or not the skill 890 can execute with respect to a NLU hypothesis; data generated by a skill 890 based on a NLU hypothesis; as well as an indication provided by a skill 890 indicating the skill 890 needs further information in addition to what is represented in the received NLU hypothesis.

The post-NLU ranker 865 uses the result data 1230 provided by the skills 890 to alter the NLU processing confidence scores generated by the reranker 1290. That is, the post-NLU ranker 865 uses the result data 1230 provided by the queried skills 890 to create larger differences between the NLU processing confidence scores generated by the reranker 1290. Without the post-NLU ranker 865, the system may not be confident enough to determine an output in response to a user input, for example when the NLU hypotheses associated with multiple skills are too close for the system to confidently determine a single skill 890 to invoke to respond to the user input. For example, if the system does not implement the post-NLU ranker 865, the system may not be able to determine whether to obtain output data from a general reference information skill or a medical information skill in response to a user input corresponding to "what is acne."

The post-NLU ranker 865 may prefer skills 890 that provide result data 1230 responsive to NLU hypotheses over skills 890 that provide result data 1230 corresponding to an indication that further information is needed, as well as skills 890 that provide result data 1230 indicating they can provide multiple responses to received NLU hypotheses. For example, the post-NLU ranker 865 may generate a first score for a first skill 890*a* that is greater than the first skill's NLU confidence score based on the first skill 890*a* providing first result data 1230*a* including a response to a NLU hypothesis. For further example, the post-NLU ranker 865 may generate a second score for a second skill 890*b* that is less than the second skill's NLU confidence score based on the second skill 890*b* providing second result data 1230*b* indicating further information is needed for the second skill 890*b* to provide a response to a NLU hypothesis. Yet further, for example, the post-NLU ranker 865 may generate a third score for a third skill 890*c* that is less than the third skill's NLU confidence score based on the third skill 890*c* providing result data 1230*c* indicating the third skill 890*c* can provide multiple responses to a NLU hypothesis.

The post-NLU ranker 865 may consider other data 1220 in determining scores. The other data 1220 may include rankings associated with the queried skills 890. A ranking may be a system ranking or a user-specific ranking. A ranking may indicate a veracity of a skill from the perspective of one or more users of the system. For example, the post-NLU ranker 865 may generate a first score for a first skill 890*a* that is greater than the first skill's NLU processing confidence score based on the first skill 890*a* being associated with a high ranking. For further example, the post-NLU ranker 865 may generate a second score for a second skill 890*b* that is less than the second skill's NLU processing confidence score based on the second skill 890*b* being associated with a low ranking.

The other data 1220 may include information indicating whether or not the user that originated the user input has enabled one or more of the queried skills 890. For example, the post-NLU ranker 865 may generate a first score for a first skill 890*a* that is greater than the first skill's NLU processing confidence score based on the first skill 890*a* being enabled by the user that originated the user input. For further example, the post-NLU ranker 865 may generate a second score for a second skill 890*b* that is less than the second skill's NLU processing confidence score based on the second skill 890*b* not being enabled by the user that originated the user input. When the post-NLU ranker 865 receives the NLU results data 1285, the post-NLU ranker 865 may determine whether profile data, associated with the user and/or device that originated the user input, includes indications of enabled skills.

The other data 1220 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 865 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 865 may increase the NLU processing confidence score associated with a first skill configured to output visual data and/or decrease the NLU processing confidence score associated with a second skill configured to output audio data.

The other data 1220 may include information indicating the veracity of the result data 1230 provided by a skill 890. For example, if a user says "tell me a recipe for pasta sauce," a first skill 890*a* may provide the post-NLU ranker 865 with first result data 1230*a* corresponding to a first recipe associated with a five star rating and a second skill 890*b* may provide the post-NLU ranker 865 with second result data 1230*b* corresponding to a second recipe associated with a one star rating. In this situation, the post-NLU ranker 865 may increase the NLU processing confidence score associated with the first skill 890*a* based on the first skill 890*a* providing the first result data 1230*a* associated with the five star rating and/or decrease the NLU processing confidence score associated with the second skill 890*b* based on the second skill 890*b* providing the second result data 1230*b* associated with the one star rating.

The other data 1220 may include information indicating the type of device that originated the user input. For example, the device may correspond to a "hotel room" type if the device is located in a hotel room. If a user inputs a command corresponding to "order me food" to the device located in the hotel room, the post-NLU ranker 865 may increase the NLU processing confidence score associated with a first skill 890*a* corresponding to a room service skill associated with the hotel and/or decrease the NLU processing confidence score associated with a second skill 890*b* corresponding to a food skill not associated with the hotel.

The other data 1220 may include information indicating a location of the device and/or user that originated the user input. The system may be configured with skills 890 that may only operate with respect to certain geographic locations. For example, a user may provide a user input corresponding to "when is the next train to Portland." A first skill 890*a* may operate with respect to trains that arrive at, depart from, and pass through Portland, Oregon. A second skill 890*b* may operate with respect to trains that arrive at, depart from, and pass through Portland, Maine. If the device and/or user that originated the user input is located in Seattle, Washington, the post-NLU ranker 865 may increase the NLU processing confidence score associated with the first skill 890*a* and/or decrease the NLU processing confidence score associated with the second skill 890*b*. Likewise, if the device and/or user that originated the user input is located in Boston, Massachusetts, the post-NLU ranker 865 may increase the NLU processing confidence score associated with the second skill 890*b* and/or decrease the NLU processing confidence score associated with the first skill 890*a*.

The other data 1220 may include information indicating a time of day. The system may be configured with skills 890 that operate with respect to certain times of day. For example, a user may provide a user input corresponding to "order me food." A first skill 890*a* may generate first result data 1230*a* corresponding to breakfast. A second skill 890*b* may generate second result data 1230*b* corresponding to dinner. If the system component(s) 120 receives the user input in the morning, the post-NLU ranker 865 may increase the NLU processing confidence score associated with the first skill 890*a* and/or decrease the NLU processing score associated with the second skill 890*b*. If the system component(s) 120 receives the user input in the afternoon or evening, the post-NLU ranker 865 may increase the NLU processing confidence score associated with the second skill 890*b* and/or decrease the NLU processing confidence score associated with the first skill 890*a*.

The other data 1220 may include information indicating user preferences. The system may include multiple skills 890 configured to execute in substantially the same manner. For example, a first skill 890*a* and a second skill 890*b* may both be configured to order food from respective restaurants. The system may store a user preference (e.g., in the profile storage 312) that is associated with the user that provided the user input to the system component(s) 120 as well as indicates the user prefers the first skill 890*a* over the second skill 890*b*. Thus, when the user provides a user input that may be executed by both the first skill 890*a* and the second skill 890*b*, the post-NLU ranker 865 may increase the NLU processing confidence score associated with the first skill 890*a* and/or decrease the NLU processing confidence score associated with the second skill 890*b*.

The other data 1220 may include information indicating system usage history associated with the user that originated the user input. For example, the system usage history may indicate the user originates user inputs that invoke a first skill 890*a* more often than the user originates user inputs that invoke a second skill 890*b*. Based on this, if the present user input may be executed by both the first skill 890*a* and the second skill 890*b*, the post-NLU ranker 865 may increase the NLU processing confidence score associated with the first skill 890*a* and/or decrease the NLU processing confidence score associated with the second skill 890*b*.

The other data 1220 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 865 may increase the NLU processing confidence score associated with a first skill 890*a* that generates audio data. The post-NLU ranker 865 may also or alternatively decrease the NLU processing confidence score associated with a second skill 890*b* that generates image data or video data.

The other data 1220 may include information indicating how long it took a skill 890 to provide result data 1230 to the post-NLU ranker 865. When the post-NLU ranker 865 multiple skills 890 for result data 1230, the skills 890 may respond to the queries at different speeds. The post-NLU ranker 865 may implement a latency budget. For example, if the post-NLU ranker 865 determines a skill 890 responds to the post-NLU ranker 865 within a threshold amount of time from receiving a query from the post-NLU ranker 865, the post-NLU ranker 865 may increase the NLU processing confidence score associated with the skill 890. Conversely, if the post-NLU ranker 865 determines a skill 890 does not respond to the post-NLU ranker 865 within a threshold amount of time from receiving a query from the post-NLU ranker 865, the post-NLU ranker 865 may decrease the NLU processing confidence score associated with the skill 890.

It has been described that the post-NLU ranker 865 uses the other data 1220 to increase and decrease NLU processing confidence scores associated with various skills 890 that the post-NLU ranker 865 has already requested result data from. Alternatively, the post-NLU ranker 865 may use the other data 1220 to determine which skills 890 to request result data from. For example, the post-NLU ranker 865 may use the other data 1220 to increase and/or decrease NLU processing confidence scores associated with skills 890 associated with the NLU results data 1285 output by the NLU component 860. The post-NLU ranker 865 may select n-number of top scoring altered NLU processing confidence scores. The post-NLU ranker 865 may then request result data 1230 from only the skills 890 associated with the selected n-number of NLU processing confidence scores.

As described, the post-NLU ranker 865 may request result data 1230 from all skills 890 associated with the NLU results data 1285 output by the NLU component 860. Alternatively, the system component(s) 120 may prefer result data 1230 from skills implemented entirely by the system component(s) 120 rather than skills at least partially implemented by the skill system(s) 125. Therefore, in the first instance, the post-NLU ranker 865 may request result data 1230 from only skills associated with the NLU results data 1285 and entirely implemented by the system component(s) 120. The post-NLU ranker 865 may only request result data 1230 from skills associated with the NLU results data 1285, and at least partially implemented by the skill system(s) 125, if none of the skills, wholly implemented by the system component(s) 120, provide the post-NLU ranker 865 with result data 1230 indicating either data response to the NLU results data 1285, an indication that the skill can execute the user input, or an indication that further information is needed.

As indicated above, the post-NLU ranker 865 may request result data 1230 from multiple skills 890. If one of the skills 890 provides result data 1230 indicating a response to a NLU hypothesis and the other skills provide result data 1230 indicating either they cannot execute or they need further information, the post-NLU ranker 865 may select the result data 1230 including the response to the NLU hypothesis as the data to be output to the user. If more than one of the skills 890 provides result data 1230 indicating responses to NLU hypotheses, the post-NLU ranker 865 may consider the other data 1220 to generate altered NLU processing confidence scores, and select the result data 1230 of the skill associated with the greatest score as the data to be output to the user.

A system that does not implement the post-NLU ranker 865 may select the highest scored NLU hypothesis in the NLU results data 1285. The system may send the NLU hypothesis to a skill 890 associated therewith along with a request for output data. In some situations, the skill 890 may not be able to provide the system with output data. This results in the system indicating to the user that the user input could not be processed even though another skill associated with lower ranked NLU hypothesis could have provided output data responsive to the user input.

The post-NLU ranker 865 reduces instances of the aforementioned situation. As described, the post-NLU ranker 865 queries multiple skills associated with the NLU results data 1285 to provide result data 1230 to the post-NLU ranker 865 prior to the post-NLU ranker 865 ultimately determining the skill 890 to be invoked to respond to the user input. Some of the skills 890 may provide result data 1230 indicating responses to NLU hypotheses while other skills 890 may providing result data 1230 indicating the skills cannot provide responsive data. Whereas a system not implementing the post-NLU ranker 865 may select one of the skills 890 that could not provide a response, the post-NLU ranker 865 only selects a skill 890 that provides the post-NLU ranker 865 with result data corresponding to a response, indicating further information is needed, or indicating multiple responses can be generated.

The post-NLU ranker 865 may select result data 1230, associated with the skill 890 associated with the highest score, for output to the user. Alternatively, the post-NLU ranker 865 may output ranked output data 1225 indicating skills 890 and their respective post-NLU ranker rankings. Since the post-NLU ranker 865 receives result data 1230, potentially corresponding to a response to the user input, from the skills 890 prior to post-NLU ranker 865 selecting one of the skills or outputting the ranked output data 1225, little to no latency occurs from the time skills provide result data 1230 and the time the system outputs responds to the user.

If the post-NLU ranker 865 selects result audio data to be output to a user and the system determines content should be output audibly, the post-NLU ranker 865 (or another component of the system component(s) 120) may cause the device 110*a* and/or the device 110*b* to output audio corresponding to the result audio data. If the post-NLU ranker 865 selects result text data to output to a user and the system determines content should be output visually, the post-NLU ranker 865 (or another component of the system component(s) 120) may cause the device 110*b* to display text corresponding to the result text data. If the post-NLU ranker 865 selects result audio data to output to a user and the system determines content should be output visually, the post-NLU ranker 865 (or another component of the system component(s) 120) may send the result audio data to the ASR component 850. The ASR component 850 may generate output text data corresponding to the result audio data. The system component(s) 120 may then cause the device 110*b* to display text corresponding to the output text data. If the post-NLU ranker 865 selects result text data to output to a user and the system determines content should be output audibly, the post-NLU ranker 865 (or another component of the system component(s) 120) may send the result text data to the TTS component 180. The TTS component 180 may generate output audio data (corresponding to computer-generated speech) based on the result text data. The system component(s) 120 may then cause the device 110*a* and/or the device 110*b* to output audio corresponding to the output audio data.

As described, a skill 890 may provide result data 1230 either indicating a response to the user input, indicating more information is needed for the skill 890 to provide a response to the user input, or indicating the skill 890 cannot provide a response to the user input. If the skill 890 associated with the highest post-NLU ranker score provides the post-NLU ranker 865 with result data 1230 indicating a response to the user input, the post-NLU ranker 865 (or another component of the system component(s) 120, such as the orchestrator component 124) may simply cause content corresponding to the result data 1230 to be output to the user. For example, the post-NLU ranker 865 may send the result data 1230 to the orchestrator component 124. The orchestrator component 124 may cause the result data 1230 to be sent to the device (110*a*/110*b*), which may output audio and/or display text corresponding to the result data 1230. The orchestrator component 124 may send the result data 1230 to the ASR component 850 to generate output text data and/or may send the result data 1230 to the TTS component 180 to generate output audio data, depending on the situation.

The skill 890 associated with the highest post-NLU ranker score may provide the post-NLU ranker 865 with result data 1230 indicating more information is needed as well as instruction data. The instruction data may indicate how the skill 890 recommends the system obtain the needed information. For example, the instruction data may correspond to text data or audio data (i.e., computer-generated speech) corresponding to "please indicate ______." The instruction data may be in a format (e.g., text data or audio data) capable of being output by the device (110*a*/110*b*). When this occurs, the post-NLU ranker 865 may simply cause the received instruction data be output by the device (110*a*/110*b*). Alternatively, the instruction data may be in a format that is not capable of being output by the device (110*a*/110*b*). When this occurs, the post-NLU ranker 865 may cause the ASR component 850 or the TTS component 180 to process the instruction data, depending on the situation, to generate instruction data that may be output by the device (110*a*/110*b*). Once the user provides the system with all further information needed by the skill 890, the skill 890 may provide the system with result data 1230 indicating a response to the user input, which may be output by the system as detailed above.

The system may include "informational" skills 890 that simply provide the system with information, which the system outputs to the user. The system may also include "transactional" skills 890 that require a system instruction to execute the user input. Transactional skills 890 include ride sharing skills, flight booking skills, etc. A transactional skill 890 may simply provide the post-NLU ranker 865 with result data 1230 indicating the transactional skill 890 can execute the user input. The post-NLU ranker 865 may then cause the system to solicit the user for an indication that the system is permitted to cause the transactional skill 890 to execute the user input. The user-provided indication may be an audible indication or a tactile indication (e.g., activation of a virtual button or input of text via a virtual keyboard). In response to receiving the user-provided indication, the system may provide the transactional skill 890 with data corresponding to the indication. In response, the transactional skill 890 may execute the command (e.g., book a flight, book a train ticket, etc.). Thus, while the system may not further engage an informational skill 890 after the informational skill 890 provides the post-NLU ranker 865 with result data 1230, the system may further engage a transactional skill 890 after the transactional skill 890 provides the post-NLU ranker 865 with result data 1230 indicating the transactional skill 890 may execute the user input.

In some instances, the post-NLU ranker 865 may generate respective scores for first and second skills that are too close (e.g., are not different by at least a threshold difference) for the post-NLU ranker 865 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 124, post-NLU ranker 865, shortlister component 1150, or other component may be trained and operated according to various machine learning techniques.

The device 110 and/or the system component(s) 120 may include a user recognition component 895 that recognizes one or more users using a variety of data. As illustrated in FIG. 13, the user recognition component 895 may include one or more subcomponents including a vision component 1308, an audio component 1310, a biometric component 1312, a radio frequency (RF) component 1314, a machine learning (ML) component 1316, and a recognition confidence component 1318. In some instances, the user recognition component 895 may monitor data and determinations from one or more subcomponents to determine an identity of one or more users associated with data input to the device 110 and/or the system component(s) 120. The user recognition component 895 may output user recognition data 1395, which may include a user identifier associated with a user the user recognition component 895 determines originated data input to the device 110 and/or the system component(s) 120. The user recognition data 1395 may be used to inform processes performed by various components of the device 110 and/or the system component(s) 120.

The vision component 1308 may receive data from one or more sensors capable of providing images (e.g., cameras) or sensors indicating motion (e.g., motion sensors). The vision component 1308 can perform facial recognition or image analysis to determine an identity of a user and to associate that identity with a user profile associated with the user. In some instances, when a user is facing a camera, the vision component 1308 may perform facial recognition and identify the user with a high degree of confidence. In other instances, the vision component 1308 may have a low degree of confidence of an identity of a user, and the user recognition component 895 may utilize determinations from additional components to determine an identity of a user. The vision component 1308 can be used in conjunction with other components to determine an identity of a user. For example, the user recognition component 895 may use data from the vision component 1308 with data from the audio component 1310 to identify what user's face appears to be speaking at the same time audio is captured by a device 110 the user is facing for purposes of identifying a user who spoke an input to the device 110 and/or the system component(s) 120.

The overall system of the present disclosure may include biometric sensors that transmit data to the biometric component 1312. For example, the biometric component 1312 may receive data corresponding to fingerprints, iris or retina scans, thermal scans, weights of users, a size of a user, pressure (e.g., within floor sensors), etc., and may determine a biometric profile corresponding to a user. The biometric component 1312 may distinguish between a user and sound from a television, for example. Thus, the biometric component 1312 may incorporate biometric information into a confidence level for determining an identity of a user. Biometric information output by the biometric component 1312 can be associated with specific user profile data such that the biometric information uniquely identifies a user profile of a user.

The radio frequency (RF) component 1314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1314 the strength of the signal (e.g., as a received signal strength indication (RSSI)). The RF component 1314 may use the RSSI to determine an identity of a user (with an associated confidence level). In some instances, the RF component 1314 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1316 may track the behavior of various users as a factor in determining a confidence level of the identity of the user. By way of example, a user may adhere to a regular schedule such that the user is at a first location during the day (e.g., at work or at school). In this example, the ML component 1316 would factor in past behavior and/or trends in determining the identity of the user that provided input to the device 110 and/or the system component(s) 120. Thus, the ML component 1316 may use historical data and/or usage patterns over time to increase or decrease a confidence level of an identity of a user.

In at least some instances, the recognition confidence component 1318 receives determinations from the various components 1308, 1310, 1312, 1314, and 1316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1395.

The audio component 1310 may receive data from one or more sensors capable of providing an audio signal (e.g., one or more microphones) to facilitate recognition of a user. The audio component 1310 may perform audio recognition on an audio signal to determine an identity of the user and associated user identifier. In some instances, aspects of device 110 and/or the system component(s) 120 may be configured at a computing device (e.g., a local server). Thus, in some instances, the audio component 1310 operating on a computing device may analyze all sound to facilitate recognition of a user. In some instances, the audio component 1310 may perform voice recognition to determine an identity of a user.

The audio component 1310 may also perform user identification based on audio data 811 input into the device 110 and/or the system component(s) 120 for speech processing.

The audio component 1310 may determine scores indicating whether speech in the audio data 811 originated from particular users. For example, a first score may indicate a likelihood that speech in the audio data 811 originated from a first user associated with a first user identifier, a second score may indicate a likelihood that speech in the audio data 811 originated from a second user associated with a second user identifier, etc. The audio component 1310 may perform user recognition by comparing speech characteristics represented in the audio data 811 to stored speech characteristics of users (e.g., stored voice profiles associated with the device 110 that captured the spoken user input).

Figure 14:
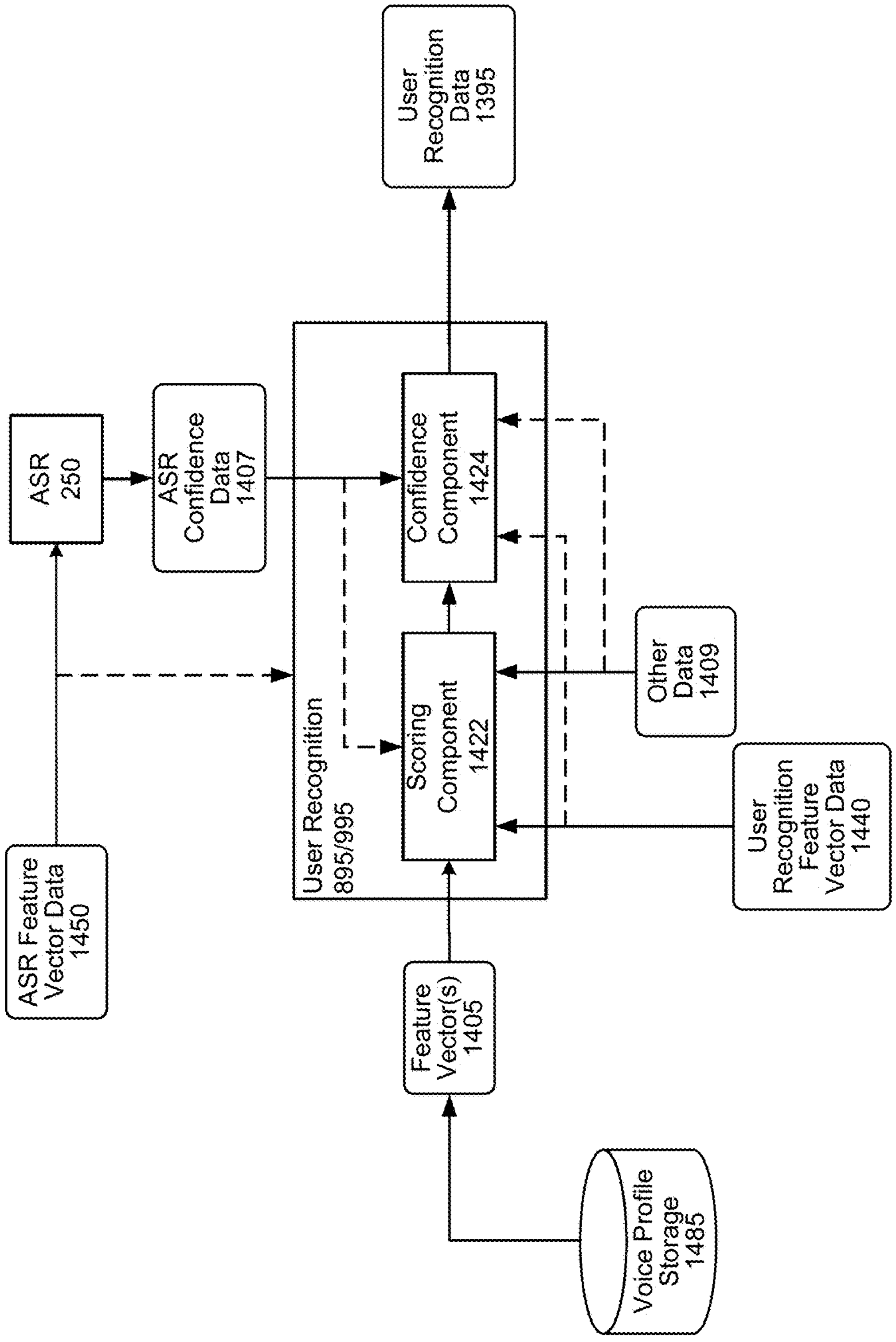
FIG. 14 is a system flow diagram illustrating user recognition according to embodiments of the present disclosure.

FIG. 14 illustrates user recognition processing as may be performed by the user recognition component 895. The ASR component 850 performs ASR processing on ASR feature vector data 1450. ASR confidence data 1407 may be passed to the user recognition component 895.

The user recognition component 895 performs user recognition using various data including the user recognition feature vector data 1440, feature vectors 1405 representing voice profiles of users of the system 100, the ASR confidence data 1407, and other data 1409. The user recognition component 895 may output the user recognition data 1395, which reflects a certain confidence that the user input was spoken by one or more particular users. The user recognition data 1395 may include one or more user identifiers (e.g., corresponding to one or more voice profiles). Each user identifier in the user recognition data 1395 may be associated with a respective confidence value, representing a likelihood that the user input corresponds to the user identifier. A confidence value may be a numeric or binned value.

The feature vector(s) 1405 input to the user recognition component 895 may correspond to one or more voice profiles. The user recognition component 895 may use the feature vector(s) 1405 to compare against the user recognition feature vector data 1440, representing the present user input, to determine whether the user recognition feature vector data 1440 corresponds to one or more of the feature vectors 1405 of the voice profiles. Each feature vector 1405 may be the same size as the user recognition feature vector data 1440.

To perform user recognition, the user recognition component 895 may determine the device 110 from which the audio data 811 originated. For example, the audio data 811 may be associated with metadata including a device identifier representing the device 110. Either the device 110 or the system component(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector data 1440 produced from the audio data 811. The user recognition component 895 may send a signal to voice profile storage 1485, with the signal requesting only audio data and/or feature vectors 1405 (depending on whether audio data and/or corresponding feature vectors are stored) associated with the device identifier, the group profile identifier, and/or the user identifiers represented in the metadata. This limits the universe of possible feature vectors 1405 the user recognition component 895 considers at runtime and thus decreases the amount of time to perform user recognition processing by decreasing the amount of feature vectors 1405 needed to be processed. Alternatively, the user recognition component 895 may access all (or some other subset of) the audio data and/or feature vectors 1405 available to the user recognition component 895. However, accessing all audio data and/or feature vectors 1405 will likely increase the amount of time needed to perform user recognition processing based on the magnitude of audio data and/or feature vectors 1405 to be processed.

If the user recognition component 895 receives audio data from the voice profile storage 1485, the user recognition component 895 may generate one or more feature vectors 1405 corresponding to the received audio data.

The user recognition component 895 may attempt to identify the user that spoke the speech represented in the audio data 811 by comparing the user recognition feature vector data 1440 to the feature vector(s) 1405. The user recognition component 895 may include a scoring component 1422 that determines respective scores indicating whether the user input (represented by the user recognition feature vector data 1440) was spoken by one or more particular users (represented by the feature vector(s) 1405). The user recognition component 895 may also include a confidence component 1424 that determines an overall accuracy of user recognition processing (such as those of the scoring component 1422) and/or an individual confidence value with respect to each user potentially identified by the scoring component 1422. The output from the scoring component 1422 may include a different confidence value for each received feature vector 1405. For example, the output may include a first confidence value for a first feature vector 1405*a* (representing a first voice profile), a second confidence value for a second feature vector 1405*b* (representing a second voice profile), etc. Although illustrated as two separate components, the scoring component 1422 and the confidence component 1424 may be combined into a single component or may be separated into more than two components.

The scoring component 1422 and the confidence component 1424 may implement one or more trained machine learning models (such as neural networks, classifiers, etc.) as known in the art. For example, the scoring component 1422 may use probabilistic linear discriminant analysis (PLDA) techniques. PLDA scoring determines how likely it is that the user recognition feature vector data 1440 corresponds to a particular feature vector 1405. The PLDA scoring may generate a confidence value for each feature vector 1405 considered and may output a list of confidence values associated with respective user identifiers. The scoring component 1422 may also use other techniques, such as GMMs, generative Bayesian models, or the like, to determine confidence values.

The confidence component 1424 may input various data including information about the ASR confidence data 1407, speech length (e.g., number of frames or other measured length of the user input), audio condition/quality data (such as signal-to-interference data or other metric data), fingerprint data, image data, or other factors to consider how confident the user recognition component 895 is with regard to the confidence values linking users to the user input. The confidence component 1424 may also consider the confidence values and associated identifiers output by the scoring component 1422. For example, the confidence component 1424 may determine that a lower ASR confidence data 1407, or poor audio quality, or other factors, may result in a lower confidence of the user recognition component 895. Whereas a higher ASR confidence data 1407, or better audio quality, or other factors, may result in a higher confidence of the user recognition component 895. Precise determination of the confidence may depend on configuration and training of the confidence component 1424 and the model(s) implemented thereby. The confidence component 1424 may operate using a number of different machine learning models/techniques such as GMM, neural networks, etc. For example, the confidence component 1424 may be a classifier configured to map a score output by the scoring component 1422 to a confidence value.

The user recognition component 895 may output user recognition data 1395 specific to a one or more user identifiers. For example, the user recognition component 895 may output user recognition data 1395 with respect to each received feature vector 1405. The user recognition data 1395 may include numeric confidence values (e.g., 0.0-1.0, 0-1000, or whatever scale the system is configured to operate). Thus, the user recognition data 1395 may output an n-best list of potential users with numeric confidence values (e.g., user identifier 123—0.2, user identifier 234—0.8). Alternatively or in addition, the user recognition data 1395 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 895 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 1395 may only include information related to the top scoring identifier as determined by the user recognition component 895. The user recognition component 895 may also output an overall confidence value that the individual confidence values are correct, where the overall confidence value indicates how confident the user recognition component 895 is in the output results. The confidence component 1424 may determine the overall confidence value.

The confidence component 1424 may determine differences between individual confidence values when determining the user recognition data 1395. For example, if a difference between a first confidence value and a second confidence value is large, and the first confidence value is above a threshold confidence value, then the user recognition component 895 is able to recognize a first user (associated with the feature vector 1405 associated with the first confidence value) as the user that spoke the user input with a higher confidence than if the difference between the confidence values were smaller.

The user recognition component 895 may perform thresholding to avoid incorrect user recognition data 1395 being output. For example, the user recognition component 895 may compare a confidence value output by the confidence component 1424 to a threshold confidence value. If the confidence value does not satisfy (e.g., does not meet or exceed) the threshold confidence value, the user recognition component 895 may not output user recognition data 1395, or may only include in that data 1395 an indicator that a user that spoke the user input could not be recognized. Further, the user recognition component 895 may not output user recognition data 1395 until enough user recognition feature vector data 1440 is accumulated and processed to verify a user above a threshold confidence value. Thus, the user recognition component 895 may wait until a sufficient threshold quantity of audio data of the user input has been processed before outputting user recognition data 1395. The quantity of received audio data may also be considered by the confidence component 1424.

The user recognition component 895 may be defaulted to output binned (e.g., low, medium, high) user recognition confidence values. However, such may be problematic in certain situations. For example, if the user recognition component 895 computes a single binned confidence value for multiple feature vectors 1405, the system may not be able to determine which particular user originated the user input. In this situation, the user recognition component 895 may override its default setting and output numeric confidence values. This enables the system to determine a user, associated with the highest numeric confidence value, originated the user input.

The user recognition component 895 may use other data 1409 to inform user recognition processing. A trained model(s) or other component of the user recognition component 895 may be trained to take other data 1409 as an input feature when performing user recognition processing. Other data 1409 may include a variety of data types depending on system configuration and may be made available from other sensors, devices, or storage. The other data 1409 may include a time of day at which the audio data 811 was generated by the device 110 or received from the device 110, a day of a week in which the audio data audio data 811 was generated by the device 110 or received from the device 110, etc.

The other data 1409 may include image data or video data. For example, facial recognition may be performed on image data or video data received from the device 110 from which the audio data 811 was received (or another device). Facial recognition may be performed by the user recognition component 895. The output of facial recognition processing may be used by the user recognition component 895. That is, facial recognition output data may be used in conjunction with the comparison of the user recognition feature vector data 1440 and one or more feature vectors 1405 to perform more accurate user recognition processing.

The other data 1409 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1409 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 811 was received is a smart watch or vehicle belonging to a user A, the fact that the device 110 belongs to user A may increase a user recognition confidence value associated with user A and/or decrease a user recognition confidence value associated with user B.

The other data 1409 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 811. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 1409 may include data representing activity of a particular user that may be useful in performing user recognition processing. For example, a user may have recently entered a code to disable a home security alarm. A device 110, represented in a group profile associated with the home, may have generated the audio data 811. The other data 1409 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 1409 and considered by the user recognition component 895.

Depending on system configuration, the other data 1409 may be configured to be included in the user recognition feature vector data 1440 so that all the data relating to the user input to be processed by the scoring component 1422 may be included in a single feature vector. Alternatively, the other data 1409 may be reflected in one or more different data structures to be processed by the scoring component 1422.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 15:
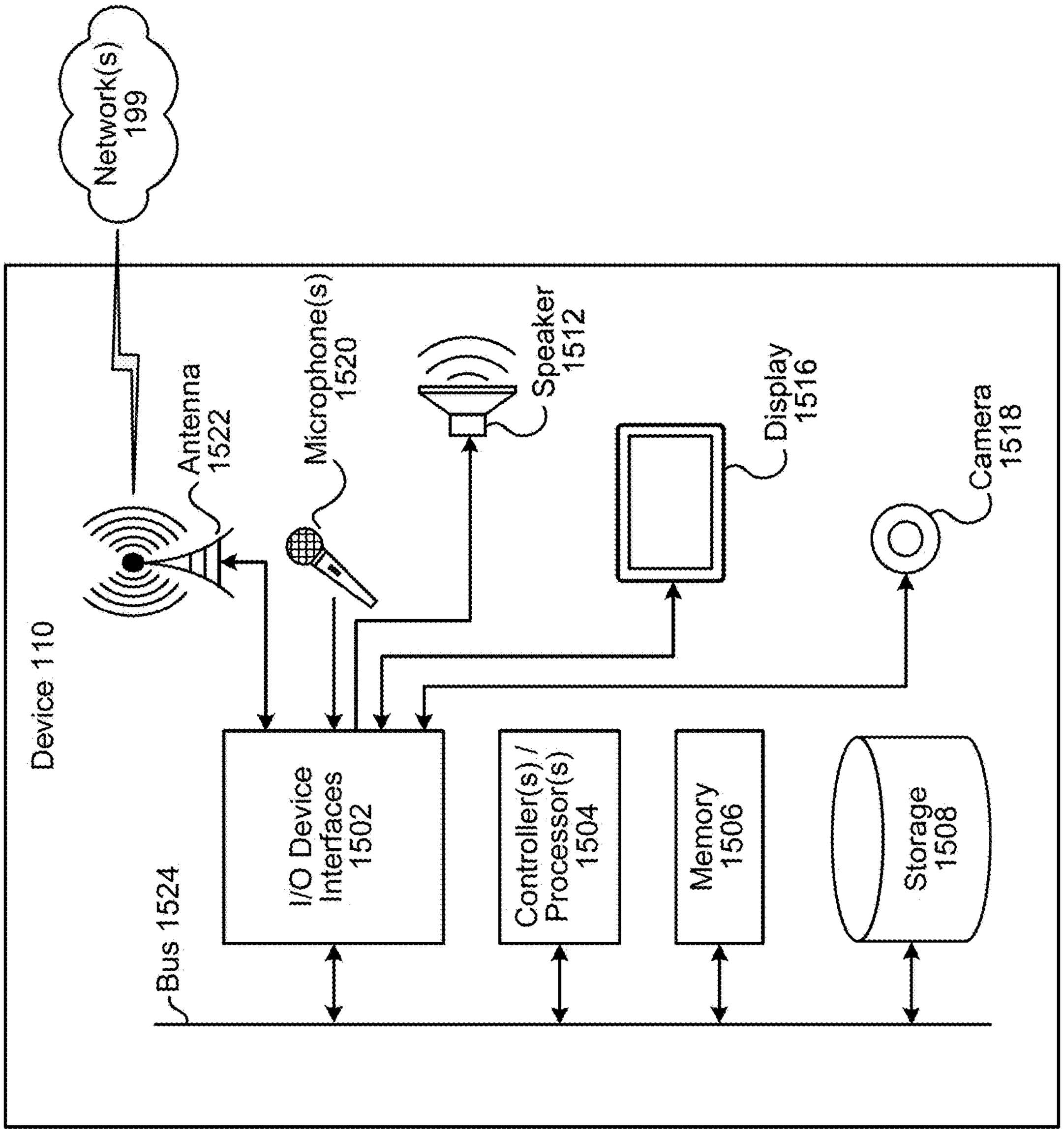
FIG. 15 is a block diagram conceptually illustrating example components of a device, according to embodiments of the present disclosure.
Figure 16:
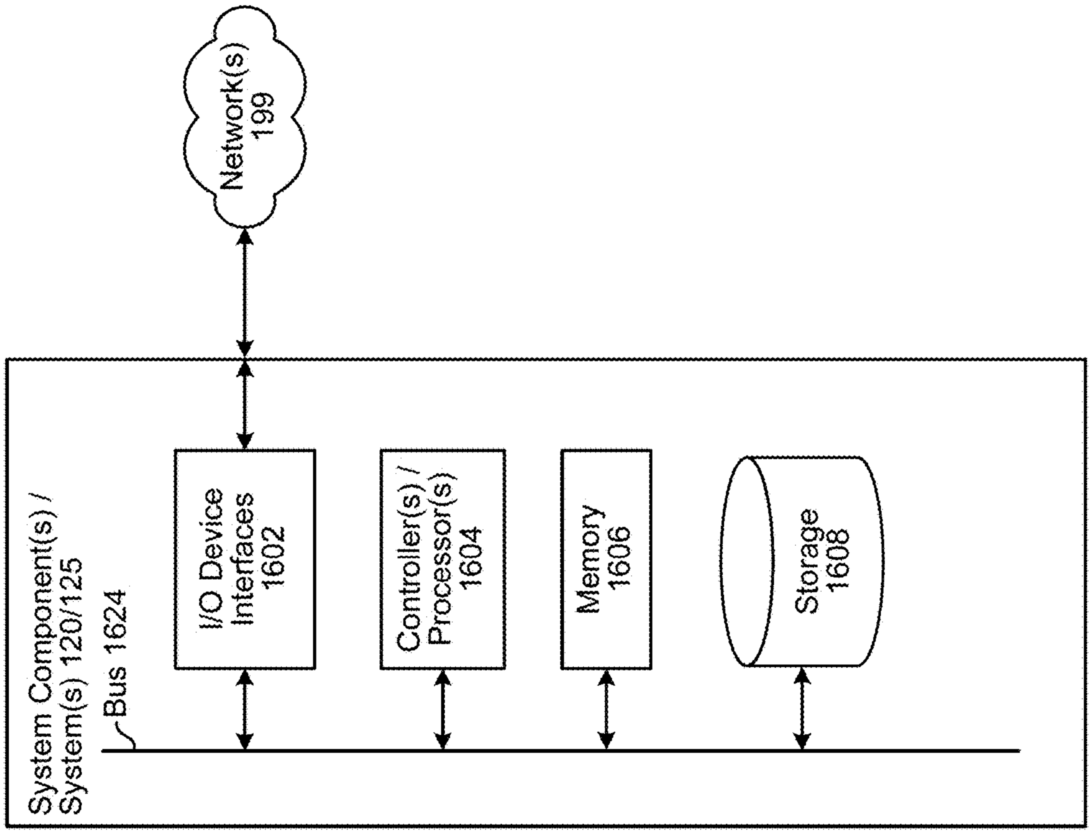
FIG. 16 is a block diagram conceptually illustrating example components of a system, according to embodiments of the present disclosure.

FIG. 15 is a block diagram conceptually illustrating a device 110 that may be used with the system. FIG. 16 is a block diagram conceptually illustrating example components of a remote device, such as the natural language command processing system component(s) 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) 120 may be located remotely from the device 110 as its operations may not require proximity to the user. The server/system component(s) 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The system component(s) 120 may also be a version of a device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/125) may be included in the overall system 100 of the present disclosure, such as one or more system component(s) 120 for performing ASR processing, one or more system component(s) 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/125) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1502/1602).

Computer instructions for operating each device (110/120/125) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/125) includes input/output device interfaces (1502/1602). A variety of components may be connected through the input/output device interfaces (1502/1602), as will be discussed further below. Additionally, each device (110/120/125) may include an address/data bus (1524/1624) for conveying data among components of the respective device. Each component within a device (110/120/125) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1522, the input/output device interfaces 1502 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device(s) 110, the natural language command processing system component(s) 120, or a skill system 125 may include their own dedicated processors, memory, and/or storage. Alternatively, one or more of the components of the device(s) 110, the natural language command processing system component(s) 120, or a skill system 125 may utilize the I/O interfaces (1502/1602), processor(s) (1504/1604), memory (1506/1606), and/or storage (1508/1608) of the device(s) 110, natural language command processing system component(s) 120, or the skill system 125, respectively. Thus, the ASR component 850 may have its own I/O interface(s), processor(s), memory, and/or storage; the NLU component 860 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s) 120, and a skill system 125, as described herein, are illustrative, and may be located as a stand-alone device or may be included, in whole or in part, as a component of a larger device or system. As can be appreciated, a number of components may exist either on a system component(s) 120 and/or on device 110. For example, language processing 892/992 (which may include ASR 850/950), language output 893/993 (which may include NLG 879/979 and TTS 180/980), etc., for example as illustrated in FIGS. 8 and 9. Unless expressly noted otherwise, the system version of such components may operate similarly to the device version of such components and thus the description of one version (e.g., the system version or the local version) applies to the description of the other version (e.g., the local version or system version) and vice-versa.

Figure 17:
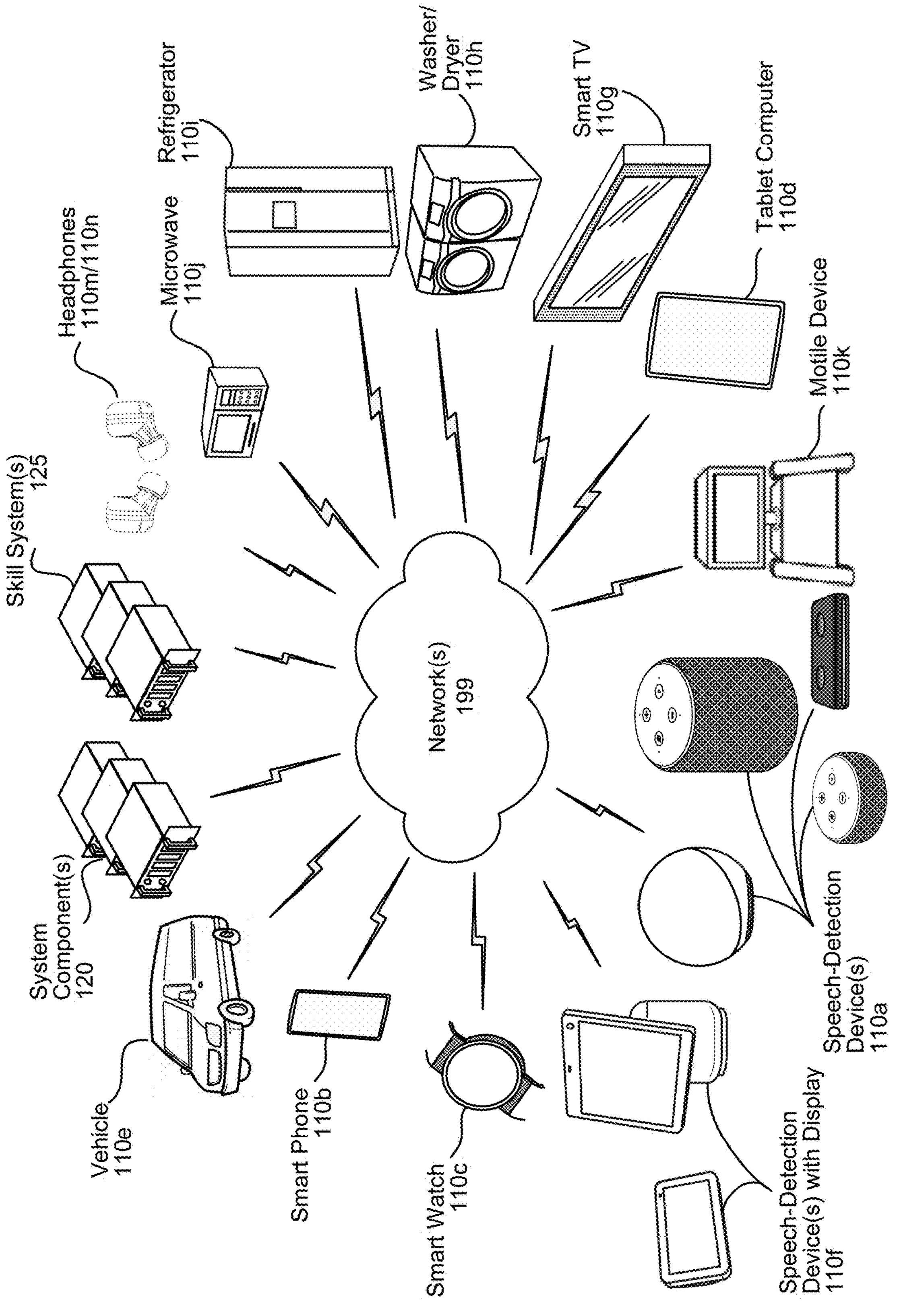
FIG. 17 illustrates an example of a computer network for use with the overall system, according to embodiments of the present disclosure.

As illustrated in FIG. 17, multiple devices (110*a*-110*n*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, autonomously motile device 110*k* (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 850, the NLU component 860, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:

receiving, from a first device, a first user input representing a natural language description of a desired synthetic voice;

processing, using a first encoder, the first user input to determine synthetic voice description embedding data representing the natural language description of the desired synthetic voice;

determining, using the synthetic voice description embedding data, first synthetic voice embedding data corresponding to a first proposed synthetic voice;

processing, using a decoder, the first synthetic voice embedding data to determine first synthetic voice characteristics data;

generating, using the first synthetic voice characteristics data and text data representing words, first output audio data representing first synthetic speech corresponding to the first proposed synthetic voice saying the words;

causing the first device to output the first output audio data;

receiving a second user input representing a user satisfaction corresponding to the first proposed synthetic voice;

based at least in part on the user satisfaction and the first synthetic voice embedding data, generating first data representing a first probability that second synthetic voice embedding data corresponding to a second proposed synthetic voice will result in higher user satisfaction than third synthetic voice embedding data corresponding to a third proposed synthetic voice;

based at least in part on the first data, selecting the second synthetic voice embedding data instead of the third synthetic voice embedding data;

processing, using the decoder, the second synthetic voice embedding data to determine second synthetic voice characteristics data;

generating, using the second synthetic voice characteristics data and the text data, second output audio data representing second synthetic speech corresponding to the second proposed synthetic voice saying the words; and causing the first device to output the second output audio data.

2. The computer-implemented method of claim 1, further comprising:

determining first profile data associated with the first user input;

processing, using a second encoder, the first profile data to determine profile embedding data;

processing, using a third encoder, the synthetic voice description embedding data and the profile embedding data to determine first synthetic voice preference embedding data representing the natural language description of the desired synthetic voice and the first profile data;

determining, using the first synthetic voice preference embedding data, from among a plurality of synthetic voice preference embedding data, second synthetic voice preference embedding data corresponding to a first user;

determining a similarity between the first synthetic voice preference embedding data and the second synthetic voice preference embedding data; and based at least in part on the similarity, determining fourth synthetic voice embedding data corresponding to the first user, the fourth synthetic voice embedding data corresponding to a first previously configured synthetic voice, wherein the first synthetic voice embedding data corresponds to the fourth synthetic voice embedding data.

3. The computer-implemented method of claim 2, further comprising:

determining, using the first synthetic voice preference embedding data, from among the plurality of synthetic voice preference embedding data, third synthetic voice preference embedding data corresponding to a second user;

determining fifth synthetic voice embedding data corresponding to the second user, the fifth synthetic voice embedding data corresponding to a second previously configured synthetic voice; and processing the fifth synthetic voice embedding data and the fourth synthetic voice embedding data to determine sixth synthetic voice embedding data, the sixth synthetic voice embedding data corresponding to an average between the fifth synthetic voice embedding data and the fourth synthetic voice embedding data, wherein the second synthetic voice embedding data corresponds to the sixth synthetic voice embedding data.

4. The computer-implemented method of claim 1, wherein the first data further represents a second probability that fourth synthetic voice embedding data corresponding to a fourth proposed synthetic voice will result in higher user satisfaction than fifth synthetic voice embedding data corresponding to a fifth proposed synthetic voice, and selecting the second synthetic voice embedding data comprises:

based at least in part on the first data, selecting the fourth synthetic voice embedding data instead of the fifth synthetic voice embedding data; and processing the fourth synthetic voice embedding data and the second synthetic voice embedding data to determine sixth synthetic voice embedding data, the sixth synthetic voice embedding data corresponding to an average between the fourth synthetic voice embedding data and the second synthetic voice embedding data, the sixth synthetic voice embedding data corresponding to a sixth proposed synthetic voice.

5. A computer-implemented method comprising:

receiving a first user input representing a description of a desired synthetic voice;

processing the first user input to determine synthetic voice description embedding data;

determining, based at least in part on the synthetic voice description embedding data, first synthetic voice embedding data corresponding to a first proposed synthetic voice;

processing the first synthetic voice embedding data to determine first synthetic voice characteristics data;

performing speech synthesis processing using the first synthetic voice characteristics data to determine first output audio data representing first speech corresponding to the first proposed synthetic voice;

causing output of the first output audio data;

receiving a second user input corresponding to the first proposed synthetic voice;

based at least in part on the second user input and the first synthetic voice embedding data, determining second synthetic voice embedding data corresponding to a second proposed synthetic voice;

processing the second synthetic voice embedding data to determine second synthetic voice characteristics data;

performing speech synthesis processing using the second synthetic voice characteristics data to determine second output audio data representing second speech corresponding to the second proposed synthetic voice; and causing output of the second output audio data.

6. The computer-implemented method of claim 5, further comprising:

determining first profile data associated with the first user input;

processing the first profile data to determine profile embedding data;

processing the synthetic voice description embedding data and the profile embedding data to determine first synthetic voice preference embedding data; and determining, using the first synthetic voice preference embedding data, from among a plurality of synthetic voice preference embedding data, third synthetic voice embedding data corresponding to a first user, the third synthetic voice embedding data corresponding to a previously configured synthetic voice, wherein the first synthetic voice embedding data corresponds to the third synthetic voice embedding data.

7. The computer-implemented method of claim 6, wherein determining, from among the plurality of synthetic voice preference embedding data, the third synthetic voice embedding data comprises:

determining a similarity between the first synthetic voice preference embedding data and second synthetic voice preference embedding data corresponding to the first user, wherein determining the first synthetic voice embedding data is based at least in part on the similarity.

8. The computer-implemented method of claim 5, further comprising:

storing first data corresponding to the second proposed synthetic voice;

after storing the first data, receiving a third user input corresponding to a user request;

processing the third user input to determine output data responsive to the user request;

determining the user request is associated with the first data; and performing speech synthesis processing using the output data and the second synthetic voice characteristics data to determine third output audio data representing a synthetic speech response to the user request in the second proposed synthetic voice.

9. The computer-implemented method of claim 5, wherein determining the second synthetic voice embedding data comprises:

based at least in part on the second user input and the first synthetic voice embedding data, determining to select third synthetic voice embedding data corresponding to a third proposed synthetic voice instead of fourth synthetic voice embedding data corresponding to a fourth proposed synthetic voice; and processing the third synthetic voice embedding data and the second synthetic voice embedding data to determine fifth synthetic voice embedding data corresponding to a fifth proposed synthetic voice, the fifth synthetic voice embedding data corresponding to an interpolation of the third synthetic voice embedding data and the second synthetic voice embedding data, wherein the second synthetic voice embedding data corresponds to the fifth synthetic voice embedding data.

10. The computer-implemented method of claim 5, wherein:

the second user input represents a user satisfaction corresponding to the first proposed synthetic voice, and determining the second synthetic voice embedding data comprises:

generating, based at least in part on the second user input and the first synthetic voice embedding data, first data representing a first probability that third synthetic voice embedding data corresponding to a third proposed synthetic voice predicted to result in higher user satisfaction than fourth synthetic voice embedding data corresponding to a fourth proposed synthetic voice; and based at least in part on the first data, selecting the third synthetic voice embedding data instead of the fourth synthetic voice embedding data, wherein the second synthetic voice embedding data corresponds to the third synthetic voice embedding data.

11. The computer-implemented method of claim 5, further comprising:

prior to receiving the second user input, determining, based at least in part on the synthetic voice description embedding data, third synthetic voice embedding data corresponding to a third proposed synthetic voice;

processing the third synthetic voice embedding data to determine third synthetic voice characteristics data;

generating, using the third synthetic voice characteristics data, third output audio data representing third speech corresponding to the third proposed synthetic voice; and causing output of the third output audio data, wherein the second user input corresponds to the first proposed synthetic voice and not the third proposed synthetic voice.

12. The computer-implemented method of claim 5, further comprising:

prior to determining the first synthetic voice embedding data, determining, using the synthetic voice description embedding data, third synthetic voice embedding data corresponding to a third proposed synthetic voice;

determining a first user associated with the first user input; and determining that the third synthetic voice embedding data is associated with a profile, the profile being associated with a second user different from the first user, wherein the first synthetic voice embedding data is determined based at least in part on the second user being different from the first user.

13. A computing system comprising:

at least one processor; and at least one memory comprising instructions that, when executed by the at least one processor, cause the computing system to:

receive a first user input representing a description of a desired synthetic voice;

process the first user input to determine synthetic voice description embedding data;

determine, based at least in part on the synthetic voice description embedding data, first synthetic voice embedding data corresponding to a first proposed synthetic voice;

process the first synthetic voice embedding data to determine first synthetic voice characteristics data;

perform speech synthesis processing using the first synthetic voice characteristics data to determine first output audio data representing first speech corresponding to the first proposed synthetic voice;

cause output of the first output audio data;

receive a second user input corresponding to the first proposed synthetic voice;

based at least in part on the second user input and the first synthetic voice embedding data, determine second synthetic voice embedding data corresponding to a second proposed synthetic voice;

process the second synthetic voice embedding data to determine second synthetic voice characteristics data;

generate, using the second synthetic voice characteristics data, second output audio data representing second speech corresponding to the second proposed synthetic voice; and cause output of the second output audio data.

14. The computing system of claim 13, wherein the at least one memory further comprises instructions that, when executed by the at least one processor, further cause the computing system to:

determine first profile data associated with the first user input;

process the first profile data to determine profile embedding data;

process the synthetic voice description embedding data and the profile embedding data to determine first synthetic voice preference embedding data; and determine, using the first synthetic voice preference embedding data, from among a plurality of synthetic voice preference embedding data, third synthetic voice embedding data corresponding to a first user, the third synthetic voice embedding data corresponding to a previously configured synthetic voice, wherein the first synthetic voice embedding data corresponds to the third synthetic voice embedding data.

15. The computing system of claim 14, wherein the at least one memory further comprises instructions that, when executed by the at least one processor, cause the computing system to determine, from among the plurality of synthetic voice preference embedding data, the third synthetic voice embedding data further cause the computing system to:

determine a similarity between the first synthetic voice preference embedding data and second synthetic voice preference embedding data corresponding to the first user, wherein determining the first synthetic voice embedding data is based at least in part on the similarity.

16. The computing system of claim 14, wherein the at least one memory further comprises instructions that, when executed by the at least one processor, further cause the computing system to:

determine, using the first synthetic voice preference embedding data, from among the plurality of synthetic voice preference embedding data, fourth synthetic voice embedding data corresponding to a second user, the fourth synthetic voice embedding data corresponding to a second previously configured synthetic voice; and process the third synthetic voice embedding data and the fourth synthetic voice embedding data to determine fifth synthetic voice embedding data corresponding to a third proposed synthetic voice, the fifth synthetic voice embedding data corresponding to an interpolation of the third synthetic voice embedding data and the fourth synthetic voice embedding data, wherein the first synthetic voice embedding data corresponds to the fifth synthetic voice embedding data.

17. The computing system of claim 13, wherein the at least one memory further comprises instructions that, when executed by the at least one processor, cause the computing system to:

store first data corresponding to the second proposed synthetic voice;

after storing the first data, receive a third user input corresponding to a user request;

process the third user input to determine output data responsive to the user request;

determine the user request is associated with the first data; and perform speech synthesis processing using the output data and the second synthetic voice characteristics data to determine third output audio data representing a synthetic speech response to the user request in the second proposed synthetic voice.

18. The computing system of claim 13, wherein:

the second user input represents a user satisfaction corresponding to the first proposed synthetic voice, and wherein the at least one memory further comprises instructions that, when executed by the at least one processor, cause the computing system to generate the second synthetic voice embedding data further cause the computing system to:

determine, based at least in part on the second user input and the first synthetic voice embedding data, first data representing a first probability that third synthetic voice embedding data corresponding to a third proposed synthetic voice predicted to result in higher user satisfaction than fourth synthetic voice embedding data corresponding to a fourth proposed synthetic voice; and based at least in part on the first data, select the third synthetic voice embedding data instead of the fourth synthetic voice embedding data, wherein the second synthetic voice embedding data corresponds to the third synthetic voice embedding data.

19. The computing system of claim 13, wherein the at least one memory further comprises instructions that, when executed by the at least one processor, further cause the computing system to:

prior to receiving the second user input, determine, based at least in part on the synthetic voice description embedding data, third synthetic voice embedding data corresponding to a third proposed synthetic voice;

process the third synthetic voice embedding data to determine third synthetic voice characteristics data;

generate, using the third synthetic voice characteristics data, third output audio data representing third speech corresponding to the third proposed synthetic voice; and cause output of the third output audio data, wherein the second user input corresponds to the first proposed synthetic voice and not the third proposed synthetic voice.

20. The computing system of claim 13, wherein the at least one memory further comprises instructions that, when executed by the at least one processor, further cause the computing system to:

prior to determining the first synthetic voice embedding data, determine, using the synthetic voice description embedding data, third synthetic voice embedding data corresponding to a third proposed synthetic voice;

determine a first user associated with the first user input; and determine that the third synthetic voice embedding data is associated with a profile, the profile being associated with a second user different from the first user, wherein the first synthetic voice embedding data is determined based at least in part on the second user being different from the first user.

* * * * *